United States Patent
Urushihara et al.

(10) Patent No.: US 8,041,405 B2
(45) Date of Patent: Oct. 18, 2011

(54) STACK TYPE MOBILE TERMINAL

(75) Inventors: Kenji Urushihara, Miyagi (JP);
Takayuki Murai, Miyagi (JP); Takeshi Tambo, Miyagi (JP); Hiroshi Ohmura, Miyagi (JP); Ryou Wakasa, Miyagi (JP); Ryuuichi Toyoda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 950 days.

(21) Appl. No.: 11/916,046

(22) PCT Filed: Jun. 1, 2006

(86) PCT No.: PCT/JP2006/311023
§ 371 (c)(1),
(2), (4) Date: Nov. 30, 2007

(87) PCT Pub. No.: WO2006/129768
PCT Pub. Date: Dec. 7, 2006

(65) Prior Publication Data
US 2010/0016036 A1    Jan. 21, 2010

(30) Foreign Application Priority Data
Jun. 1, 2005    (JP) .................................. 2005-161557

(51) Int. Cl.
*H04M 1/00*    (2006.01)
(52) U.S. Cl. ................................................... 455/575.1
(58) Field of Classification Search ................ 455/575.1
See application file for complete search history.

(56) References Cited

U.S. PATENT DOCUMENTS
5,303,291 A    4/1994    Takagi et al.
(Continued)

FOREIGN PATENT DOCUMENTS
CN        2669259 Y        1/2005
(Continued)

OTHER PUBLICATIONS

Au design project, "Konseputo moderu ichiran," "Apollo (2002)," KDDI, [search on Aug. 17, 2004], Internet URL: htt-:www.au.kddi.com/au_design_project/models/.

(Continued)

*Primary Examiner* — Temesgh Ghebretinsae
*Assistant Examiner* — David Bilodeau
(74) *Attorney, Agent, or Firm* — Seed IP Law Group PLLC

(57) ABSTRACT

A stack type mobile terminal for enabling the user to easily add only a necessary option cabinet from among different types of option cabinets eliminating the need for electric connection of the user is provided.

A stack type mobile terminal 100 includes a main body cabinet 110 functioning as a telephone, a plurality of option cabinets 120 stacked on the rear of the main body cabinet 110, a rotation supporting point shaft in the stack direction, provided in the option cabinet 120 for the main body cabinet 110 and the option cabinet 120 to relatively rotate, rotation supporting point holes into which the rotation supporting point shaft is inserted, and a contact mechanism for electrically connecting the cabinets when the main body cabinet 110 and the option cabinet 120 or the option cabinets 120 are positioned at a predetermined relative angle, wherein the main body cabinet 110 and the option cabinet 120 relatively rotate, whereby the function section of the option cabinet 120 can be exposed. It is made possible to stack different types of option cabinets 120 on the rear of the main body cabinet 110 selectively as many as desired.

18 Claims, 35 Drawing Sheets

U.S. PATENT DOCUMENTS

| | | |
|---|---|---|
| 5,335,273 A | 8/1994 | Takagi et al. |
| 5,857,157 A | 1/1999 | Shindo |
| D609,685 S * | 2/2010 | Lin ................ D14/138 AC |
| 2003/0202656 A1 | 10/2003 | Ikeuchi et al. |
| 2004/0127262 A1 | 7/2004 | Ohno |
| 2004/0203523 A1* | 10/2004 | Harmon ................ 455/90.3 |
| 2005/0107137 A1 | 5/2005 | Byun |
| 2005/0137000 A1* | 6/2005 | Toh et al. ............... 455/575.4 |
| 2009/0186663 A1* | 7/2009 | Griffin et al. ............ 455/566 |
| 2009/0221336 A1* | 9/2009 | Zhang et al. ........... 455/575.4 |

FOREIGN PATENT DOCUMENTS

| | | |
|---|---|---|
| CN | 1620238 A | 5/2005 |
| GB | 2 375 683 A | 11/2002 |
| JP | 63-61050 | 4/1988 |
| JP | 4-117848 | 4/1992 |
| JP | 7-013658 | 1/1995 |
| JP | 7-175758 | 7/1995 |
| JP | 7-288860 | 10/1995 |
| JP | 8-335968 | 12/1996 |
| JP | 2002-057771 | 2/2002 |
| JP | 2003-319044 | 11/2003 |
| WO | 2005003947 A2 | 1/2005 |

OTHER PUBLICATIONS

International Search Report Dated Jul. 4, 2006.
Extended European Search Report for EP 06 75 6900 mailed Oct. 27, 2010.

* cited by examiner

STACK TYPE MOBILE TERMINAL

TECHNICAL FIELD

This invention relates to a stack type mobile terminal with a plurality of stacked cabinets rotatable via a shaft along the stack direction.

BACKGROUND ART

In recent years, a revolver type mobile terminal including a main body cabinet having a telephone function, a single option cabinet stacked on the rear of the main body cabinet as a function section is hidden, and a shaft along the stack direction of the main body cabinet and the option cabinet, wherein the main body cabinet and the option cabinet rotate relatively on the shaft, whereby the function section of the option cabinet can be exposed, has been proposed.

In this kind of mobile terminal, the option cabinet is rotated, whereby the function section is exposed, so that a new area for adding the function section can be provided. Accordingly, for example, it is also made possible to install a full keyboard, etc., and the mobile terminal is provided with still more multiple functions and the convenience of the mobile terminal is improved.

Non-patent document 1: au design project, "Konseputo moderu ichiran," "Apollo (2002)," KDDI, [search on Aug. 17, 2004], Internet URL: http:www.au.kddi.com/au_design_project/models/

DISCLOSURE OF THE INVENTION

Problems to be Solved by the Invention

However, in the revolver type mobile terminal in the related art described above, only the single option cabinet that can be exposed is rotatably fixed on the rear of the main body cabinet for the purposes of providing multiple functions and improving convenience and thus the newly expandable area for function section addition is limited.

Further, in recent years, the user's needs have become diversified, advanced, and parallelized and a mobile terminal for enabling the user to select an option cabinet as desired and add a plurality of option cabinets is demanded.

It is therefore an object of the invention to provide a stack type mobile terminal for enabling the user to select any desired option cabinet to be stacked on a main body cabinet and add any desired number of option cabinets.

Means for Solving the Problems

A stack type mobile terminal includes a main body cabinet having a telephone function, an option cabinet stacked on the rear of the main body cabinet, a rotation supporting point shaft provided in the option cabinet along the cabinet stack direction, and rotation supporting point holes made in the main body cabinet and the option cabinet into which the rotation supporting point shaft is inserted, and has a configuration wherein the main body cabinet and the option cabinet can be rotated relatively with the rotation supporting point shaft as the center and a plurality of types of option cabinets can be stacked on the rear of the main body cabinet selectively as many as desired, wherein through contacts for electrically connecting the cabinets are provided on the upper face of the rotation supporting point shaft of the option cabinet and the bottom face of the rotation supporting point hole and signal conduction contacts for bringing the rotated option cabinet into conduction with the main body cabinet and the adjacent option cabinet are provided on the bottom face of the rotation supporting point hole of the main body cabinet and the upper face of the rotation supporting point shaft of the option cabinet, and wherein the through contacts of the adjacent cabinets not relatively rotating are brought into contact with each other and the signal conduction contacts of the option cabinet relatively rotated at a predetermined angle to the main body cabinet are brought into conduction with the signal conduction contacts of the main body cabinet directly or via the through contacts.

According to the configuration, it is made possible to stack as many only necessary option cabinets as the necessary number on the rear of the main body cabinet from among the different types of option cabinets and it is made possible to select and add any desired option cabinet as matched with the user's needs. When adding the option cabinet, the user need not electrically connect the cabinets, and adding the option cabinet is facilitated. Further, when the main body cabinet and the option cabinet or the option cabinets are rotated, as the electrically conducting contact parts, only the minimum necessary contacts are brought into contact with each other, so that abrasion of the contacts can be decreased.

The stack type mobile terminal of the invention includes a movable lock member provided so that it can project from or enter a circumference face of one of the rotation supporting point shaft and the rotation supporting point hole; and a lock groove provided on the circumference face of the other of the rotation supporting point shaft and the rotation supporting point hole, the lock groove that the lock member can engage when the adjacent cabinet does not relatively rotate or when the adjacent cabinet relatively rotates at a predetermined angle, and has a configuration wherein when the selected option cabinet relatively rotates at a predetermined angle, the main body cabinet and the option cabinet or the adjacent option cabinets are locked in a releasable manner.

According to the configuration, a click feeling for informing the user that the selected option cabinet rotates at a predetermined relative angle can be provided and the relative rotation position between the main body cabinet and the option cabinet can be retained at the position.

The stack type mobile terminal of the invention has a configuration wherein a detachable lid member is provided on the rotation supporting point hole of the cabinet to which the adjacent option cabinet is not attached.

According to the configuration, the rotation supporting point hole exposed if no option cabinet is used can be blocked for preventing dust or liquid from entering the rotation supporting point hole, thereby preventing a rotation operation failure or a contact failure.

The stack type mobile terminal of the invention has a configuration wherein the main body cabinet and the option cabinet are provided with option cabinet detection contacts for detecting the type of selected option cabinet when the selected option cabinet relatively rotates at a predetermined angle to the adjacent main body cabinet and the adjacent option cabinet.

According to the configuration, when any desired option cabinet is added, it is made possible to automatically detect the type of selected option cabinet, the need for the user to set the type of option cabinet is eliminated, and selection and addition of an option cabinet by the user can be facilitated.

The stack type mobile terminal of the invention has a configuration wherein the main body cabinet and the option cabinet are provided with angle detection members for detecting the relative rotation angle between the main body cabinet and the option cabinet and between the adjacent option cabinets.

According to the configuration, based on the relative angle of the option cabinet selected by the user, the function of the option cabinet is switched, so that the need for the user to select the option cabinet can be eliminated for enhancing operability and a multifunctional stack type mobile terminal can be implemented.

The stack type mobile terminal of the invention includes a plurality of movable claw members provided so that they can project from or enter a circumference face of one of the rotation supporting point shaft and the rotation supporting point hole; and a claw member engagement groove provided on the circumference face of the other of the rotation supporting point shaft and the rotation supporting point hole, the claw member engagement groove that the plurality of claw members engage, and has a configuration wherein the claw members and the claw member engagement groove retain the adjacent cabinets rotatably.

According to the configuration, the rotation supporting point shaft is inserted into the rotation supporting point hole, whereby the claw members provided on the circumference face of the rotation supporting point shaft and the rotation supporting point hole and the claw member engagement groove engage, and addition of an option cabinet by the user can be facilitated.

The stack type mobile terminal of the invention has a configuration wherein a tap is provided in the center of the rotation supporting point hole of the main body cabinet and the adjacent option cabinet is fixed with a screw to the main body cabinet for rotation and the screw is provided at the center with a tap to which the screw is screwed for fixing the further adjacent option cabinet for rotation.

According to the configuration, any desired number of screws are further screwed to the screw fixing the option cabinet to the main body cabinet, whereby the option cabinets are rotatably stacked and addition of an option cabinet by the user can be facilitated.

Further, the stack type mobile terminal of the invention has a configuration wherein the through contacts, the signal conduction contacts, and the option detection contacts are provided using light emission and reception elements in combination.

According to the configuration, signal transfer between the main body cabinet and the option cabinet and signal transfer between the option cabinets are made possible by non-contact light transfer between the light transmission and reception elements and it is made possible to prevent abrasion of the through contacts, the signal conduction contacts, and option detection contacts.

The invention also provides a mobile terminal having at least a main unit having a telephone function and one or more option units having other functions added to the telephone function of the main unit and stacked on the main unit projectably and detachably, and having a configuration wherein the option units are set so that the option unit near to the main body is the high-order option unit and when the highest-order option unit is projected and is placed in a use mode, information transmission contacts of the option unit are connected directly to information transmission contacts of the main unit to form an information transmission path and when any other option unit than the highest-order option unit is projected and is placed in the use mode, information transmission contacts of the option unit are connected to the information transmission contacts of the main unit via relay contacts of the high-order option unit to form an information transmission path.

Advantages of the Invention

According to the invention, it is made possible to stack as many only necessary option cabinets as the necessary number on the rear of the main body cabinet from among the different types of option cabinets and it is made possible to select and add any desired option cabinet as matched with the user's needs. When adding the option cabinet, the user need not electrically connect the cabinets, and adding the option cabinet is facilitated. Further, a stack type mobile terminal can be provided wherein when the main body cabinet and the option cabinet or the option cabinets are rotated, as the electrically conducting contact parts, only the minimum necessary contacts are brought into contact with each other, so that abrasion of the contacts can be decreased.

The mobile terminal of the invention has the advantages that one or more option units can be detachably and replaceably stacked on the lower face of the main body unit and that it is made possible to add, delete, and change the option unit including any desired function by the user and the ease of use of the mobile terminal improves.

DESCRIPTION OF REFERENCE NUMERALS

Figure 1:
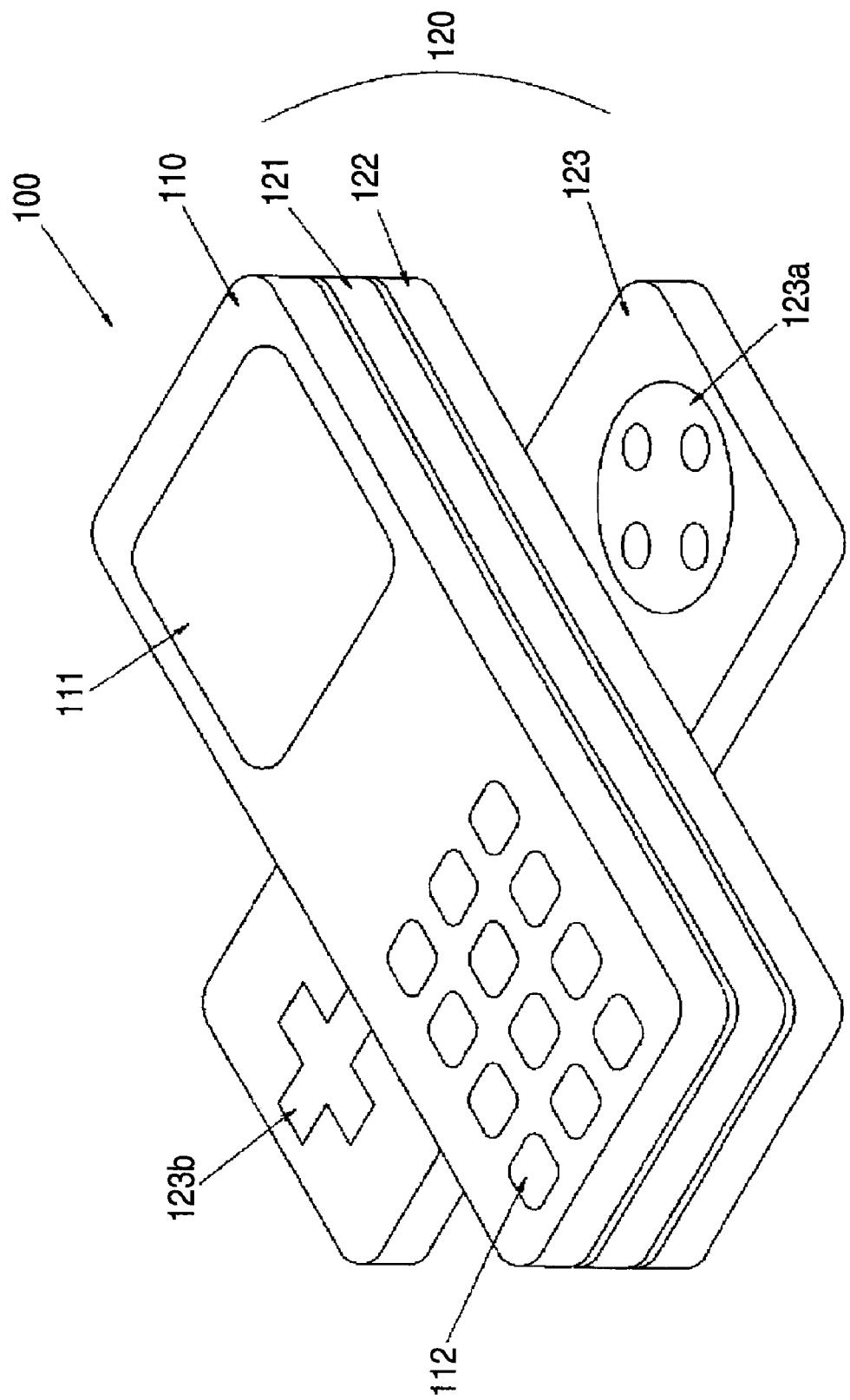
FIG. 1 is a perspective view of the stack type mobile terminal in the first embodiment of the invention.

100 Stack type mobile terminal
110 Main body cabinet
111 Display section
112 Operation section
120 Option cabinet
121 Full keyboard option cabinet
121a Full keyboard
122 Loudspeaker option cabinet
122a Loudspeaker
123 Game option cabinet
123a Input key
123b Crosshair key
124 Camera option cabinet
124a Camera
124b Liquid crystal screen
125 TV option cabinet
125a Liquid crystal screen
126 Slide pad
130 Rotation supporting point shaft
130a Rotation supporting point shaft top face
130b Rotation supporting point shaft circumference face
131 Rotation supporting point hole
131a Rotation supporting point hole bottom face
131b Rotation supporting point hole circumference face
132 Claw member
133 Claw member engagement groove
134 Lock member
135 Lock groove
140 Signal conduction contact spring
141 Through contact
142 Through contact spring
143 Signal conduction contact
150 Contact cover
160 Option cabinet detection contact spring
161 Option cabinet detection through contact
162 Option cabinet detection through contact spring
163 Option cabinet detection contact
171 Angle detection member (hole element)
172 Angle detection member (magnet)
180 Lid member
190 Tap provided in main body cabinet
195 Option cabinet fixing screw insertion hole
200 Stack type mobile terminal
201 Option cabinet fixing screw
201a Screw
201b Tap
300 Stack type mobile terminal
400 Stack type mobile terminal
500 Stack type mobile terminal
600 Stack type mobile terminal
1, 15, 19, 27 Main unit
2, 3, 4, 16, 17, 18, 20, 21, 22, 28 Option unit
5, 25 Shaft support recess part
6, 23 Rotation shaft
7 Groove
8 Claw
9, 11 Relay contact
10, 12 Information transmission contact
13 Engagement part
14 Engaged part 24 Hole element
26 Magnet

BEST MODE FOR CARRYING OUT THE
INVENTION

Embodiments of stack type mobile terminals according to the invention will be discussed with the accompanying drawings.

FIGS. 1 to 9 show a first embodiment of a stack type mobile terminal according to the invention.

Figure 2:
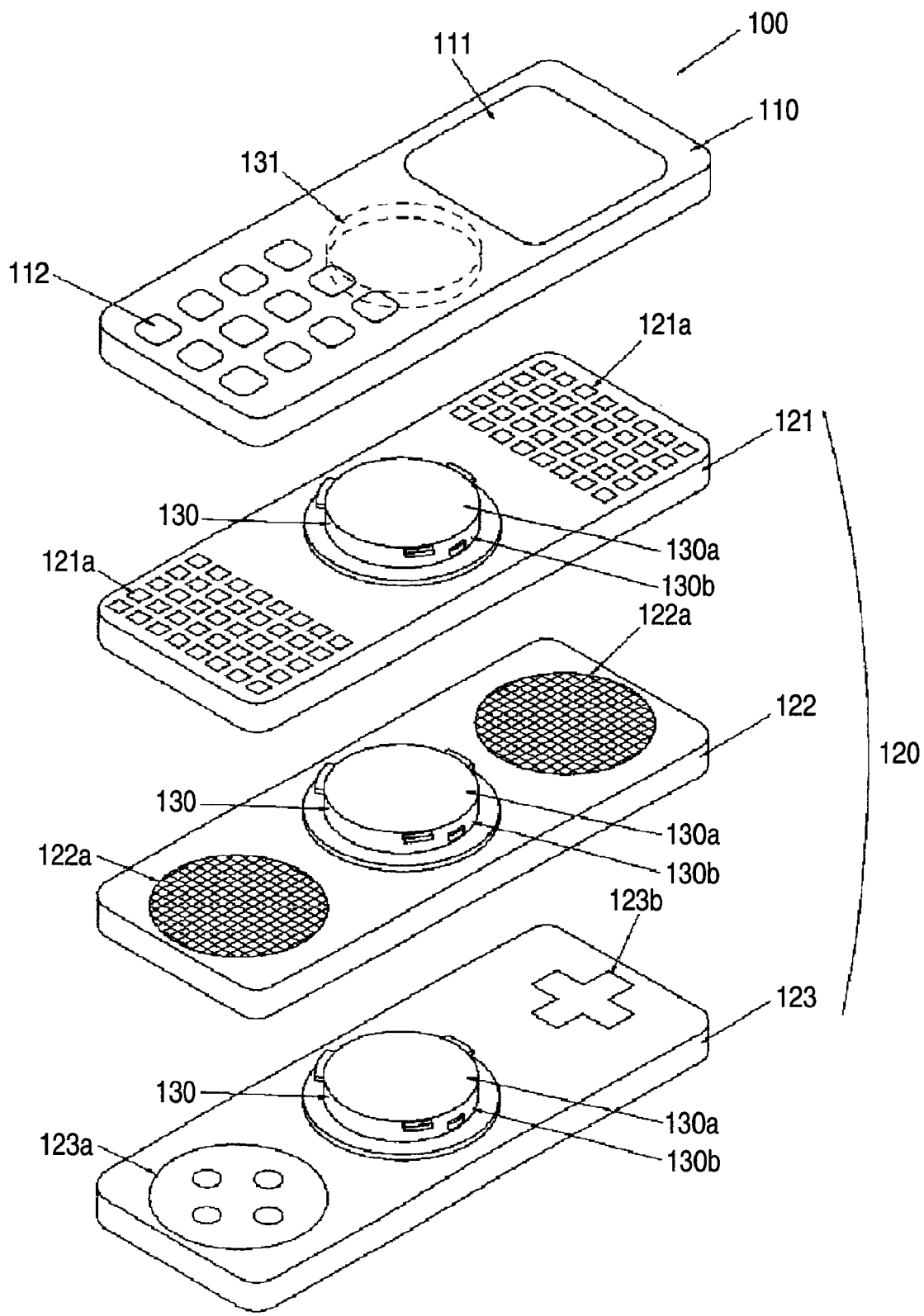
FIG. 2 is an exploded perspective view of the stack type mobile terminal in the first embodiment of the invention.
Figure 3:
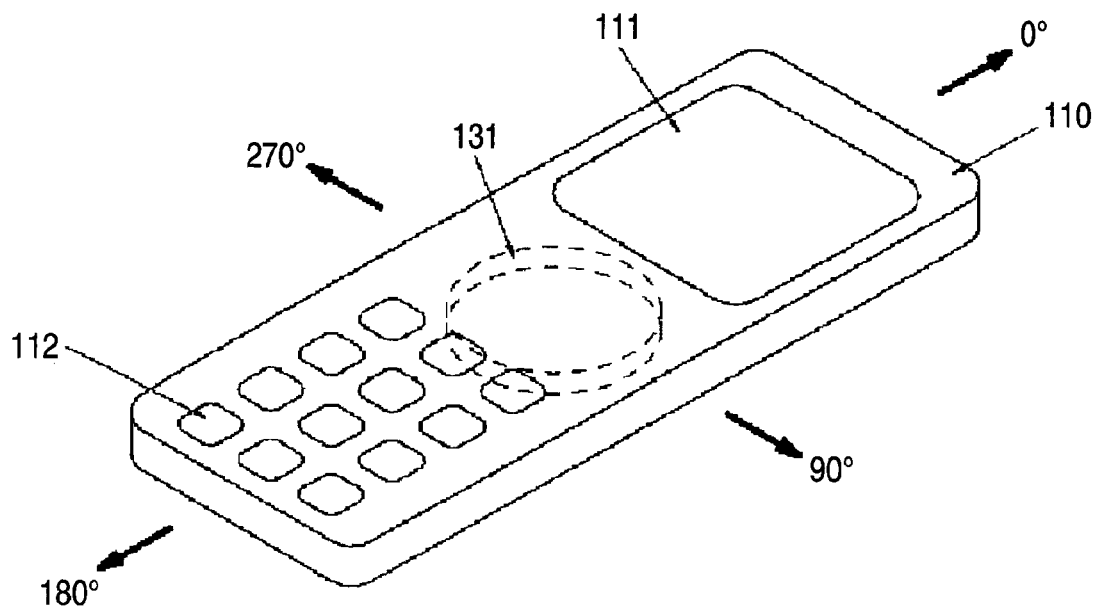
FIG. 3 is a perspective view to show the top face of a main body cabinet of the stack type mobile terminal in the first embodiment of the invention.
Figure 4:
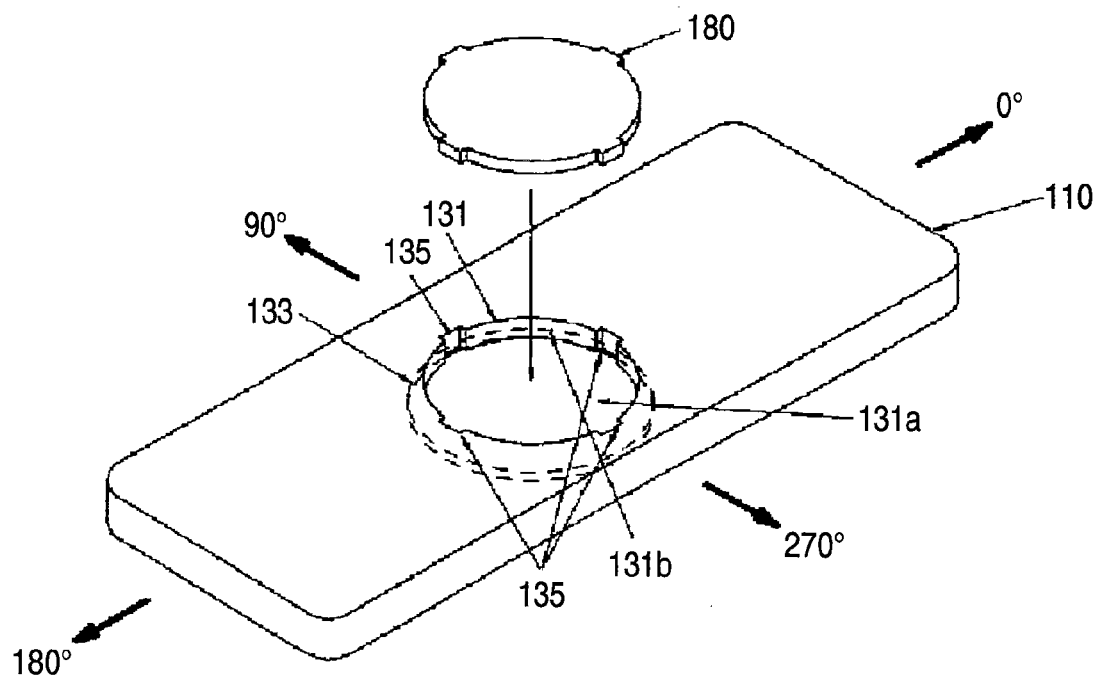
FIG. 4 is a perspective view to show the bottom face of the main body cabinet of the stack type mobile terminal in the first embodiment of the invention.
Figure 5:
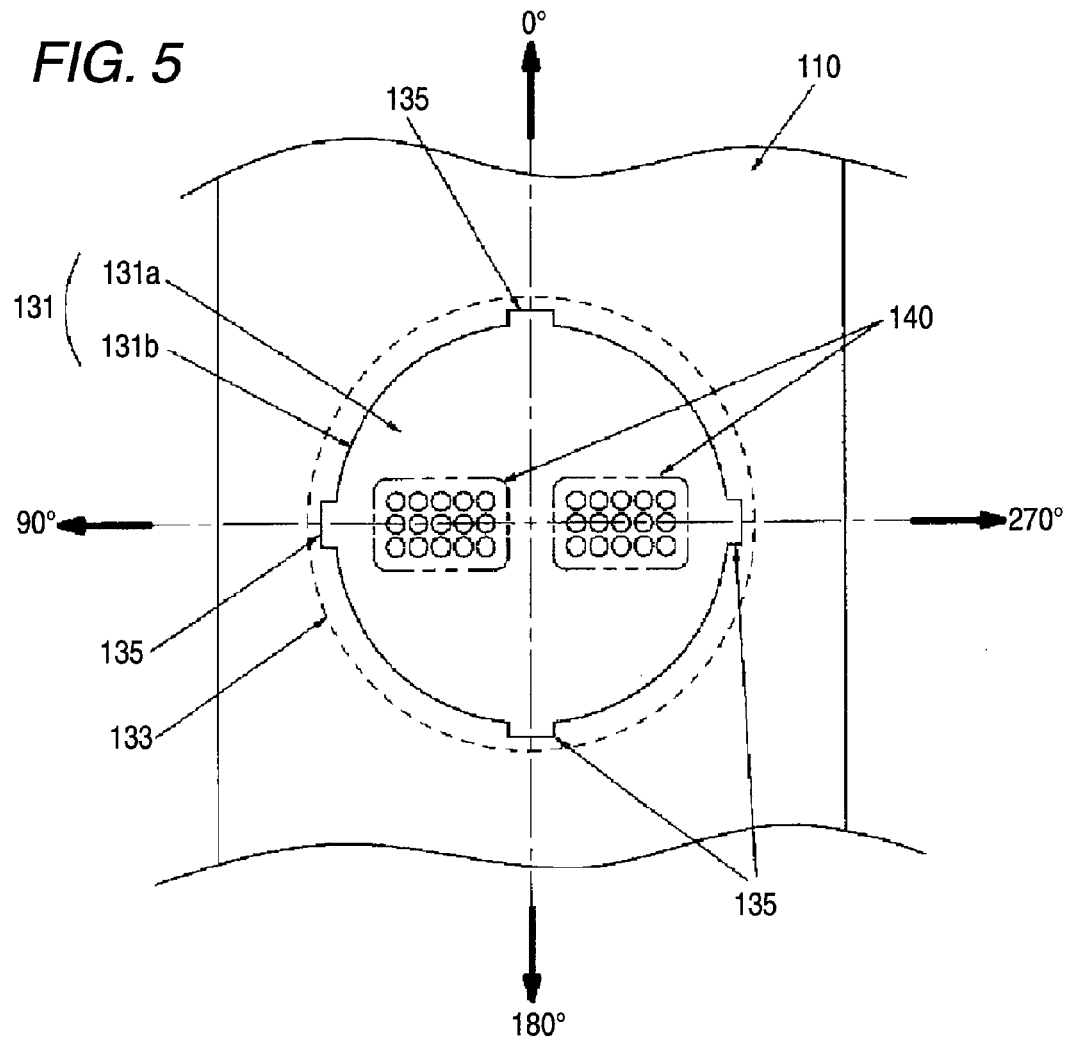
FIG. 5 is a bottom view to show a rotation supporting point hole made in the main body cabinet of the stack type mobile terminal in the first embodiment of the invention.
Figure 6:
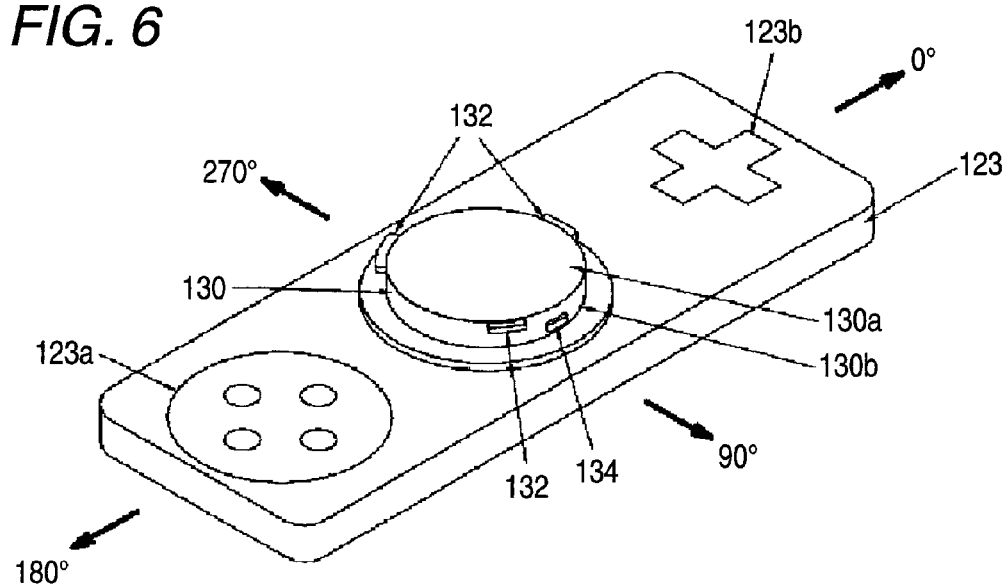
FIG. 6 is a perspective view to show the top face of an option cabinet of the stack type mobile terminal in the first embodiment of the invention.
Figure 7:
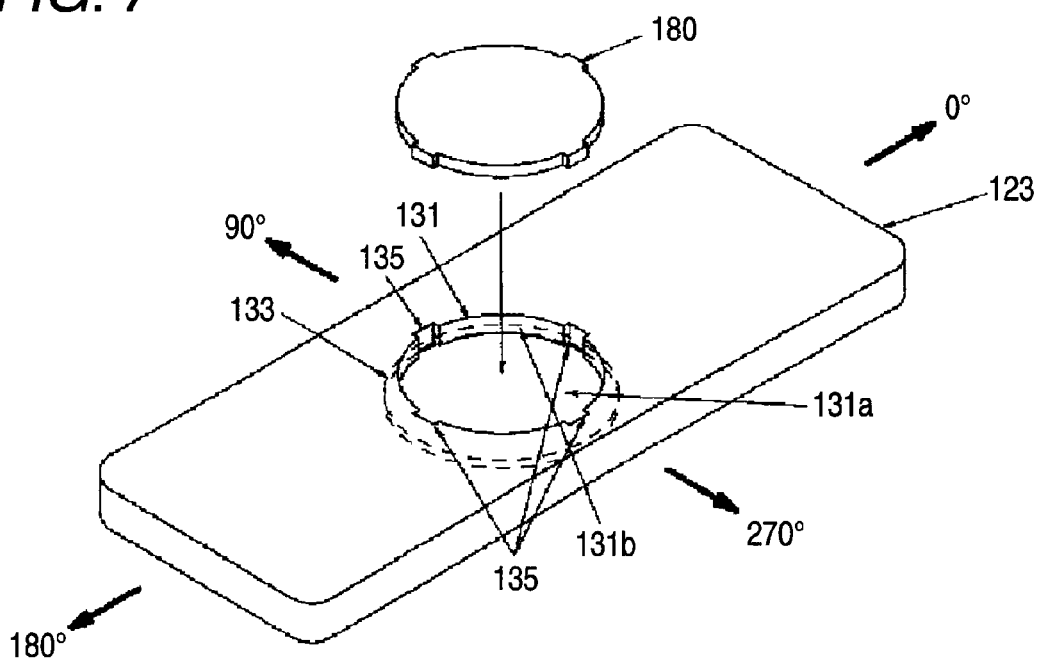
FIG. 7 is a perspective view to show the bottom face of the option cabinet of the stack type mobile terminal in the first embodiment of the invention.
Figure 8:
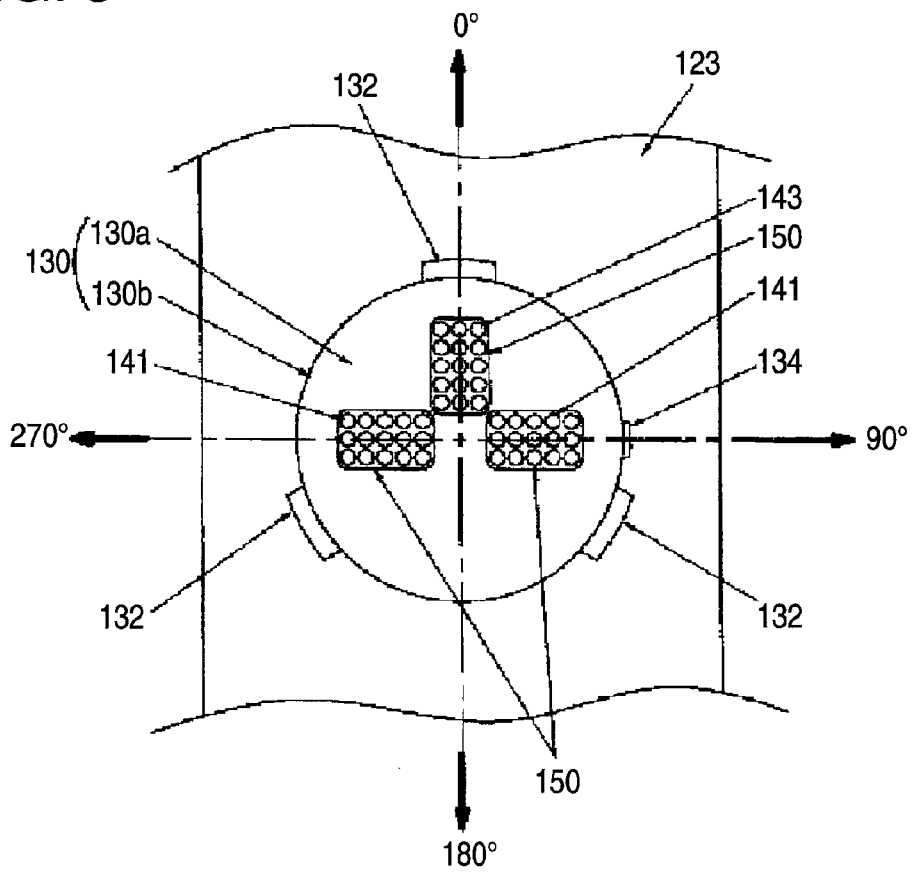
FIG. 8 is a top view to show a rotation supporting point shaft provided in the option cabinet of the stack type mobile terminal in the first embodiment of the invention.
Figure 9:
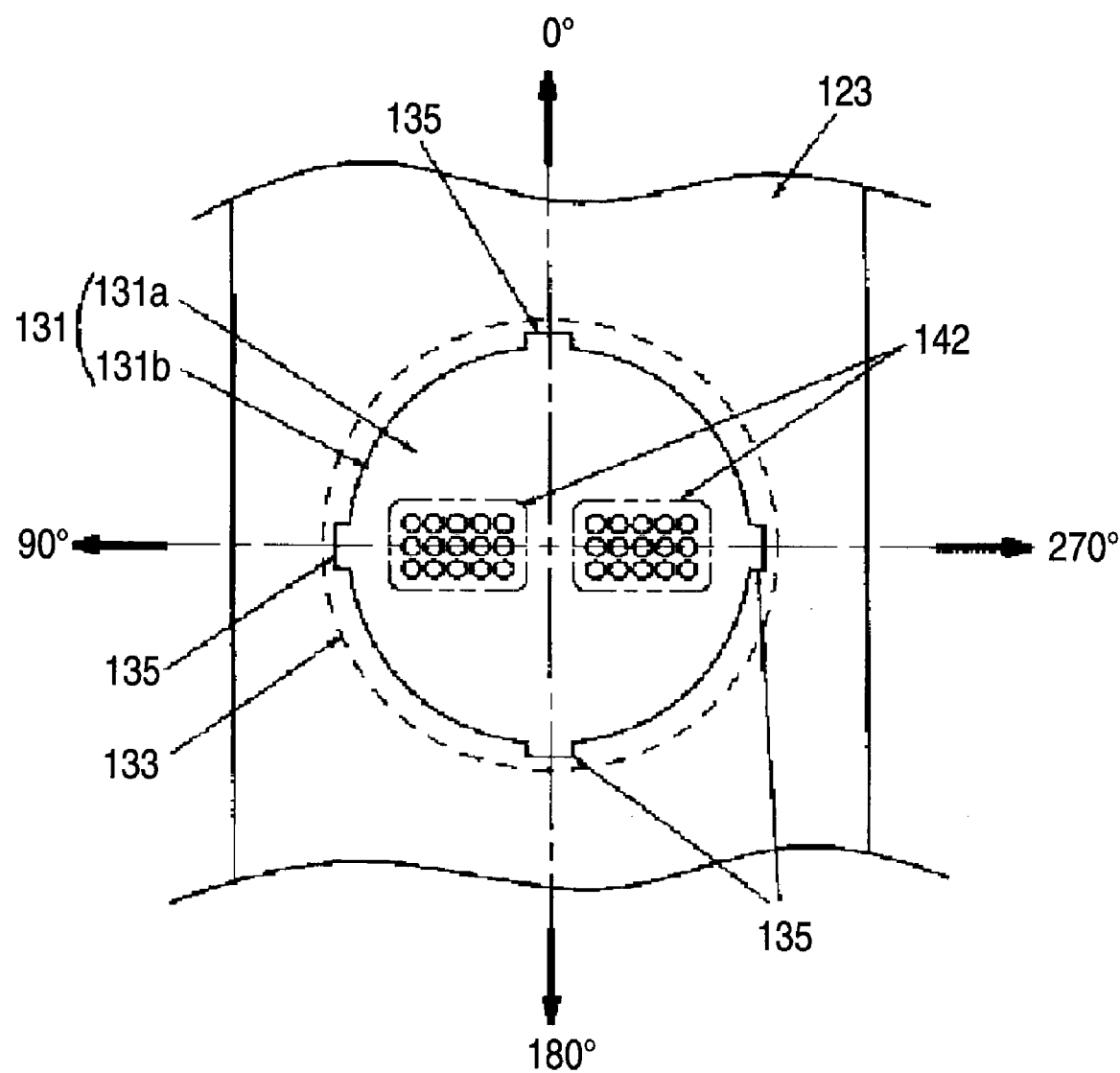
FIG. 9 is a bottom view to show a rotation supporting point hole made in the option cabinet of the stack type mobile terminal in the first embodiment of the invention.

FIG. 1 is a perspective view of the stack type mobile terminal in the first embodiment of the invention, FIG. 2 is an exploded perspective view of the stack type mobile terminal in the first embodiment of the invention, FIG. 3 is a perspective view to show the top face of a main body cabinet of the stack type mobile terminal in the first embodiment of the invention, FIG. 4 is a perspective view to show the bottom face of the main body cabinet of the stack type mobile terminal in the first embodiment of the invention, FIG. 5 is a bottom view to show a rotation supporting point hole made in the main body cabinet of the stack type mobile terminal in the first embodiment of the invention, FIG. 6 is a perspective view to show the top face of an option cabinet of the stack type mobile terminal in the first embodiment of the invention, FIG. 7 is a perspective view to show the bottom face of the option cabinet of the stack type mobile terminal in the first embodiment of the invention, FIG. 8 is a top view to show a rotation supporting point shaft provided in the option cabinet of the stack type mobile terminal in the first embodiment of the invention, and FIG. 9 is a bottom view to show a rotation supporting point hole made in the option cabinet of the stack type mobile terminal in the first embodiment of the invention.

A stack type mobile terminal 100 in the embodiment is made up of a main body cabinet 110 functioning as a telephone and a plurality of option cabinets 120 stacked on the rear of the main body cabinet 110 as each function section is hidden. The main body cabinet 110 includes at least a display section 111 and an operation section 112 used for usual telephone conversation operation. The main body cabinet 110 also includes a telephone reception section, a telephone transmission section, an incoming loudspeaker, a transmission-reception section, a data conversion section, a voice processing section, an image processing section, and an information record section not shown.

As shown in FIGS. 1 and 2, a full keyboard option cabinet 121 including a full keyboard 121a, a loudspeaker option cabinet 122 including loudspeakers 122a, a game option cabinet 123 including an input key 123a and a crosshair key 123b, and the like can be named as the option cabinets 120. As other examples, a camera option cabinet 124 including a camera 124a and a liquid crystal screen 124b shown in FIGS. 20 to 25, a TV option cabinet 125 including a liquid crystal screen 125a shown in FIGS. 26 and 27, an option cabinet including a slide pad 126 shown in FIG. 33, and the like can be named.

As shown in FIGS. 2 to 5, the main body cabinet 110 is provided with a rotation supporting point hole 131 into which a rotation supporting point shaft 130 provided in the cabinets making up the option cabinets 120 (for example, the full keyboard option cabinet 121, the loudspeaker option cabinet 122, and the game option cabinet 123) is inserted, and a claw member engagement groove 133 shown in FIG. 4 in the vicinity of a bottom face 131a of the rotation supporting point hole 131.

As shown in FIGS. 7 to 9, each of the cabinets making up the option cabinets 120 (for example, the full keyboard option cabinet 121, the loudspeaker option cabinet 122, and the game option cabinet 123) is also provided with a rotation supporting point hole 131 into which the rotation supporting point shaft 130 is inserted, and a claw member engagement groove 133 in the vicinity of a bottom face 131a of the rotation supporting point hole 131.

As shown in FIG. 6, a plurality of claw members 132 that can project from and enter a circumference face 130b of the rotation supporting point shaft 130 are provided in the vicinity of a top face 130a of the rotation supporting point shaft 130 provided in the cabinets making up the option cabinets 120 (for example, the full keyboard option cabinet 121, the loudspeaker option cabinet 122, and the game option cabinet 123). The plurality of claw members 132 are urged by elastic parts not shown in the projecting direction from the circumference face 130b of the rotation supporting point shaft 130.

For the main body cabinet 110 and the cabinets making up the option cabinets 120 (for example, the full keyboard option cabinet 121, the loudspeaker option cabinet 122, and the game option cabinet 123), the rotation supporting point shafts 130 are inserted into the rotation supporting point holes 131 and the claw members 132 engage the claw member engagement groove 133, whereby the adjacent option cabinets 120 are rotatably fixed relative to the main body cabinet 110. For the cabinets making up the option cabinets 120, the rotation supporting point shafts 130 are inserted into the rotation supporting point holes 131 and the claw members 132 engage the claw member engagement groove 133, whereby another adjacent option cabinet is rotatably fixed relative to one adjacent option cabinet.

When the cabinets making up the option cabinets 120 (for example, the full keyboard option cabinet 121, the loudspeaker option cabinet 122, and the game option cabinet 123) are attached or detached, the user operates a claw member entry mechanism not shown, thereby causing the claw members 132 to enter the circumference face 130b of the rotation supporting point shaft 130, and the load when the option cabinets 120 are attached or detached can be decreased.

The rotation supporting point shafts 130 and the claw members 132 and the rotation supporting point holes 131 and the claw member engagement grooves 133 are unified in the main body cabinet 110 and all the cabinets making up the option cabinets 120 (for example, the full keyboard option cabinet 121, the loudspeaker option cabinet 122, and the game option cabinet 123).

This means that the stack type mobile terminal is configured so that as many only necessary option cabinets as the necessary number can be stacked on the rear of the main body cabinet 110 from among the different types of option cabinets 120.

As shown in FIG. 5, a plurality of signal conduction contact springs 140 for electric conduction with the option cabinets 120 to supply power to the option cabinets 120 or transmit an electric signal generated by operation on the option cabinet 120 to the main body cabinet 110 are provided on the bottom face 131a of the rotation supporting point hole 131 made in the main body cabinet 110.

As shown in FIG. 8, a plurality of through contacts 141 and a plurality of signal conduction contacts 143 for coming in contact with the plurality of signal conduction contact springs 140 provided on the main body cabinet 110 and electric conduction with the option cabinets 120 to supply power to the option cabinets 120 or transmit an electric signal generated by operation on the option cabinet 120 to the main body cabinet 110 are provided on the top face 130a of the rotation supporting point shaft 130 provided in each of all the cabinets making up the option cabinets 120 (for example, the full keyboard option cabinet 121, the loudspeaker option cabinet 122, and the game option cabinet 123).

Contact covers 150 are provided on the periphery of the through contacts 141 and the signal conduction contacts 143, so that the through contacts 141 and the signal conduction contacts 143 do not project to the surface of the option cabinet 120.

As shown in FIG. 9, a plurality of through contact springs 142 for coming in contact with the through contacts 141 and the signal conduction contacts 143 provided in the adjacent option cabinet 120 and electric conduction with the option cabinets 120 to supply power to the option cabinets 120 or transmit an electric signal generated by operation on the option cabinet 120 to the main body cabinet 110 are provided on the bottom face 131a of the rotation supporting point hole 130 provided in each of all the cabinets making up the option cabinets 120 (for example, the full keyboard option cabinet 121, the loudspeaker option cabinet 122, and the game option cabinet 123).

The through contacts 141 and the through contact springs 142 provided in each of all the cabinets making up the option cabinets 120 (for example, the full keyboard option cabinet 121, the loudspeaker option cabinet 122, and the game option cabinet 123) are configured so that the through contact 141 and the through contact spring 142 are electrically directly connected via a bus bar, etc.

The signal conduction contacts 143 provided in each of all the cabinets making up the option cabinets 120 (for example, the full keyboard option cabinet 121, the loudspeaker option cabinet 122, and the game option cabinet 123) are configured so as to transmit an electric signal generated by operation on the option cabinet 120 to the main body cabinet 110 or the adjacent option cabinet 120.

Next, the positions of the signal conduction contact springs 140, the through contacts 141, the through contact springs 142, and the signal conduction contacts 143 will be discussed with FIGS. 1, 3, 4, 5, 6, 7, 8, and 9.

As shown in FIGS. 1 and 2, the option cabinets 120 are stacked on the rear of the main body cabinet 110 in the order of the full keyboard option cabinet 121, the loudspeaker option cabinet 122, and the game option cabinet 123, and the function section of the game option cabinet 123 (the input key 123a and the crosshair key 123b) stacked at the bottom stage is retained in a state in which it is exposed from the main body cabinet 110 (the relative angle to the main body cabinet 110 is 270°).

If the user operates the function section of the game option cabinet 123 (the input key 123a or the crosshair key 123b), an electric signal is transmitted to the signal conduction contact 143 provided on the top face 130a of the rotation supporting point shaft 130 of the game option cabinet 123.

In this state, the signal conduction contact 143 of the game option cabinet 123 and the through contact springs 142 of the adjacent loudspeaker option cabinet 122 are in contact with each other and the electric signal generated when the user operates the function section of the game option cabinet 123 (the input key 123a or the crosshair key 123b) is transmitted to the through contact springs 142 of the loudspeaker option cabinet 122.

Further, as the through contacts 141 provided on the loudspeaker option cabinet 122 and the through contact springs 142 provided on the loudspeaker option cabinet 122, the through contacts 141 and the through contact springs 142 as surface and back pairs are electrically directly connected and thus the electric signal generated when the user operates the function section of the game option cabinet 123 (the input key 123a or the crosshair key 123b) is transmitted to the through contacts 141 provided on the loudspeaker option cabinet 122.

As similar electric connection is made, the electric signal generated when the user operates the function section of the game option cabinet 123 (the input key 123a or the crosshair key 123b) is transmitted to the through contacts 141 provided on the full keyboard option cabinet 121.

Further, in this state, the through contacts 141 provided on the full keyboard option cabinet 121 and the signal conduction contact springs 140 provided on the main body cabinet 110 are in contact with each other, whereby the electric signal generated when the user operates the function section of the game option cabinet 123 (the input key 123a or the crosshair key 123b) is transmitted to the main body cabinet 110 and the operation performed on the function section of the game option cabinet 123 (the input key 123a or the crosshair key 123b) can be electrically recognized.

Power supply from the main body cabinet 110 to the game option cabinet 123 is transmitted in the reverse order to that described above. If the user selects and rotates another option cabinet 120 (the full keyboard option cabinet 121 or the loudspeaker option cabinet 122), the function section of only the rotated option cabinet 120 can be operated as similar electric connection is made.

In the placement of the contacts and the contact springs of the embodiment, if the user rotates any option cabinet 120 to the position where the relative angle to the main body cabinet 110 or the adjacent option cabinet is 90°, the user can also operate the function section of the option cabinet 120 in a similar manner.

That is, in the 270° relative rotation, the signal conduction contact 143 connects to the through contact spring 142 on the right of FIG. 9 and in the 90° relative rotation, the signal conduction contact 143 connects to the through contact spring 142 on the left of FIG. 9.

In the placement of the contacts and the contact springs of the embodiment, if the option cabinet with the function section hidden by the main body cabinet 110 (for example, the full keyboard option cabinet 121, the loudspeaker option cabinet 122 in FIG. 1) is rotated to the position where the relative angle to the main body cabinet 110 or the adjacent option cabinet is 180°, similar electric connection can also be realized.

The positions, the shapes, and the quantities of the signal conduction contact springs 140, the through contacts 141, the through contact springs 142, and the signal conduction contacts 143 are unified in the main body cabinet 110 and all the cabinets making up the option cabinets 120 (for example, the full keyboard option cabinet 121, the loudspeaker option cabinet 122, and the game option cabinet 123), and the stack type mobile terminal is configured so that as many only necessary option cabinets as the necessary number can be stacked on the rear of the main body cabinet 110 from among the different types of option cabinets 120.

The height relationship among the signal conduction contact springs 140, the through contacts 141, the through contact springs 142, the signal conduction contacts 143, the rotation supporting point shaft 130, and the rotation supporting point hole 131 is set so that each contact and each contact spring come in contact with each other in a state in which the relative angle between the main body cabinet 110 and the option cabinet 120 or between the option cabinets 120 is, for example, 0°, 90°, 180°, or 270° and that each contact spring and the top face 130a of the rotation supporting point shaft 130 do not come in contact with each other and each contact spring and the bottom face 131b of the rotation supporting point hole 131 do not come in contact with each other at the rotation time to a predetermined angle. Accordingly, abrasion of each contact and each contact spring caused by the rotation operation can be decreased.

The circumference face 130*b* of the rotation supporting point shaft 130 provided in each of all the cabinets making up the option cabinets 120 (for example, the full keyboard option cabinet 121, the loudspeaker option cabinet 122, and the game option cabinet 123) is provided with a lock member 134 that can project from and enter the circumference face 130*b* of the rotation supporting point shaft 130. The lock member 134 is urged by an elastic part not shown in the projecting direction from the circumference face 130*b* of the rotation supporting point shaft 130.

A plurality of lock grooves 135 are provided on the circumference face 131*b* of the rotation supporting point hole 131 made in the main body cabinet 110 and each of all the cabinets making up the option cabinets 120 (for example, the full keyboard option cabinet 121, the loudspeaker option cabinet 122, and the game option cabinet 123).

The lock member 134 and the plurality of lock grooves 135 are placed so as to lock so that relative rotation between the cabinets can be released as the lock member 134 engages the lock groove 135 in a state in which the relative angle between the main body cabinet 110 and the option cabinet 120 or between the adjacent option cabinets 120 is, for example, 0°, 90°, 180°, or 270°.

Accordingly, when the main body cabinet 110 and the option cabinet 120 or the adjacent option cabinets 120 rotate at a predetermined relative angle, a click feeling for informing the user of a predetermined position can be provided and the contact between each contact and each contact spring can also be ensured.

During rotation before arrival at a predetermined relative angle, the lock member 134 comes in contact with the circumference face 131*b* of the rotation supporting point hole 131, whereby it retracts into the circumference face of the rotation supporting point shaft 130 and the load of the rotation operation is decreased.

The positions, the shapes, and the quantities of the lock member 134 and the lock grooves 135 are unified in the main body cabinet 110 and all the cabinets making up the option cabinets 120 (for example, the full keyboard option cabinet 121, the loudspeaker option cabinet 122, and the game option cabinet 123), and the stack type mobile terminal is configured so that as many only necessary option cabinets as the necessary number can be stacked on the rear of the main body cabinet 110 from among the different types of option cabinets 120.

The rotation supporting point hole 131 made in the cabinet placed at the bottom stage of the option cabinets 120 (for example, the game option cabinet 123) is blocked by a lid member 180 for preventing dust or liquid from entering the rotation supporting point hole.

Likewise, to use the main body cabinet 110 solely, the rotation supporting point hole 131 made in the main body cabinet 110 is blocked by a lid member 180. Likewise, the rotation supporting point hole 131 made in the option cabinet 120 not used can also be blocked by a lid member 180, enabling dust or liquid to be prevented from entering the rotation supporting point hole 131 at the storage time.

The stack type mobile terminal 100 makes it possible to stack as many only necessary option cabinets as the necessary number on the rear of the main body cabinet 110 from among the different types of option cabinets 120, and makes it possible to select and add any desired option cabinet 120 as matched with the user's needs.

When adding the option cabinet 120, the user need not electrically connect the cabinets, and adding the option cabinet 120 is facilitated.

Further, when the main body cabinet 110 and the option cabinet 120 or the option cabinets 120 are rotated, as the electrically conducting contact parts, only the minimum necessary contacts are brought into contact with each other, so that abrasion of the contacts can be decreased.

In the embodiment, locking between the cabinets is executed and each contact and each contact spring are brought into contact with each other in a state in which the relative angle between the main body cabinet 110 and the option cabinet 120 or between the adjacent option cabinets 120 is 0°, 90°, 180°, or 270°. However, in addition, the stack type mobile terminal according to the invention may adopt another locking and contact configuration for setting any desired relative angle and implementing it.

In the embodiment, locking between the cabinets is executed and each contact and each contact spring are brought into contact with each other in a state in which the relative angle between the main body cabinet 110 and the option cabinet 120 or between the adjacent option cabinets 120 is 0°, 90°, 180°, or 270°. However, the stack type mobile terminal according to the invention may adopt a locking and contact configuration for setting any desired relative angle and making it possible to use a plurality of option cabinets 120 at the same time at a predetermined relative angle.

According to such a configuration, for example, the upper loudspeaker option cabinet 122 and the lower game option cabinet 123 are stacked with the top cabinet down and both the cabinets 123 and 122 are rotated relatively to the main body cabinet 110, whereby it is made possible to output sound generated by operating the game option cabinet 123 from the loudspeaker option cabinet 122.

In the embodiment, the rotation supporting point shaft 130 is provided with each contact and the rotation supporting point hole 131 is provided with each contact spring, but the stack type mobile terminal according to the invention may adopt a configuration in which the rotation supporting point shaft 130 is provided with each contact spring and the rotation supporting point hole 131 is provided with each contact.

In the embodiment, the rotation supporting point shaft 130 is provided with the plurality of claw members 132 and the rotation supporting point hole 131 is provided with the claw member engagement groove 133, but the stack type mobile terminal according to the invention may adopt a configuration in which the rotation supporting point shaft 130 is provided with the claw member engagement groove 133 and the rotation supporting point hole 131 is provided with the plurality of claw members 132.

In the embodiment, the rotation supporting point shaft 130 is provided with the lock member 134 and the rotation supporting point hole 131 is provided with the plurality of lock grooves 135, but the stack type mobile terminal according to the invention may adopt a configuration in which the rotation supporting point shaft 130 is provided with the plurality of lock grooves 135 and the rotation supporting point hole 131 is provided with the lock member 134.

In the embodiment, the contacts and the contact springs paired with the contacts are provided for electric conduction, but the stack type mobile terminal according to the invention may adopt a configuration in which a plurality of light transmission elements and light reception elements paired with the light transmission elements may be provided for electric conduction.

Accordingly, signal transfer between the main body cabinet and the option cabinet and signal transfer between the option cabinets are made possible by non-contact light transfer between the light transmission and reception elements and it is made possible to prevent abrasion of the through contacts, the signal conduction contacts, and option detection contacts.

Next, FIGS. 10 to 16 show a second embodiment of a stack type mobile terminal according to the invention.

Figure 10:
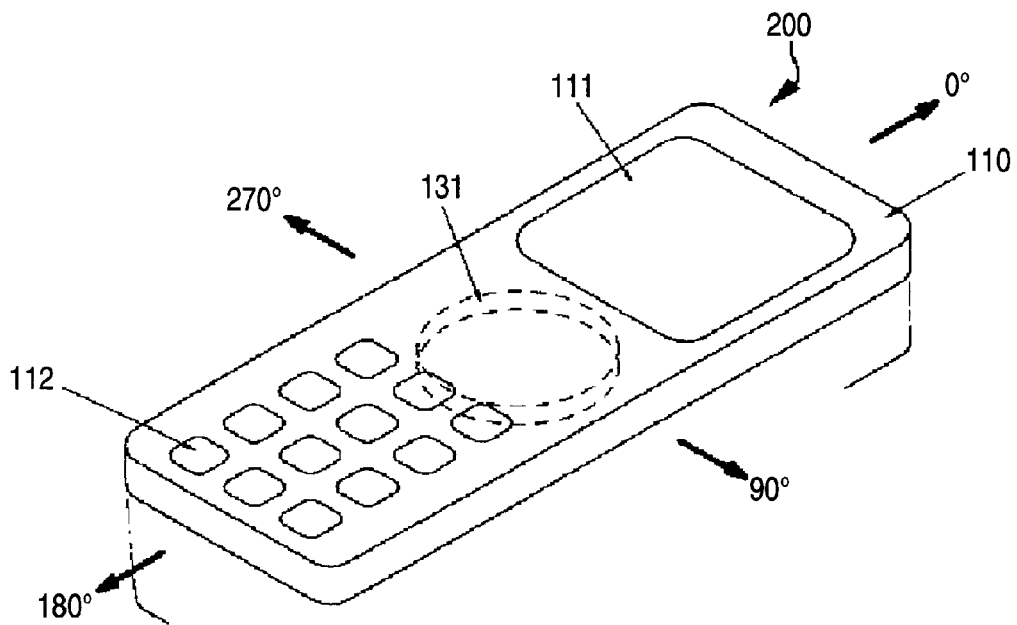
FIG. 10 is a perspective view to show the top face of a main body cabinet of the stack type mobile terminal in a second embodiment of the invention.
Figure 11:
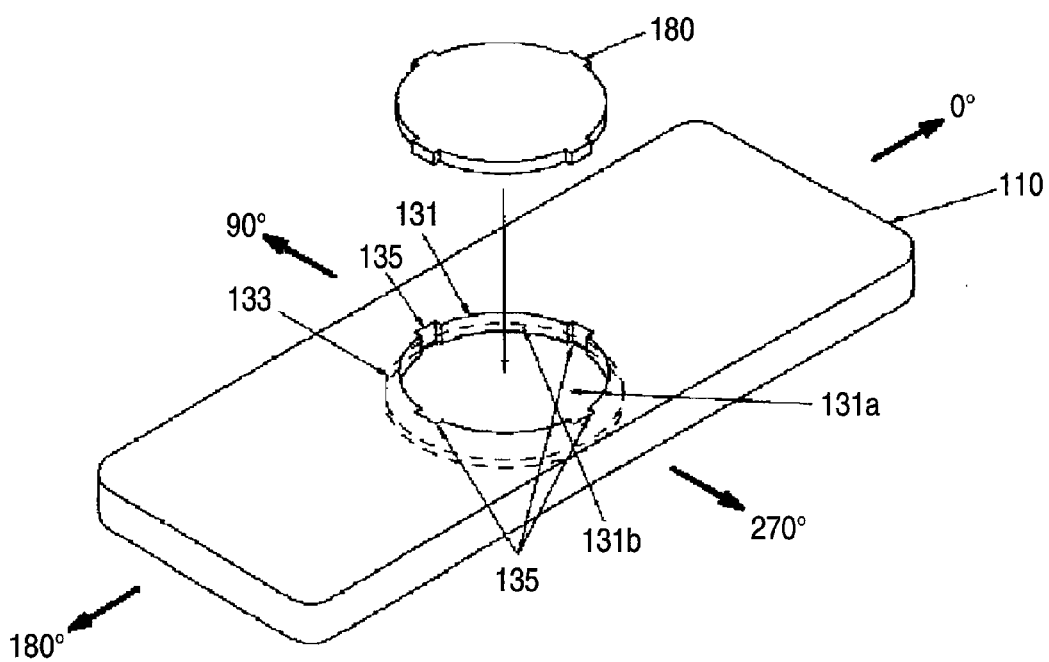
FIG. 11 is a perspective view to show the bottom face of the main body cabinet of the stack type mobile terminal in the second embodiment of the invention.
Figure 12:
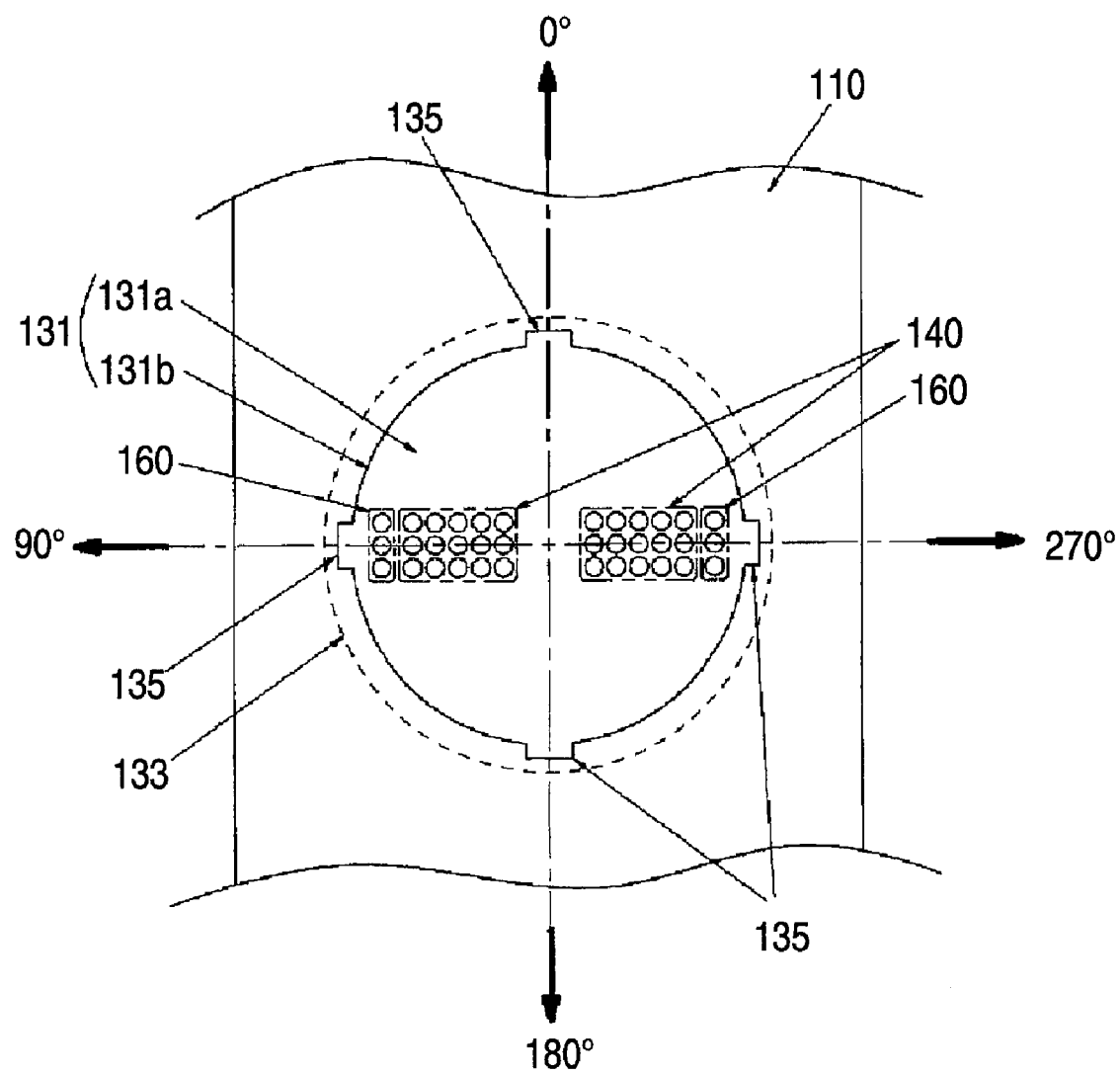
FIG. 12 is a bottom view to show a rotation supporting point hole made in the main body cabinet of the stack type mobile terminal in the second embodiment of the invention.
Figure 13:
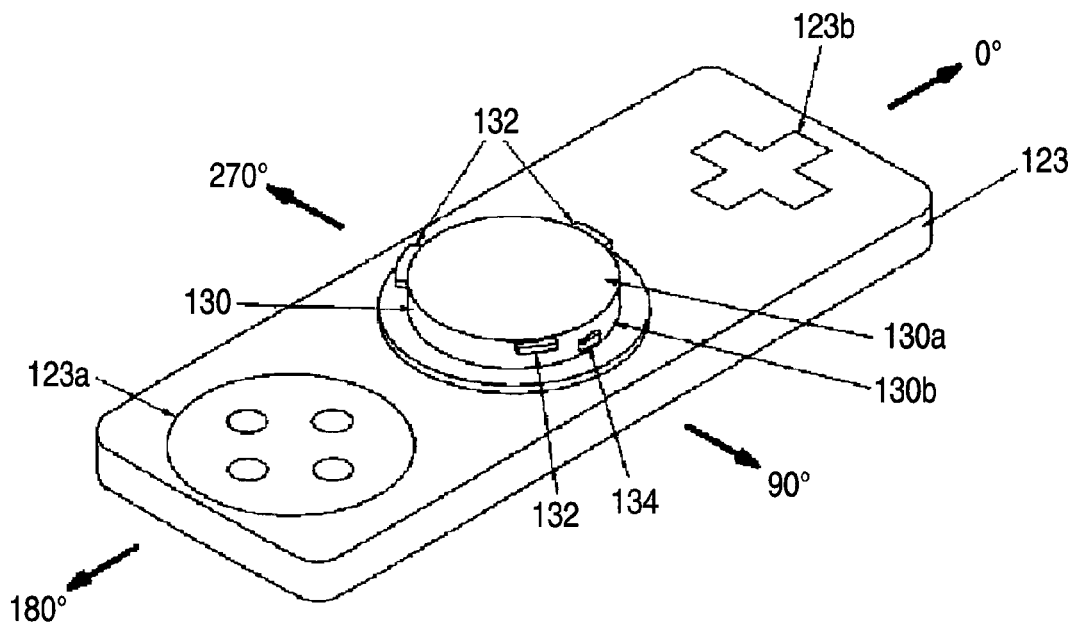
FIG. 13 is a perspective view to show the top face of an option cabinet of the stack type mobile terminal in the second embodiment of the invention.
Figure 14:
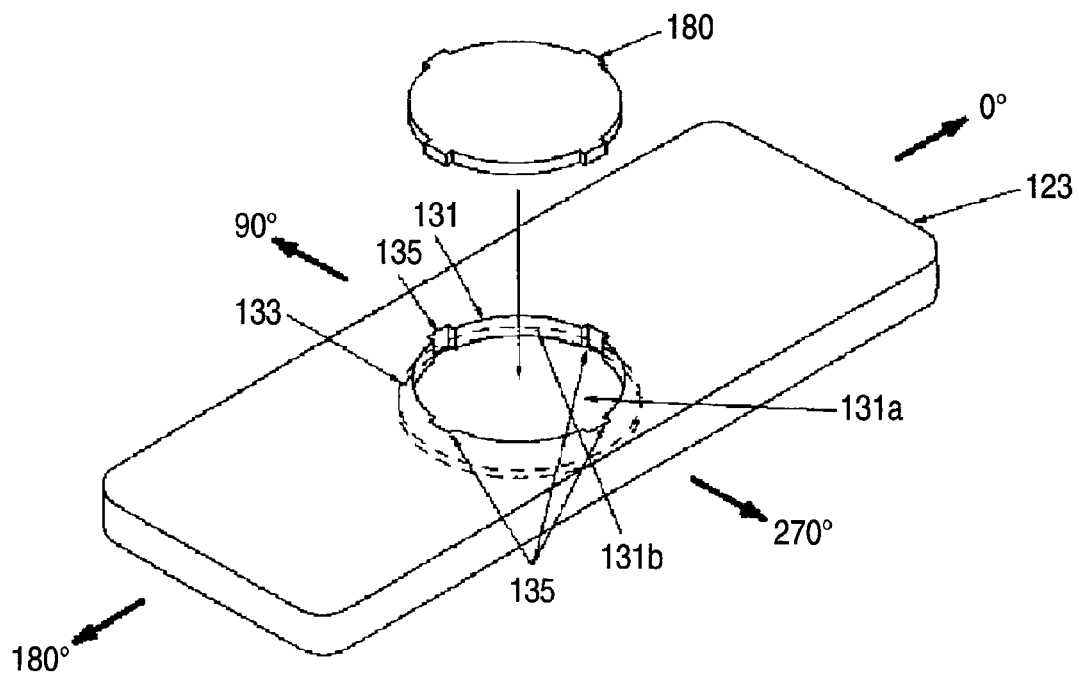
FIG. 14 is a perspective view to show the bottom face of the option cabinet of the stack type mobile terminal in the second embodiment of the invention.
Figure 15:
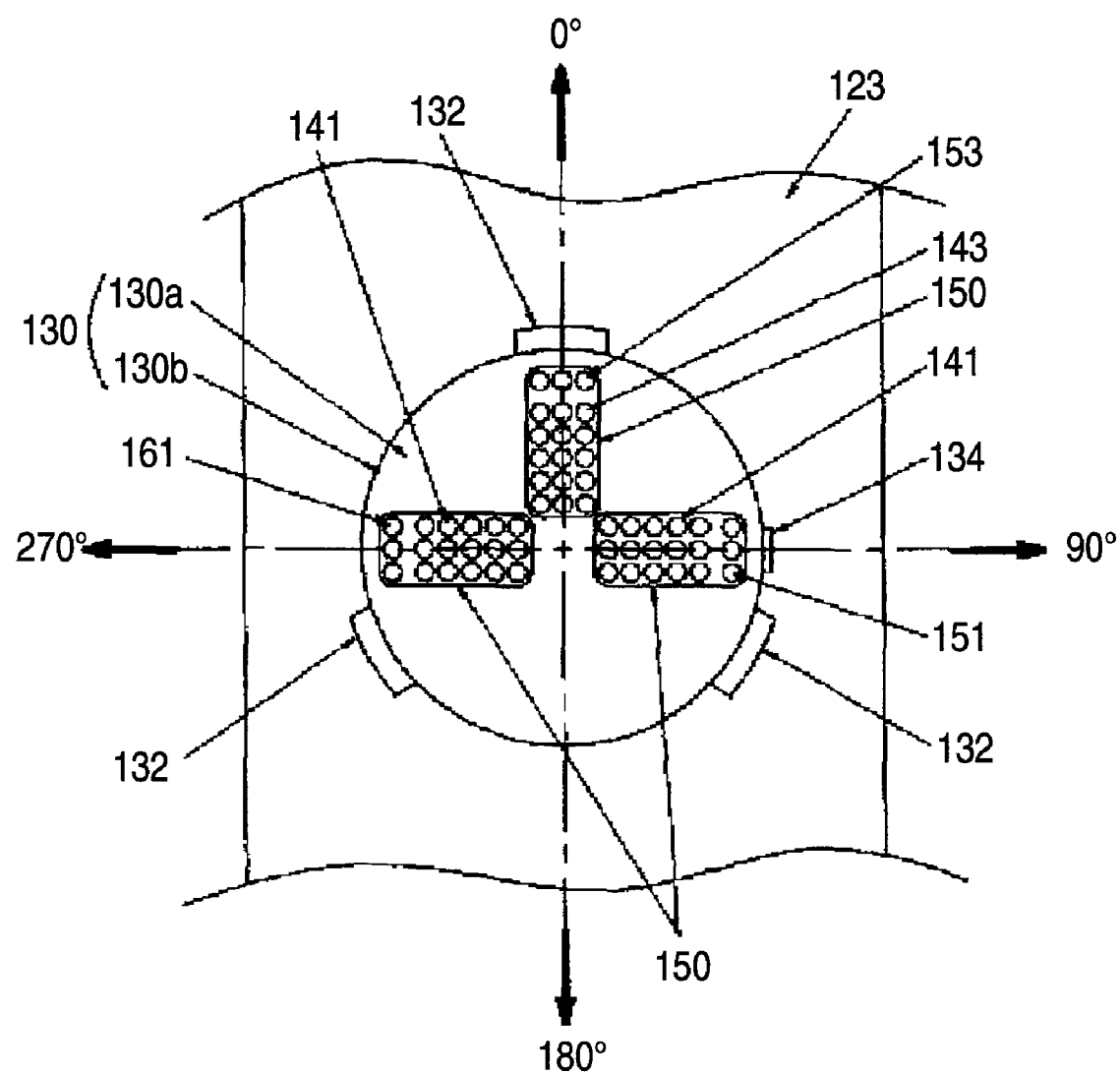
FIG. 15 is a top view to show a rotation supporting point shaft provided in the option cabinet of the stack type mobile terminal in the second embodiment of the invention.
Figure 16:
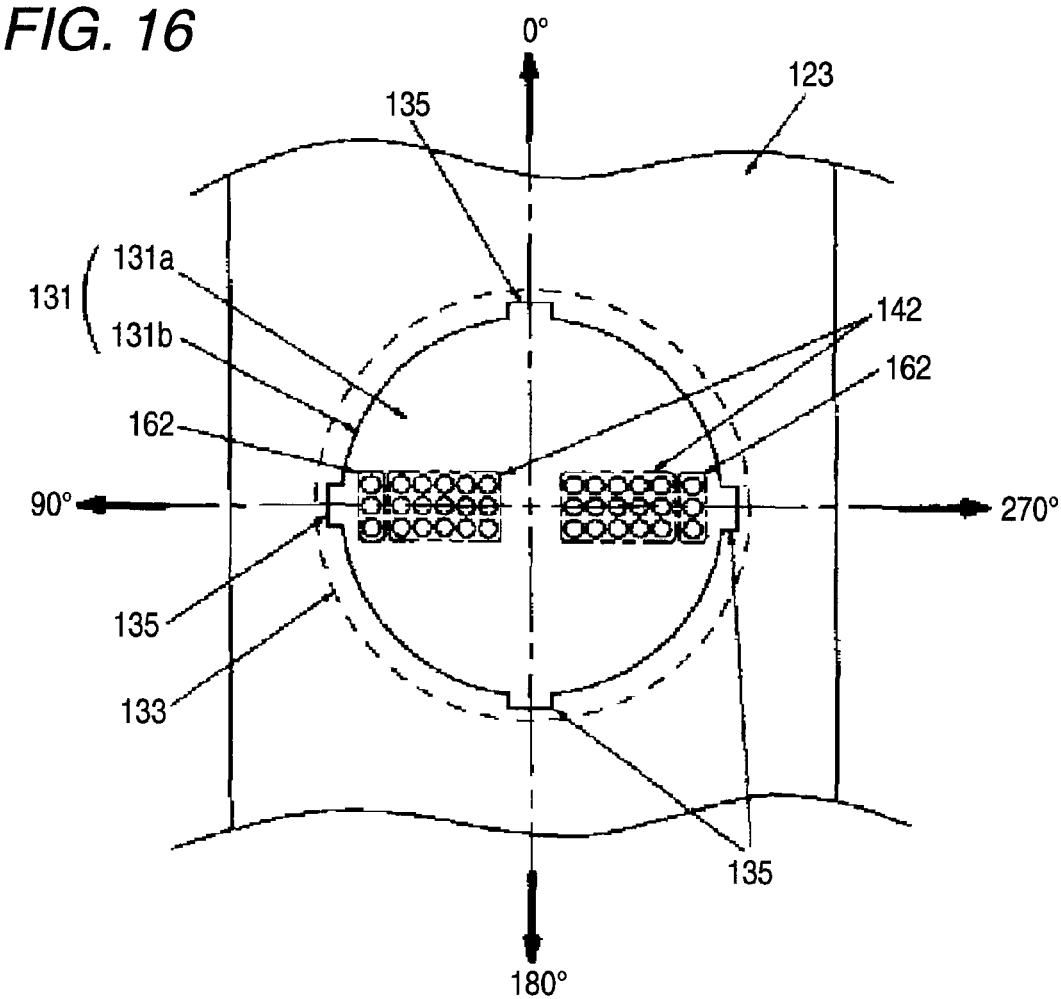
FIG. 16 is a bottom view to show a rotation supporting point hole made in the option cabinet of the stack type mobile terminal in the second embodiment of the invention.

FIG. 10 is a perspective view to show the top face of a main body cabinet of the stack type mobile terminal in the second embodiment of the invention, FIG. 11 is a perspective view to show the bottom face of the main body cabinet of the stack type mobile terminal in the second embodiment of the invention, FIG. 12 is a bottom view to show a rotation supporting point hole made in the main body cabinet of the stack type mobile terminal in the second embodiment of the invention, FIG. 13 is a perspective view to show the top face of an option cabinet of the stack type mobile terminal in the second embodiment of the invention, FIG. 14 is a perspective view to show the bottom face of the option cabinet of the stack type mobile terminal in the second embodiment of the invention, FIG. 15 is a top view to show a rotation supporting point shaft provided in the option cabinet of the stack type mobile terminal in the second embodiment of the invention, and FIG. 16 is a bottom view to show a rotation supporting point hole made in the option cabinet of the stack type mobile terminal in the second embodiment of the invention.

Parts identical with those shown in FIGS. 1 to 9 are denoted by the same reference numerals in FIGS. 10 to 16 and will not be discussed again.

In a stack type mobile terminal 200 in the embodiment, a plurality of option cabinet detection contacts 163 shown in FIG. 15 are provided on a top face 130a of a rotation supporting point shaft 130 of each of all cabinets making up option cabinets 120 (for example, a full keyboard option cabinet 121, a loudspeaker option cabinet 122, and a game option cabinet 123).

The plurality of option cabinet detection contacts 163 are connected to a circuit section of the cabinet where they are placed, and have specific polarities about all the cabinets making up the option cabinets 120 (for example, the full keyboard option cabinet 121, the loudspeaker option cabinet 122, and the game option cabinet 123) (for example, the option cabinet detection contacts 163 of the full keyboard option cabinet 121 have polarity 1: High, polarity 2: Low, polarity 3: Low, the option cabinet detection contacts 163 of the loudspeaker option cabinet 122 have polarity 1: Low, polarity 2: High, polarity 3: Low, the option cabinet detection contacts 163 of the game option cabinet 123 have polarity 1: Low, polarity 2: Low, polarity 3: High, etc.,).

As shown in FIG. 12, a plurality of option cabinet detection contact springs 160 for transmitting polarity signals of all the cabinets making up the option cabinets 120 (for example, the full keyboard option cabinet 121, the loudspeaker option cabinet 122, and the game option cabinet 123) are provided on a bottom face 131b of a rotation supporting point hole 131 of a main body cabinet 110.

As shown in FIG. 16, a plurality of option cabinet detection through contact springs 162 for electric conduction with the option cabinet 120 are provided on a bottom face 131a of the rotation supporting point hole 130 made in each of all the cabinets making up the option cabinets 120 (for example, the full keyboard option cabinet 121, the loudspeaker option cabinet 122, and the game option cabinet 123) to come in contact with option cabinet detection through contacts 161 and the option cabinet detection contacts 163 provided on the adjacent option cabinet 120 and transmit the polarity signals of all the cabinets making up the option cabinets 120 (for example, the full keyboard option cabinet 121, the loudspeaker option cabinet 122, and the game option cabinet 123) to the main body cabinet 110.

As shown in FIG. 15, a plurality of option cabinet detection through contacts 161 for electric conduction with the adjacent option cabinet 120 are provided on the top face 130a of the rotation supporting point shaft 130 provided in each of all the cabinets making up the option cabinets 120 (for example, the full keyboard option cabinet 121, the loudspeaker option cabinet 122, and the game option cabinet 123) to transmit the polarity signals of all the cabinets making up the option cabinets 120 to the main body cabinet 110.

Further, contact covers 150 are provided on the periphery of the option cabinet detection through contacts 161 and the option cabinet detection contacts 163 so that the option cabinet detection through contacts 161 and the option cabinet detection contacts 163 do not project on the surface of the option cabinet 120.

As the option cabinet detection through contacts 161 and the option cabinet detection through contact springs 162 provided on each of all the cabinets making up the option cabinets 120 (for example, the full keyboard option cabinet 121, the loudspeaker option cabinet 122, and the game option cabinet 123), the option cabinet detection through contacts 161 and the option cabinet detection through contact springs 162 as surface and back pairs are electrically directly connected.

Next, the positions of the option cabinet detection contact springs 160, the option cabinet detection through contacts 161, the option cabinet detection through contact springs 162, and the option cabinet detection contacts 163 will be discussed with FIGS. 1, 10, 11, 12, 13, 14, 15, and 16.

The option cabinets 120 are stacked on the rear of the main body cabinet 110 in the order of the full keyboard option cabinet 121, the loudspeaker option cabinet 122, and the game option cabinet 123, and the function section of the game option cabinet 123 (input key 123a and crosshair key 123b) stacked at the bottom stage is retained in a state in which it is exposed from the main body cabinet 110 (the relative angle to the main body cabinet 110 is 270°) (see the state in FIG. 1).

If the user selects the game option cabinet 123 and rotates it in an operable state (the relative angle to the main body cabinet 110 is 270°), the option cabinet detection contacts 163 of the game option cabinet 123 and the option cabinet detection through contact springs 162 of the adjacent loudspeaker option cabinet 122 are in contact with each other and an electric signal indicating the polarity peculiar to the game option cabinet 123 is transmitted to the option cabinet detection through contact springs 162 of the loudspeaker option cabinet 122.

Further, as the option cabinet detection through contacts 161 provided on the loudspeaker option cabinet 122 and the option cabinet detection through contact springs 162 provided on the loudspeaker option cabinet 122, the option cabinet detection through contacts 161 and the option cabinet detection through contact springs 162 as surface and back pairs are electrically directly connected and thus the electric signal indicating the polarity peculiar to the game option cabinet 123 is transmitted to the option cabinet detection through contacts 161 provided on the loudspeaker option cabinet 122.

As similar electric connection is made, the electric signal indicating the polarity peculiar to the game option cabinet 123 is transmitted to the option cabinet detection through contacts 161 provided on the full keyboard option cabinet 121.

Further, in this state, the option cabinet detection through contacts 161 provided on the full keyboard option cabinet 121 and the option cabinet detection contact springs 160 provided on the main body cabinet 110 are in contact with each other, whereby the electric signal indicating the polarity peculiar to the game option cabinet 123 is transmitted to the main body cabinet 110 and the user's selection of the game option cabinet 123 can be electrically automatically recognized.

Power supply from the main body cabinet 110 to the game option cabinet 123 is similar to that in the first embodiment of the invention and therefore will not be discussed again.

According to the stack type mobile terminal 200, when any desired option cabinet 120 is added, it is made possible to automatically detect the type of selected option cabinet 120, the need for the user to set the type of option cabinet 120 is eliminated, and selection and addition of an option cabinet 120 by the user are facilitated.

In the placement of the contacts and the contact springs of the embodiment, if the user rotates any option cabinet 120 to the position where the relative angle to the main body cabinet 110 or the adjacent option cabinet is 90°, the selected option cabinet 120 can also be automatically recognized in a similar manner.

In the placement of the contacts and the contact springs of the embodiment, if the option cabinet with the function section hidden by the main body cabinet 110 (for example, the full keyboard option cabinet 121, the loudspeaker option cabinet 122 in FIG. 1) is rotated to the position where the relative angle to the main body cabinet 110 or the adjacent option cabinet is 180°, similar electric connection can also be realized.

The positions, the shapes, and the quantities of the option cabinet detection contact springs 160, the option cabinet detection through contacts 161, the option cabinet detection through contact springs 162, and the option cabinet detection contacts 163 are unified in the main body cabinet 110 and all the cabinets making up the option cabinets 120 (for example, the full keyboard option cabinet 121, the loudspeaker option cabinet 122, and the game option cabinet 123), and the stack type mobile terminal is configured so that as many only necessary option cabinets as the necessary number can be stacked on the rear of the main body cabinet 110 from among the different types of option cabinets 120.

The height relationship among the option cabinet detection contact springs 160, the option cabinet detection through contacts 161, the option cabinet detection through contact springs 162, the option cabinet detection contacts 163, the rotation supporting point shaft 130, and the rotation supporting point hole 131 is set so that each contact and each contact spring come in contact with each other in a state in which the relative angle between the main body cabinet 110 and the option cabinet 120 or between the option cabinets 120 is, for example, 0°, 90°, 180°, or 270° and that each contact spring and the top face 130a of the rotation supporting point shaft 130 do not come in contact with each other and each contact spring and the bottom face 131b of the rotation supporting point hole 131 do not come in contact with each other at the rotation time to a predetermined angle.

Accordingly, abrasion of each contact and each contact spring caused by the rotation operation can be decreased.

The configuration of the terminal and the cabinets other than described above is similar to that of the first embodiment of the invention and therefore will not be discussed again.

In the embodiment, locking between the cabinets is executed and each contact and each contact spring are brought into contact with each other in a state in which the relative angle between the main body cabinet 110 and the option cabinet 120 or between the adjacent option cabinets 120 is 0°, 90°, 180°, or 270°. However, in addition, the stack type mobile terminal according to the invention may adopt another locking and contact configuration for setting any desired relative angle and implementing it.

In the embodiment, locking between the cabinets is executed and each contact and each contact spring are brought into contact with each other in a state in which the relative angle between the main body cabinet 110 and the option cabinet 120 or between the adjacent option cabinets 120 is 0°, 90°, 180°, or 270°. However, the stack type mobile terminal according to the invention may adopt a locking and contact configuration for setting any desired relative angle and making it possible to use a plurality of option cabinets 120 at the same time at a predetermined relative angle.

In the embodiment, the rotation supporting point shaft 130 is provided with each contact and the rotation supporting point hole 131 is provided with each contact spring, but the stack type mobile terminal according to the invention may adopt a configuration in which the rotation supporting point shaft 130 is provided with each contact spring and the rotation supporting point hole 131 is provided with each contact.

In the embodiment, the contacts and the contact springs paired with the contacts are provided for electric conduction, but the stack type mobile terminal according to the invention may adopt a configuration in which a plurality of light transmission elements and light reception elements paired with the light transmission elements may be provided for electric conduction.

Next, FIGS. 17 to 27 show a third embodiment of a stack type mobile terminal according to the invention.

Figure 17:
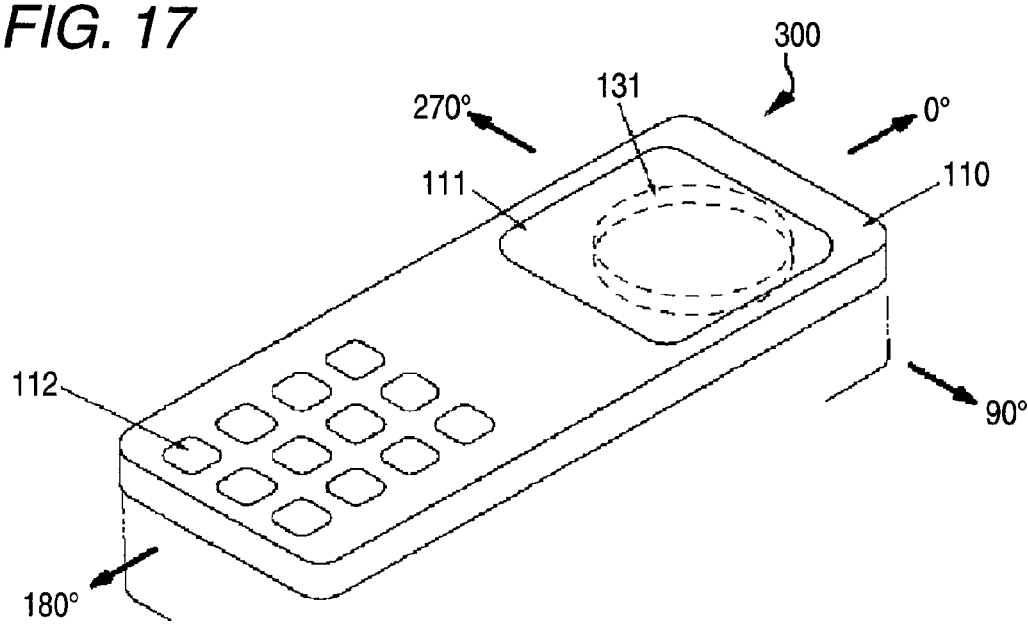
FIG. 17 is a perspective view to show the top face of a main body cabinet of the stack type mobile terminal in a third embodiment of the invention.
Figure 18:
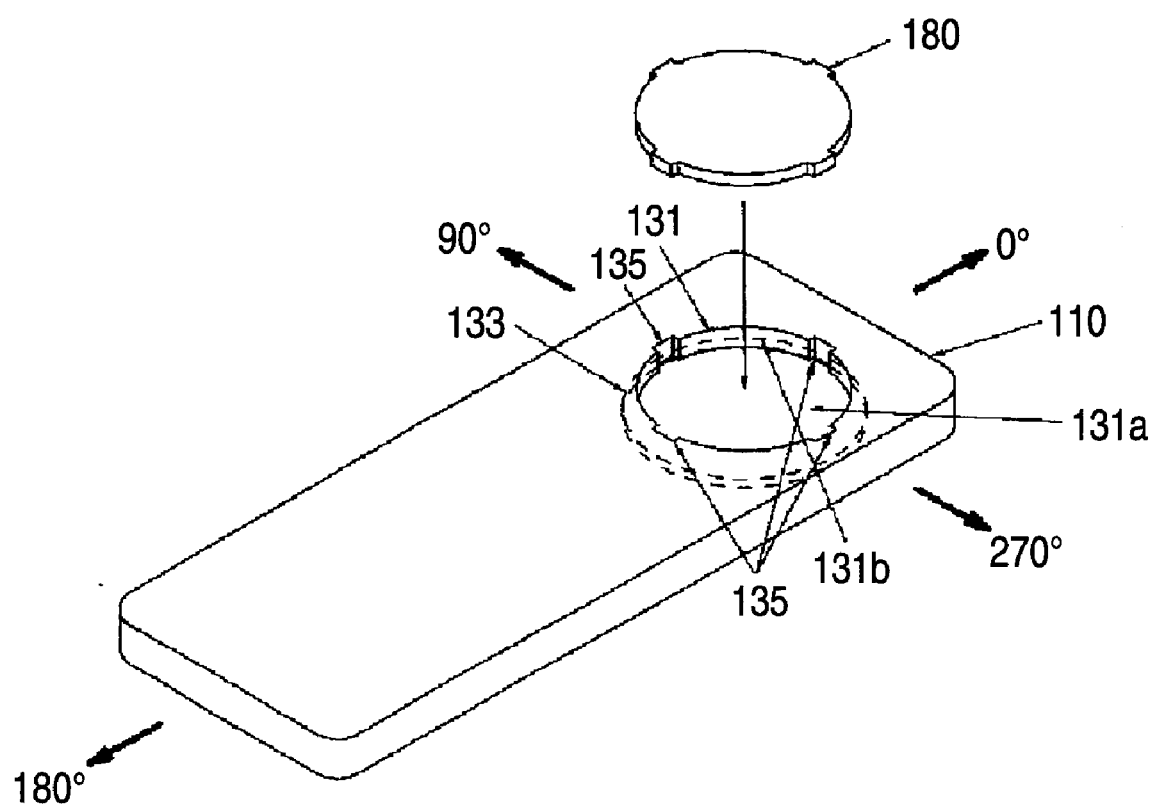
FIG. 18 is a perspective view to show the bottom face of the main body cabinet of the stack type mobile terminal in the third embodiment of the invention.
Figure 19:
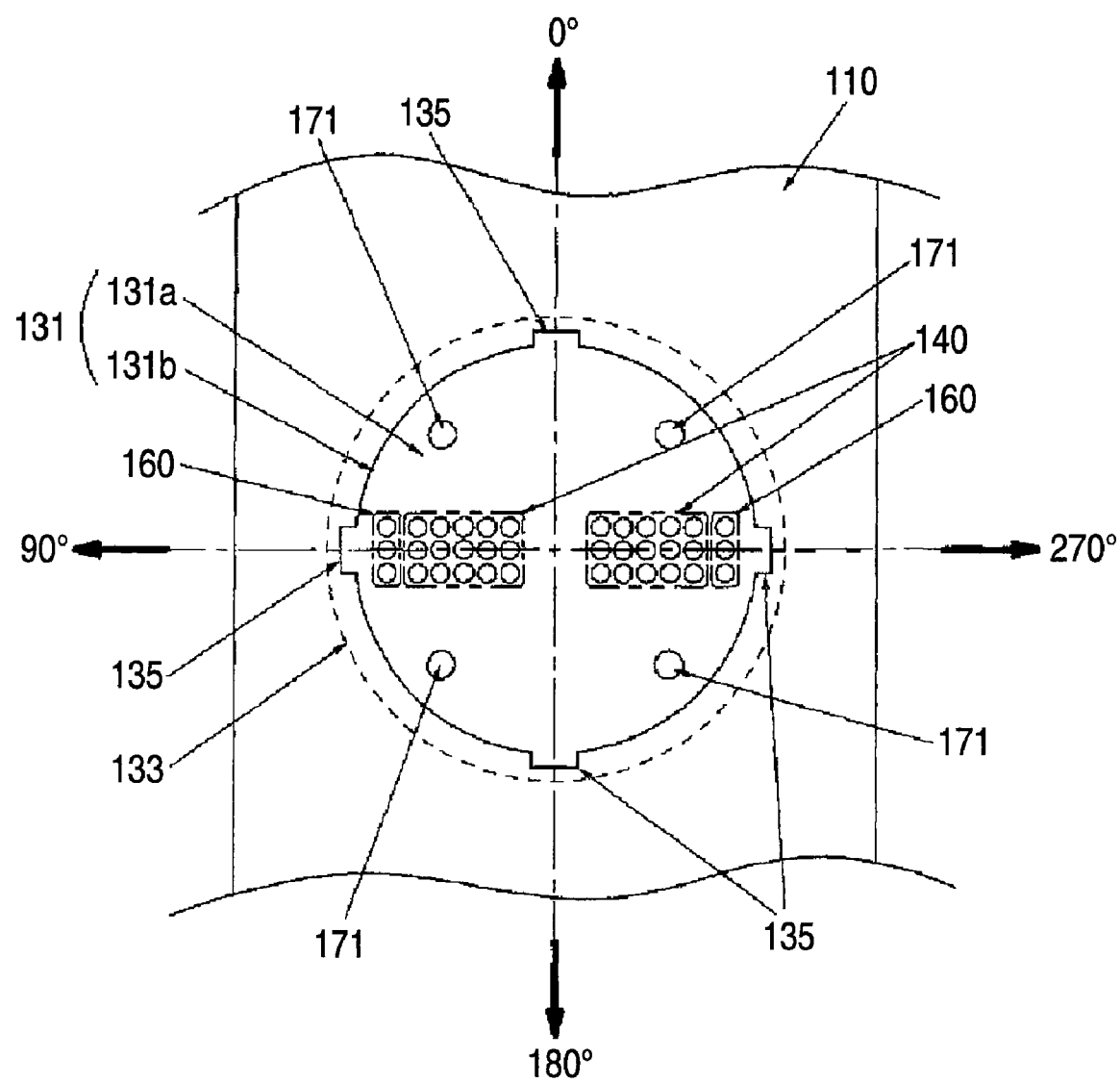
FIG. 19 is a bottom view to show a rotation supporting point hole made in the main body cabinet of the stack type mobile terminal in the third embodiment of the invention.
Figure 20:
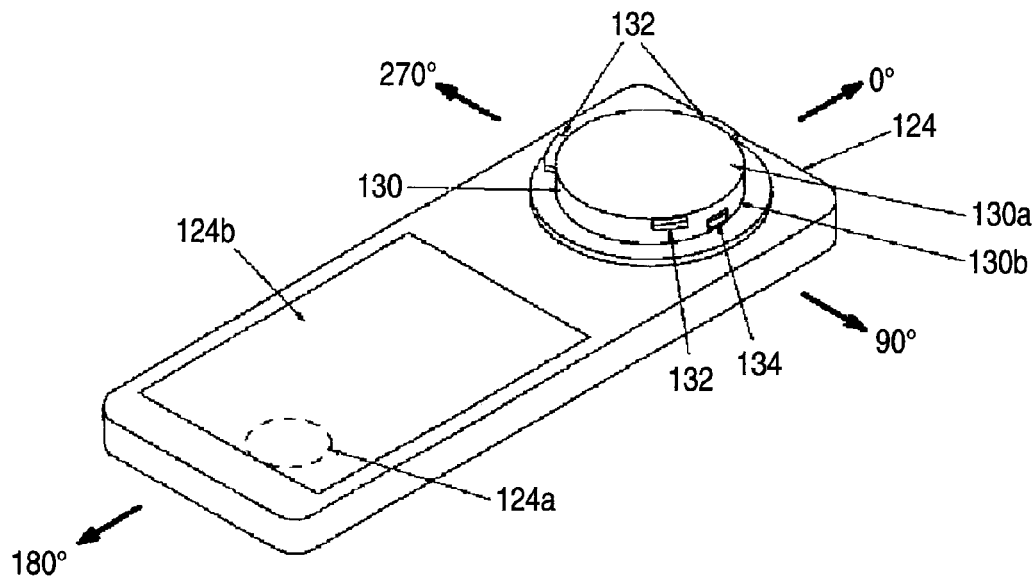
FIG. 20 is a perspective view to show the top face of an option cabinet of the stack type mobile terminal in the third embodiment of the invention.
Figure 21:
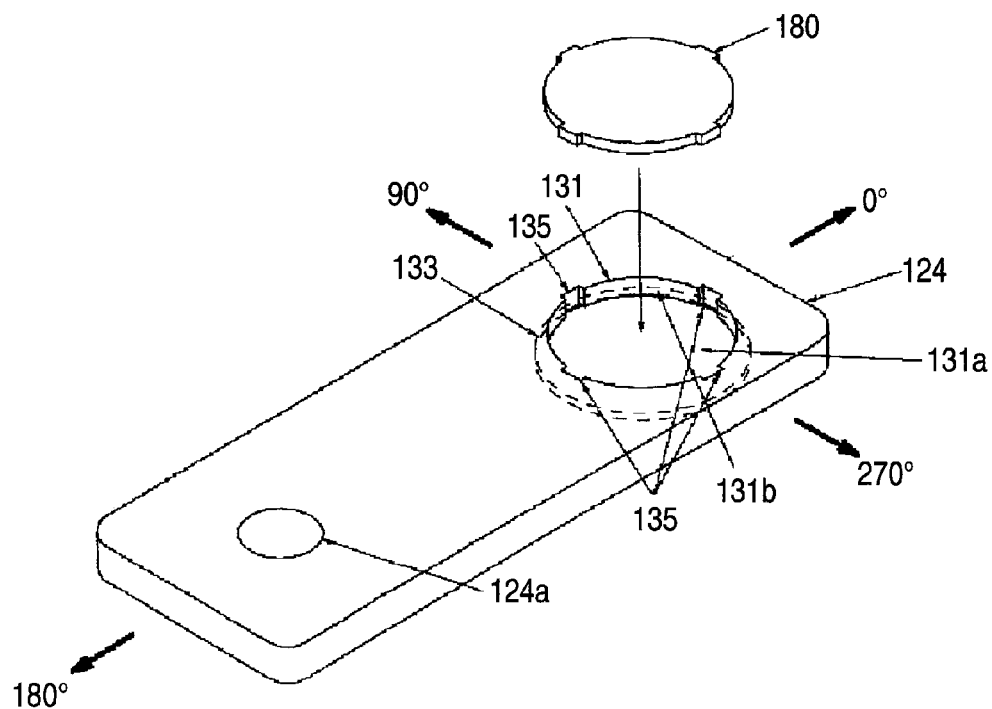
FIG. 21 is a perspective view to show the bottom face of the option cabinet of the stack type mobile terminal in the third embodiment of the invention.
Figure 22:
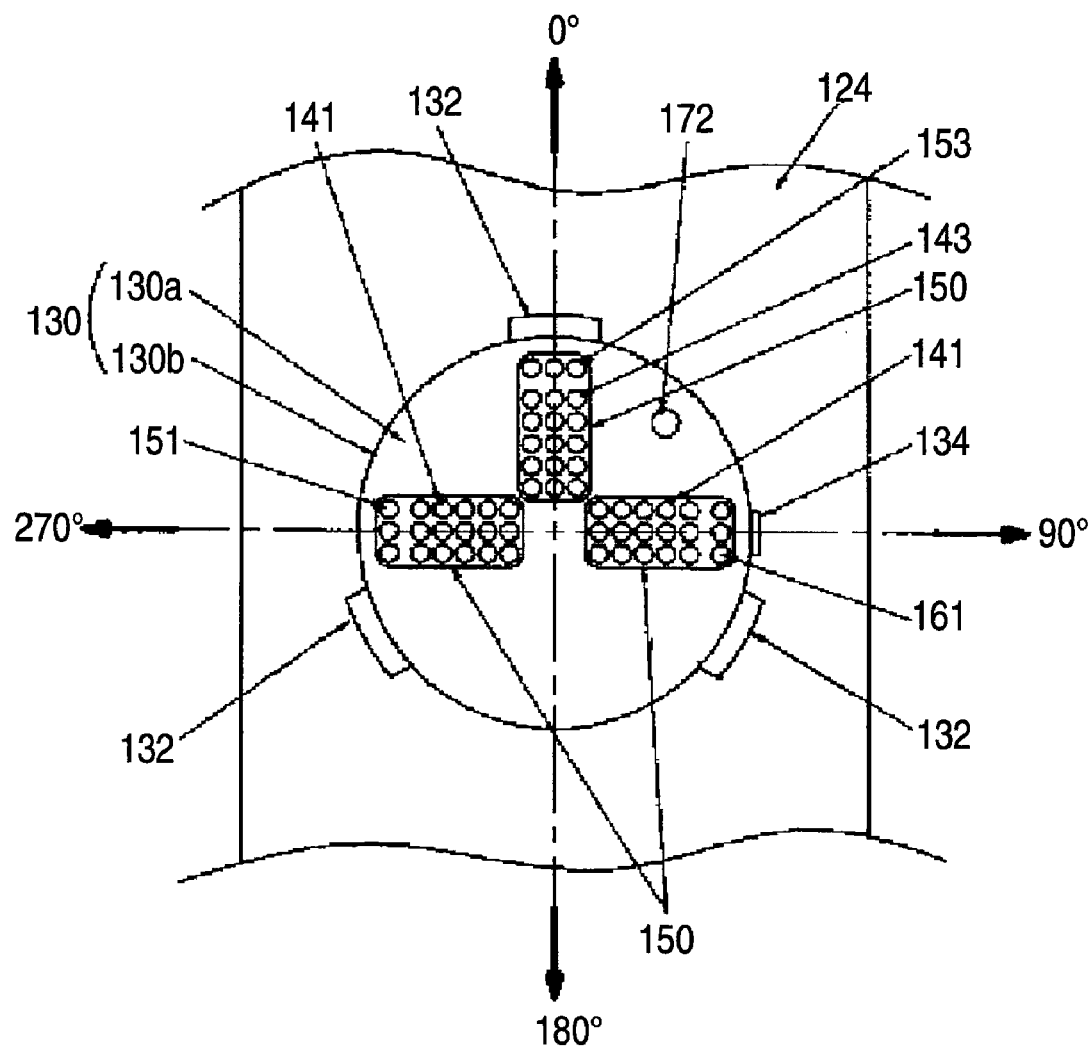
FIG. 22 is a top view to show a rotation supporting point shaft provided in the option cabinet of the stack type mobile terminal in the third embodiment of the invention.
Figure 23:
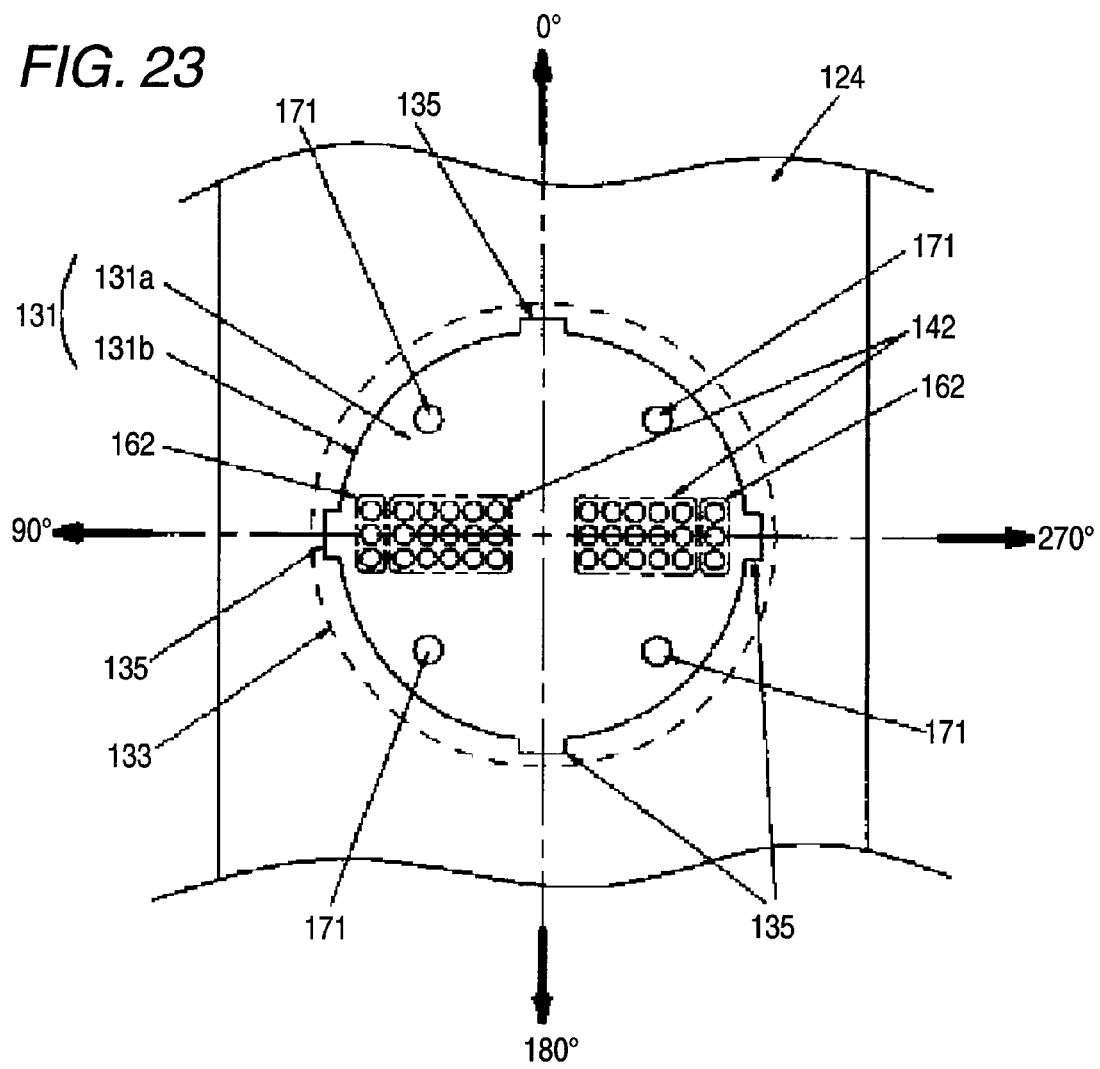
FIG. 23 is a bottom view to show a rotation supporting point hole made in the option cabinet of the stack type mobile terminal in the third embodiment of the invention.
Figure 24:
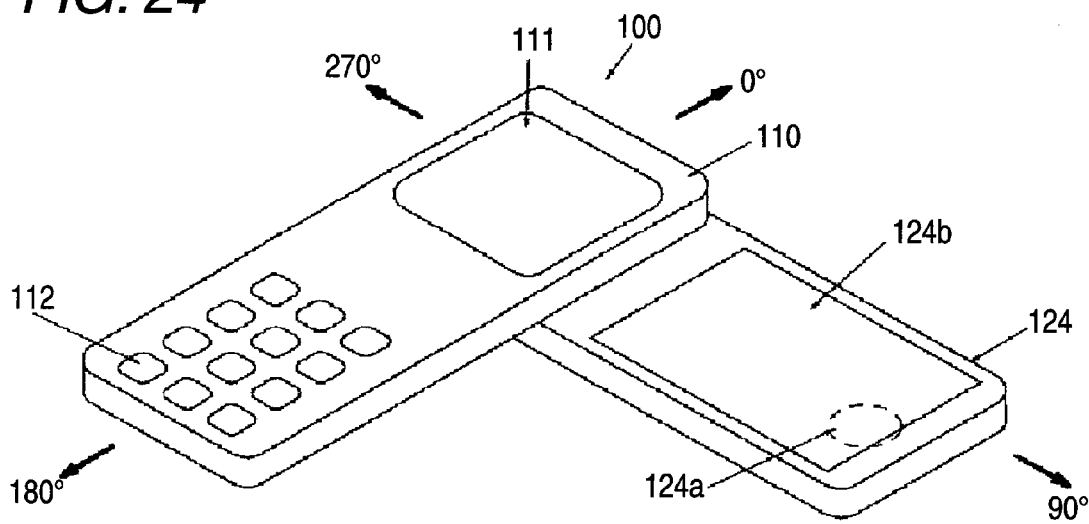
FIG. 24 is a perspective view of the stack type mobile terminal in the third embodiment of the invention.
Figure 25:
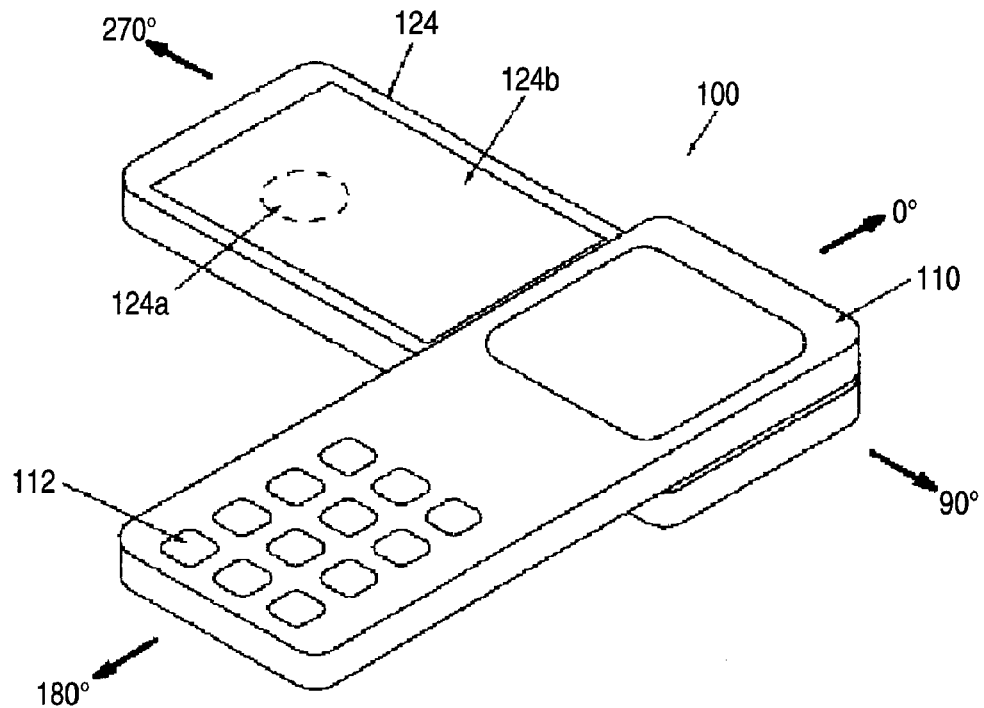
FIG. 25 is a perspective view of the stack type mobile terminal in the third embodiment of the invention.
Figure 26:
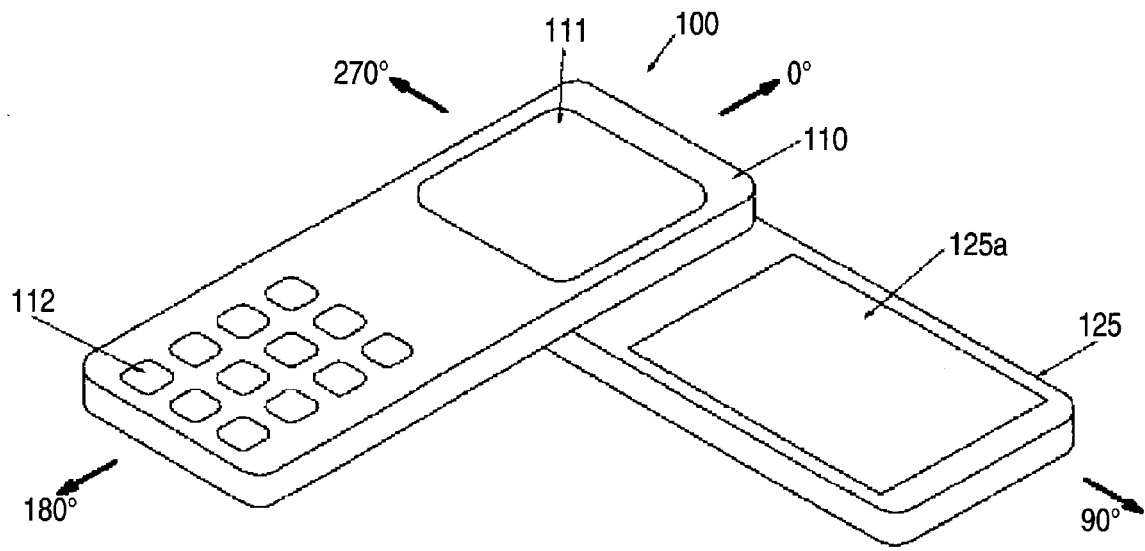
FIG. 26 is a perspective view of the stack type mobile terminal in the third embodiment of the invention.
Figure 27:
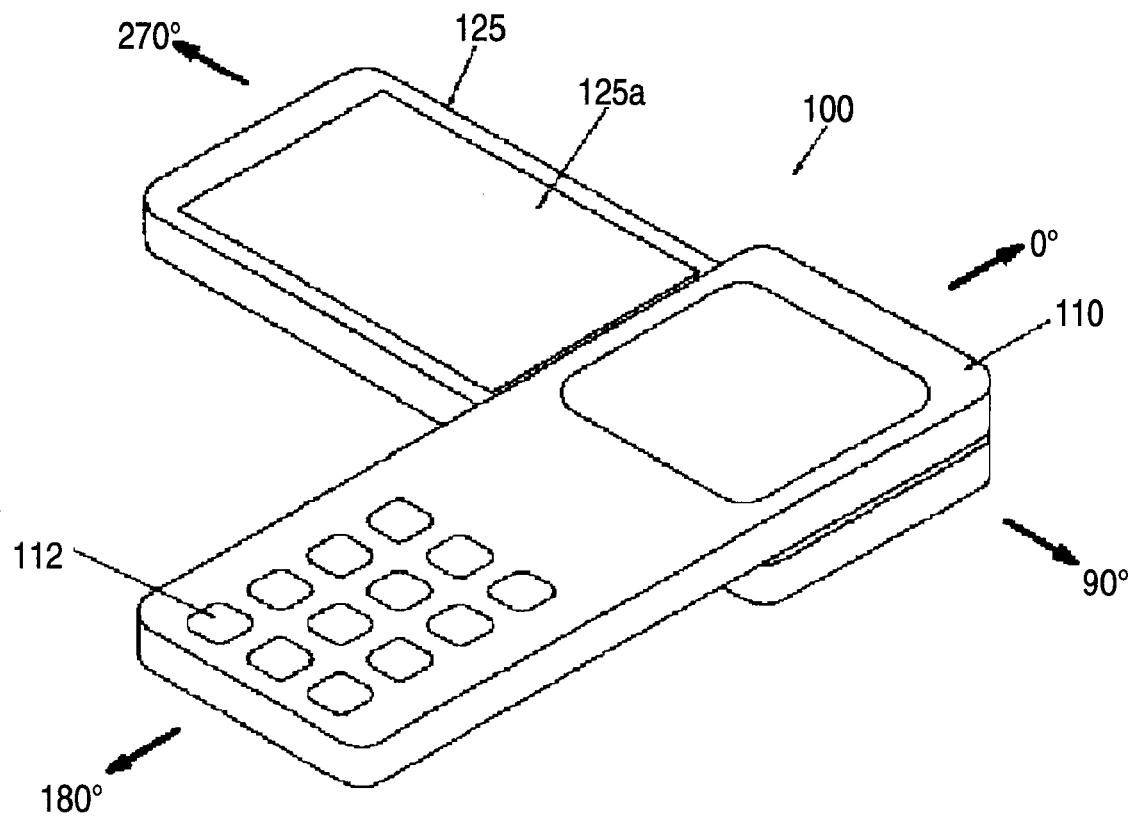
FIG. 27 is a perspective view of the stack type mobile terminal in the third embodiment of the invention.

FIG. 17 is a perspective view to show the top face of a main body cabinet of the stack type mobile terminal in the third embodiment of the invention, FIG. 18 is a perspective view to show the bottom face of the main body cabinet of the stack type mobile terminal in the third embodiment of the invention, FIG. 19 is a bottom view to show a rotation supporting point hole made in the main body cabinet of the stack type mobile terminal in the third embodiment of the invention, FIG. 20 is a perspective view to show the top face of an option cabinet of the stack type mobile terminal in the third embodiment of the invention, FIG. 21 is a perspective view to show the bottom face of the option cabinet of the stack type mobile terminal in the third embodiment of the invention, FIG. 22 is a top view to show a rotation supporting point shaft provided in the option cabinet of the stack type mobile terminal in the third embodiment of the invention, FIG. 23 is a bottom view to show a rotation supporting point hole made in the option cabinet of the stack type mobile terminal in the third embodiment of the invention, FIG. 24 is a perspective view of the stack type mobile terminal in the third embodiment of the invention, FIG. 25 is a perspective view of the stack type mobile terminal in the third embodiment of the invention, FIG. 26 is a perspective view of the stack type mobile terminal in the third embodiment of the invention, and FIG. 27 is a perspective view of the stack type mobile terminal in the third embodiment of the invention.

Parts identical with those shown in FIGS. 1 to 16 are denoted by the same reference numerals in FIGS. 17 to 27 and will not be discussed again.

In a stack type mobile terminal 300 in the embodiment, a plurality of hole elements 171 of angle detection members shown in FIG. 19 are provided on a bottom face 131a of a rotation supporting point hole 131 made in a main body cabinet 110 and each of all cabinets making up option cabinets 120 (for example, a camera option cabinet 124 and a TV option cabinet 125).

A magnet 172 of an angle detection member shown in FIG. 22 is provided on a top face 130a of a rotation supporting point shaft 130 provided in each of all the cabinets making up the option cabinets 120 (for example, the camera option cabinet 124 and the TV option cabinet 125).

The positions and the quantities of the hole elements 171 and the magnet 172 are unified in the main body cabinet 110 and all the cabinets making up the option cabinets 120 (for example, the camera option cabinet 124 and the TV option cabinet 125), and the stack type mobile terminal is configured so that as many only necessary option cabinets as the necessary number can be stacked on the rear of the main body cabinet 110 from among the different types of option cabinets 120.

The hole elements 171 and the magnet 172 can detect the relative angle between the main body cabinet 110 or the adjacent option cabinet making up the option cabinets 120 (for example, the camera option cabinet 124, the TV option cabinet 125) and a selected option cabinet 120 (for example, the camera option cabinet 124), and can recognize two states shown in FIGS. 24 and 25, for example.

Accordingly, even in the two states shown in FIGS. 24 and 25, an image picked up by a camera 124a provided in the camera option cabinet 124 can always be processed with the 0° direction in FIG. 24, FIG. 25 upward and an image with the 0° direction in FIG. 24, FIG. 25 upward can also be displayed on a liquid crystal screen 124b provided on the camera option cabinet 124.

Likewise, even in two states shown in FIGS. 26 and 27, an image with the 0° direction in FIG. 26, FIG. 27 upward can always be displayed on a liquid crystal screen 125a provided on the TV option cabinet 125.

Further, the relative angle between the cabinets is detected, whereby the function (for example, for right hander or left hander) of the attached option cabinet 120 (for example, a full keyboard option cabinet 121, a game option cabinet 123, a slide pad 126) can be selected according to the relative angle to the main body cabinet 110 or the adjacent option cabinet 120 and can also be automatically set.

According to the stack type mobile terminal 300, based on the relative angle of the option cabinet 120 selected by the user, the function of the option cabinet 120 is switched, so that the need for the user to select the option cabinet 120 can be eliminated for enhancing operability and a multifunctional stack type mobile terminal can be implemented.

The configuration of the terminal and the cabinets other than described above is similar to that of the first embodiment and the second embodiment of the invention and therefore will not be discussed again.

In the embodiment, the hole elements 171 and the magnet 172 are placed so as to detect the relative angle between the cabinets in a state in which the relative angle between the main body cabinet 110 and the option cabinet 120 or between the adjacent option cabinets 120 is 0°, 90°, 180°, or 270°. However, the stack type mobile terminal according to the invention may adopt placement of the hole elements 171 and the magnet 172 for setting any desired relative angle and capable of implementing it.

In the embodiment, the rotation supporting point shaft 130 is provided with the magnet 172 and the rotation supporting point hole 131 is provided with the hole elements 171, but the stack type mobile terminal according to the invention may adopt a configuration in which the rotation supporting point shaft 130 is provided with the hole elements 171 and the rotation supporting point hole 131 is provided with the magnet 172.

In the embodiment, the relative angle between the cabinets is detected using the hole elements 171 and the magnet 172 in combination, but the stack type mobile terminal according to the invention may adopt a configuration in which any other angle detection member (for example, a rotary position sensor, an encoder, etc.,) that can detect the relative angle is included.

Figure 28:
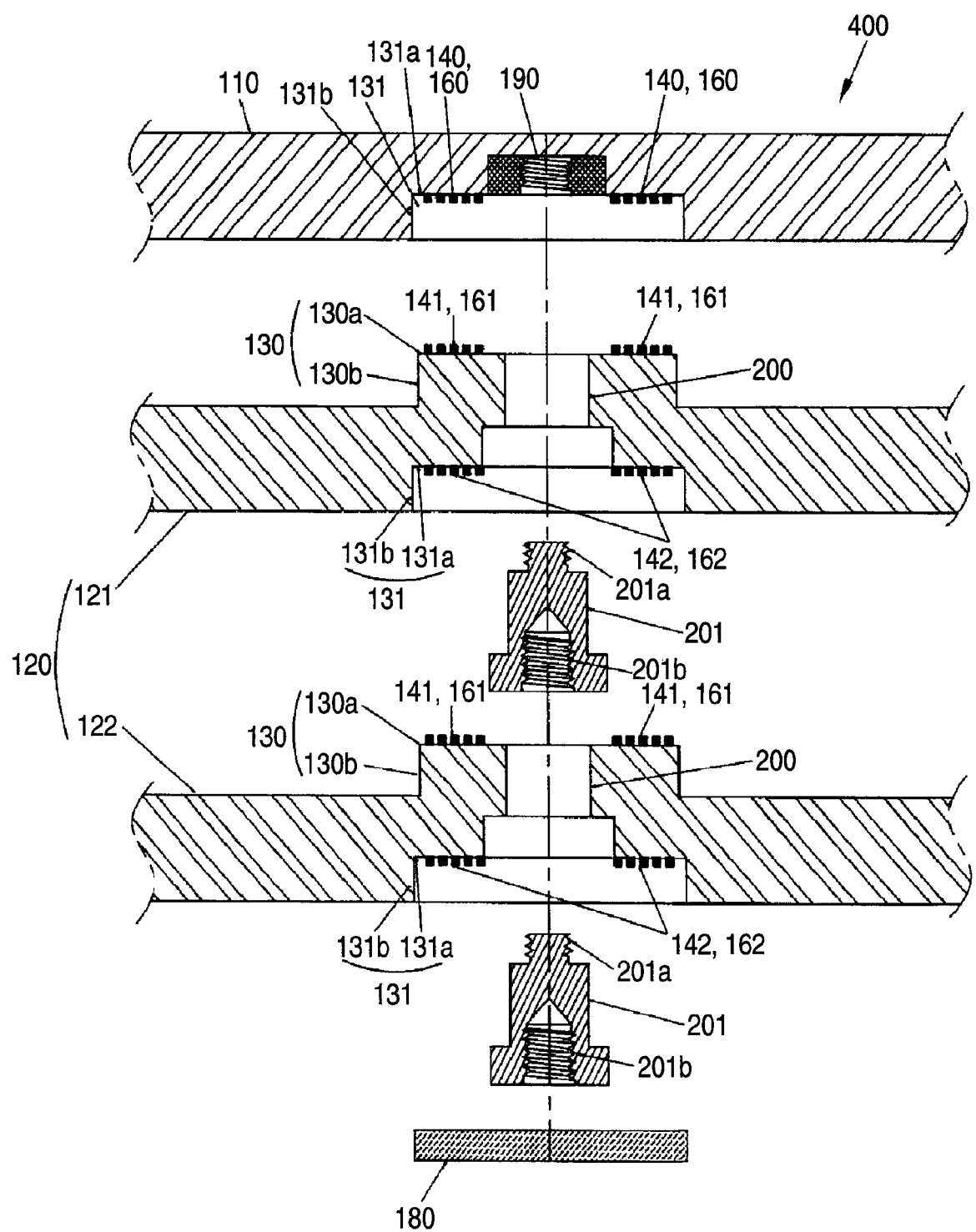
FIG. 28 is an exploded sectional view of a stack type mobile terminal in a fourth embodiment of the invention.
Figure 29:
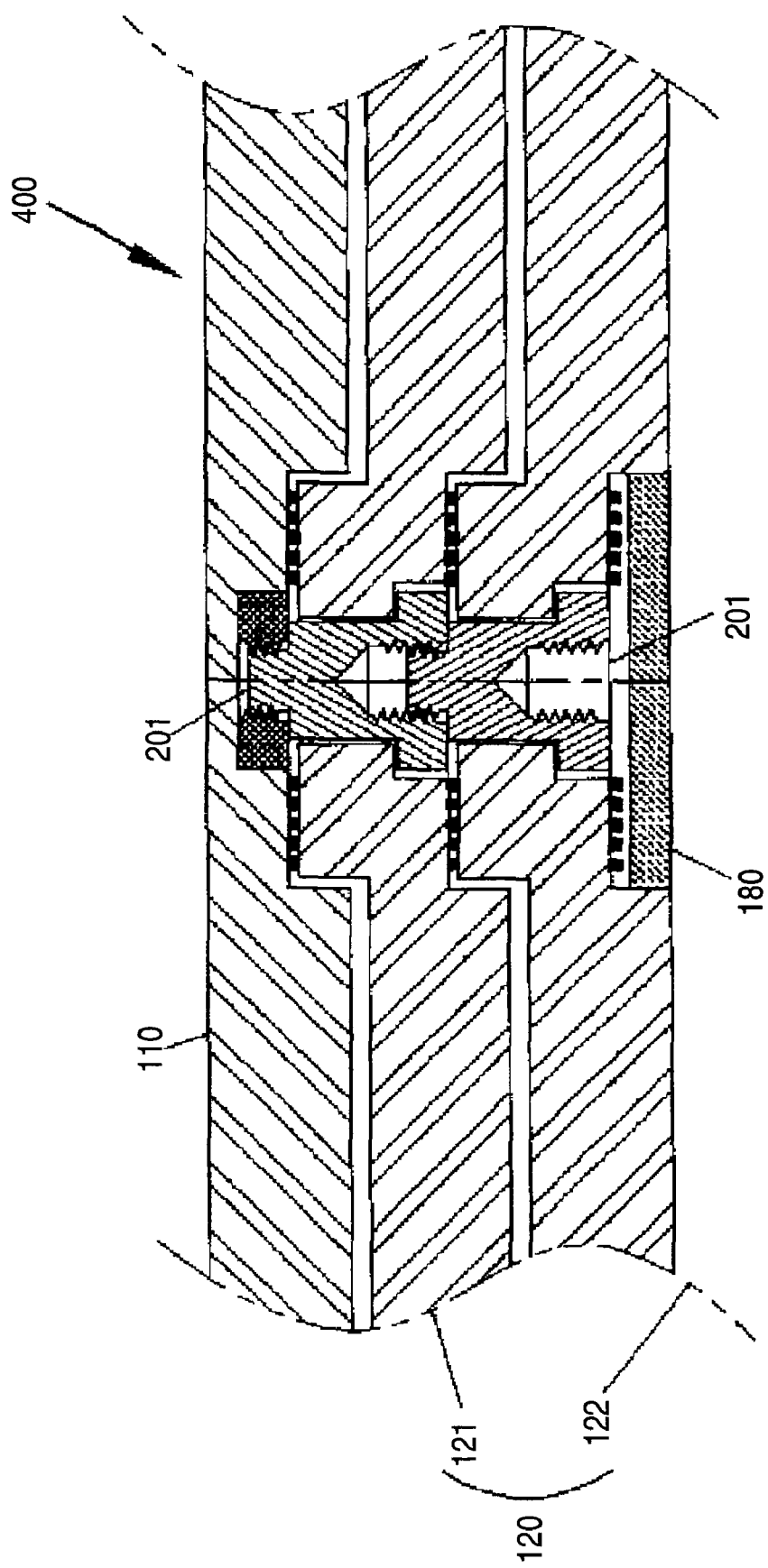
FIG. 29 is a sectional view of the stack type mobile terminal in the fourth embodiment of the invention.
Figure 30:
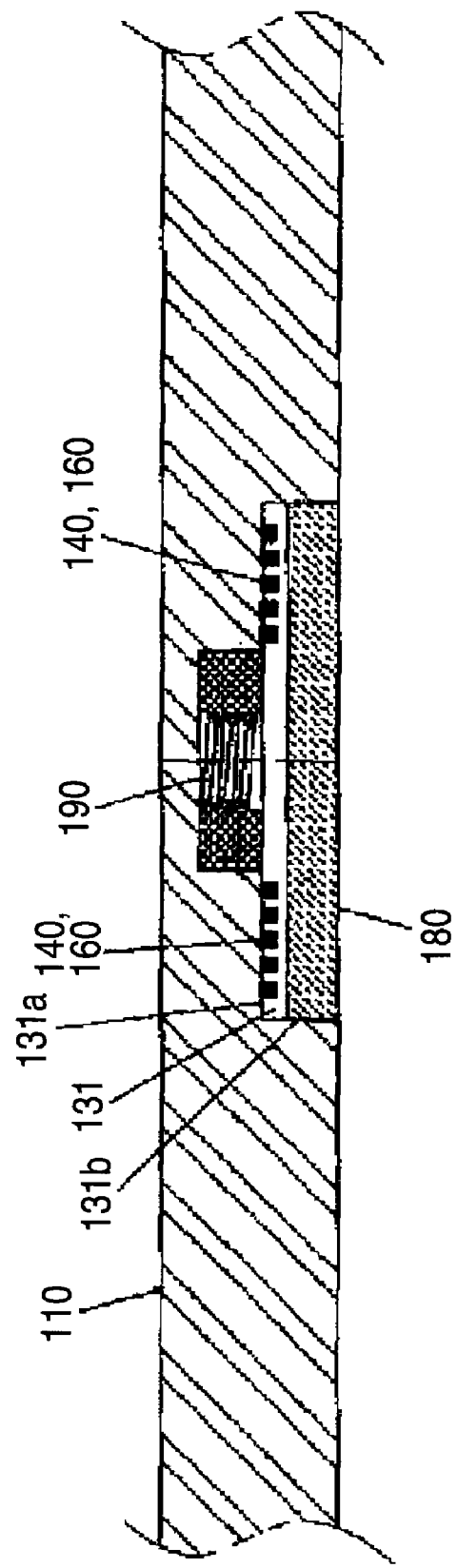
FIG. 30 is a sectional view to show a main body cabinet of the stack type mobile terminal in the fourth embodiment of the invention.

Next, FIGS. 28 to 30 show a fourth embodiment of a stack type mobile terminal according to the invention.

FIG. 28 is an exploded sectional view of a stack type mobile terminal in the fourth embodiment of the invention, FIG. 29 is a sectional view of the stack type mobile terminal in the fourth embodiment of the invention, and FIG. 30 is a sectional view to show a main body cabinet of the stack type mobile terminal in the fourth embodiment of the invention.

Parts identical with those shown in FIGS. 1 to 27 are denoted by the same reference numerals in FIGS. 28 to 30 and will not be discussed again.

In a stack type mobile terminal 400 in the embodiment, a tap 190 is provided in the center of a rotation supporting point hole 131 of a main body cabinet 110. An option cabinet fixing screw insertion hole 195 is made in the center of a rotation supporting point hole 131 of each of cabinets making up option cabinets 120 (for example, a full keyboard option cabinet 121 and a loudspeaker option cabinet 122).

An option cabinet fixing screw 201 can be screwed into the option cabinet fixing screw insertion hole 195. The option cabinet fixing screw 201 is provided with a screw 201a and a tap 201b.

Accordingly, any of the cabinets making up the option cabinets 120 (for example, the full keyboard option cabinet 121) is fixed to the main body cabinet 110 using the tap 190 provided in the main body cabinet 110, the option cabinet fixing screw insertion hole 195 made in the cabinet of the cabinets making up the option cabinets 120 (for example, the full keyboard option cabinet 121), and the option cabinet fixing screw 201, and the cabinet of the cabinets making up the option cabinets 120 (for example, the full keyboard option cabinet 121) is fixed rotatably to the main body cabinet 110.

The cabinets making up the option cabinets 120 (for example, the full keyboard option cabinet 121 and the loudspeaker option cabinet 122) are fixed using the tap 201b provided in the option cabinet fixing screw 201 fixing the cabinet of the cabinets making up the option cabinets 120 (for example, the full keyboard option cabinet 121) on the main body cabinet 110 side, the option cabinet fixing screw insertion hole 195 made in the cabinet of the cabinets making up the option cabinets 120 (the loudspeaker option cabinet 122), and the option cabinet fixing screw 201, and the cabinet of the cabinets making up the option cabinets 120 (the loudspeaker option cabinet 122) is fixed rotatably to the main body cabinet 110 and the cabinet of the cabinets making up the option cabinets 120 (for example, the full keyboard option cabinet 121) on the main body cabinet 110 side.

The positions and the shapes of the rotation supporting point shafts 130, the rotation supporting point holes 131, and the option cabinet fixing screw insertion holes 195 provided in the cabinets making up the option cabinets 120 are unified in all the option cabinets 120, and the stack type mobile terminal is configured so that as many only necessary option cabinets as the necessary number can be stacked on the rear of the main body cabinet 110 from among the different types of option cabinets 120.

The rotation supporting point hole 131 made in the cabinet placed at the bottom stage of the option cabinets 120 (for example, the loudspeaker option cabinet 122) is blocked by a lid member 180 for preventing dust or liquid from entering the rotation supporting point hole.

Likewise, to use the main body cabinet 110 solely, the rotation supporting point hole 131 made in the main body cabinet 110 is blocked by a lid member 180. Likewise, the rotation supporting point hole 131 made in the option cabinet not used can also be blocked by a lid member 180, enabling dust or liquid to be prevented from entering the rotation supporting point hole 131 at the storage time.

According to the stack type mobile terminal 400, any desired number of the option cabinet fixing screws 201 are further screwed to the option cabinet fixing screw 201 fixing the option cabinet 120 to the main body cabinet 110, whereby the option cabinets 120 are rotatably stacked and addition of an option cabinet 120 by the user can be facilitated.

The fixing method of the main body cabinet 110 and the option cabinets 120 described in the fourth embodiment of the invention is implemented, so that the claw members 132 and the claw member engagement grooves 133 described in the first to third embodiments of the invention become unnecessary and thus are not provided in the stack type mobile terminal 400 of the embodiment.

The configuration of the terminal and the cabinets other than described above is similar to that of the first to third embodiments of the invention and therefore will not be discussed again.

Figure 31:
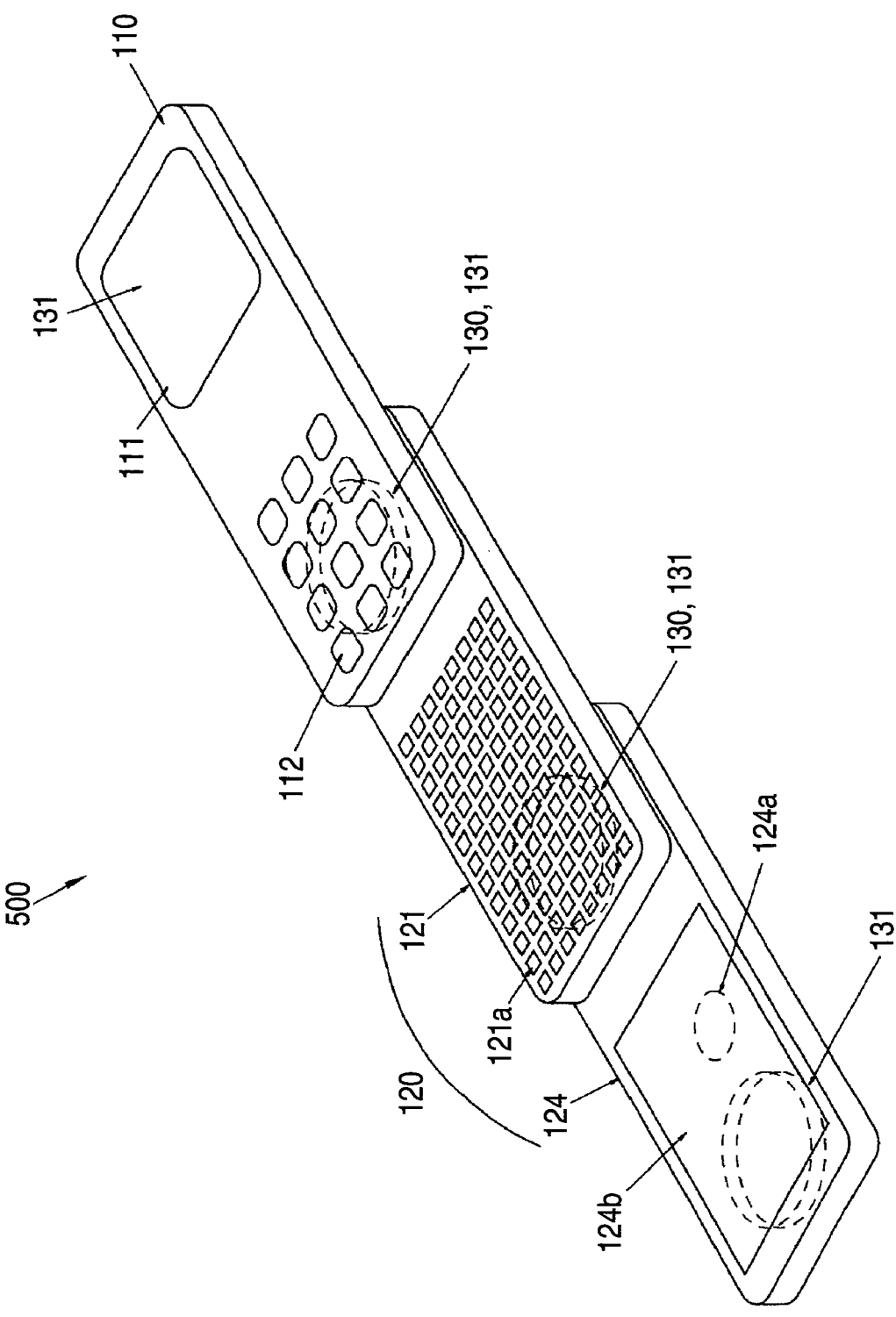
FIG. 31 is a perspective view of a stack type mobile terminal in a fifth embodiment of the invention.

Next, FIG. 31 shows a fifth embodiment of a stack type mobile terminal according to the invention.

FIG. 31 is a perspective view to show the stack type mobile terminal in the fifth embodiment of the invention. Parts identical with those shown in FIGS. 1 to 30 are denoted by the same reference numerals in FIG. 31 and will not be discussed again.

In a stack type mobile terminal 500 in the embodiment, a rotation supporting point shaft 130 and a rotation supporting point hole 131 provided in each of cabinets making up option cabinets 120 (for example, a full keyboard option cabinet 121 and a camera option cabinet 124) are placed at non-concentric positions (for example, at both ends of the cabinet), so that it is made possible to simultaneously use function sections (for example, a full keyboard 121a provided on the full keyboard option cabinet 121 and a camera 124a and a liquid crystal screen 124b provided on the camera option cabinet 124) provided in the main body cabinet 110 and the cabinets making up the option cabinets 120 (for example, the full keyboard option cabinet 121 and the camera option cabinet 124).

The positions and the shapes of the rotation supporting point shafts 130 and the rotation supporting point holes 131 provided in the cabinets making up the option cabinets 120 are unified in all the option cabinets, and the stack type mobile terminal is configured so that as many only necessary option cabinets as the necessary number can be stacked on the rear of the main body cabinet from among the different types of option cabinets.

According to the stack type mobile terminal 500, the option cabinets 120 can be exposed continuously relative to the main body cabinet 110 and one large function section area can be placed in one piece on a side of the main body cabinet 110.

The rotation supporting point hole 131 made in the cabinet placed at the bottom stage of the option cabinets 120 (for example, the camera option cabinet 124) is blocked by a lid member 180 not shown for preventing dust or liquid from entering the rotation supporting point hole.

Likewise, to use the main body cabinet 110 solely, the rotation supporting point hole 131 made in the main body cabinet 110 is blocked by a lid member 180.

Likewise, the rotation supporting point hole 131 made in the option cabinet not used can also be blocked by a lid member 180, enabling dust or liquid to be prevented from entering the rotation supporting point hole 131 at the storage time.

The configuration of the terminal and the cabinets other than described above is similar to that of the first to third embodiments of the invention and therefore will not be discussed again.

The method of rotatably fixing the main body cabinet 110 and the option cabinets 120 may be the configuration of either of the first and fourth embodiments of the invention and therefore will not be discussed again.

In the embodiment, one rotation supporting point shaft 130 and one rotation supporting point hole 131 are provided in each of the main body cabinet 110 and the cabinets making up the option cabinets 120 (for example, the full keyboard option cabinet 121 and the camera option cabinet 124), but the stack type mobile terminal according to the invention may adopt a configuration in which a plurality of rotation supporting point shafts 130 and a plurality of rotation supporting point holes 131 are provided and the cabinets making up the option cabinets 120 have areas into which the area of the main body cabinet 110 is divided and a plurality of cabinets can be used at the same time.

Figure 32:
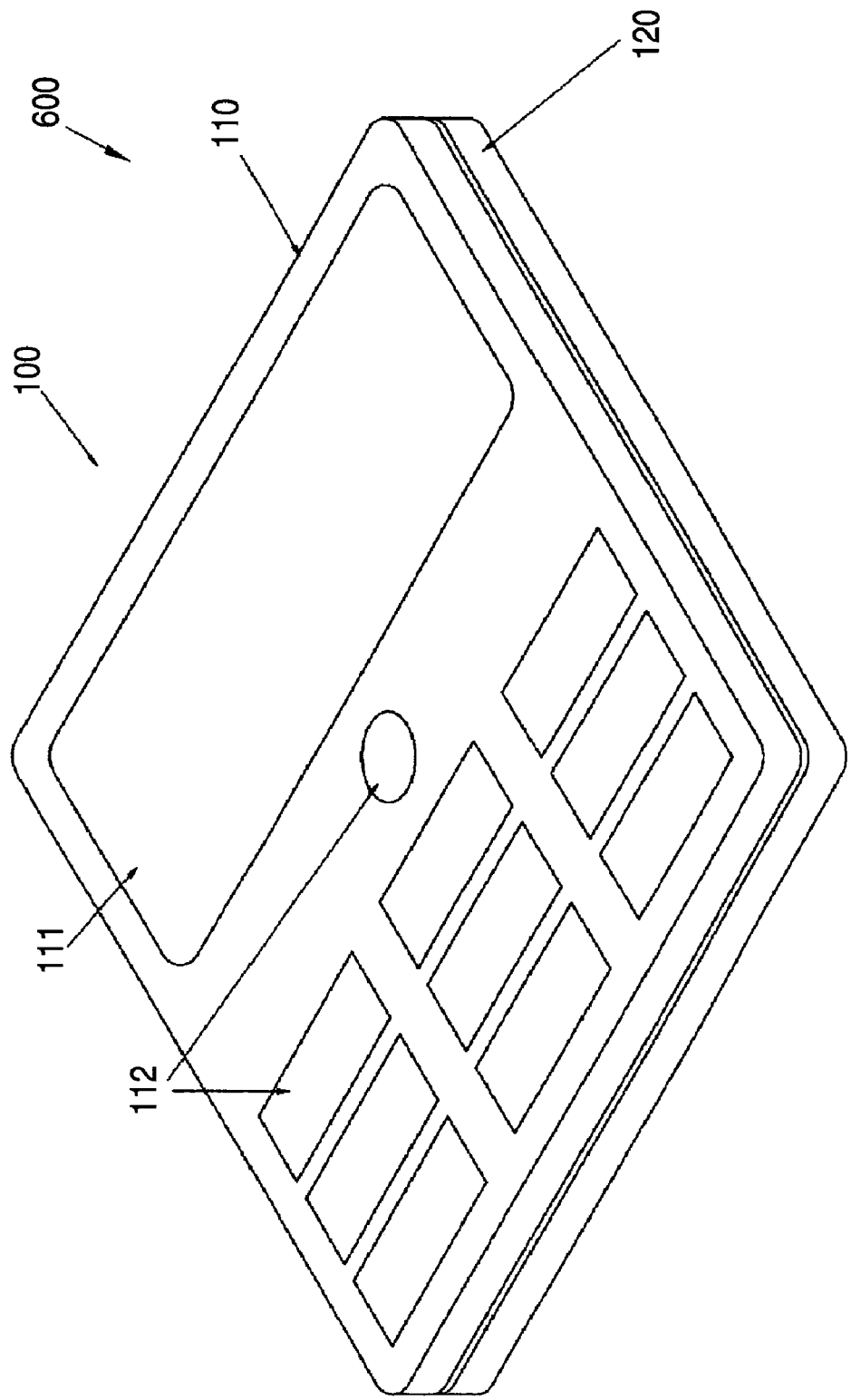
FIG. 32 is a perspective view of a stack type mobile terminal in a sixth embodiment of the invention.
Figure 33:
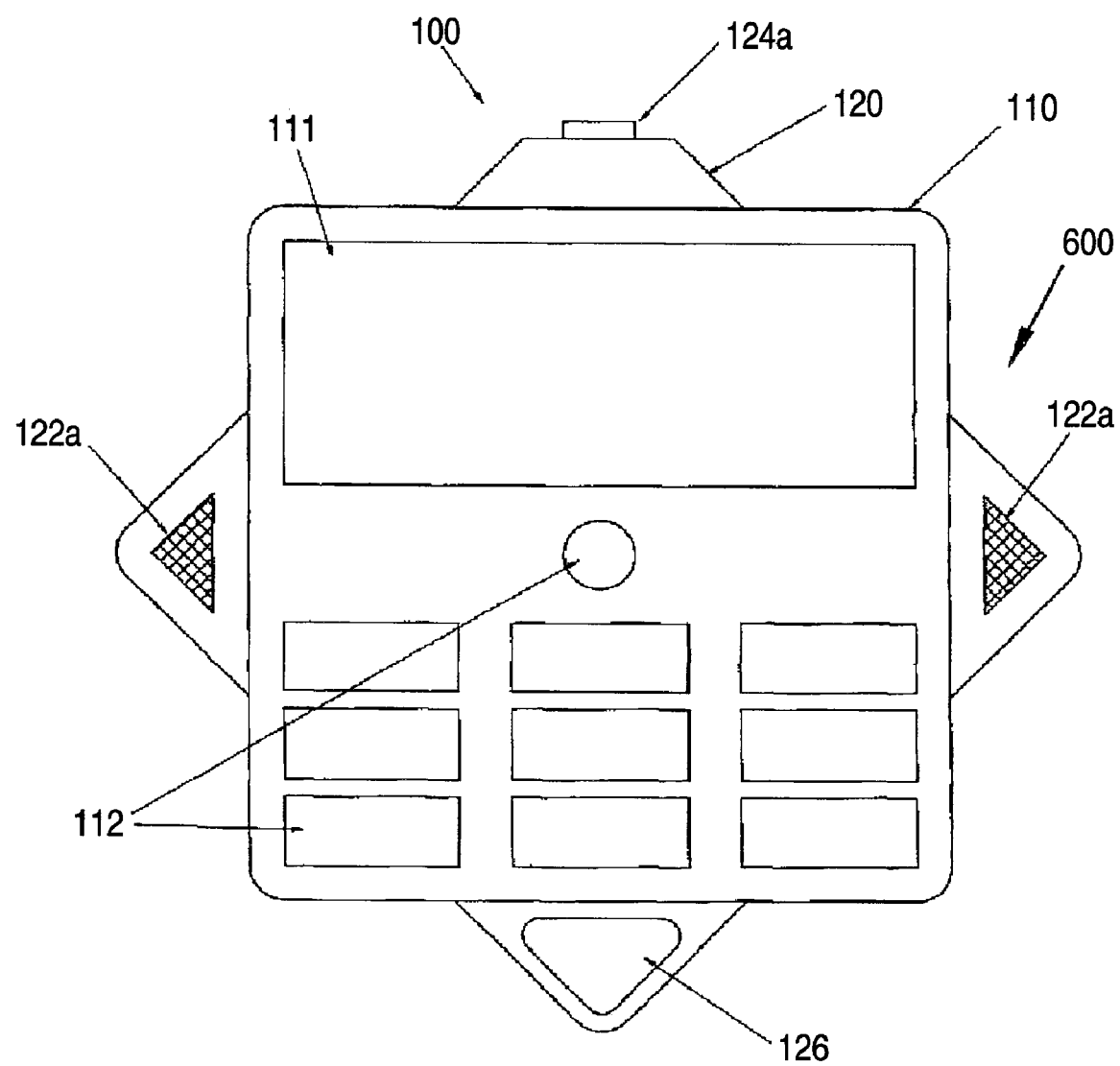
FIG. 33 is a perspective view of the stack type mobile terminal in the invention.
Figure 34:
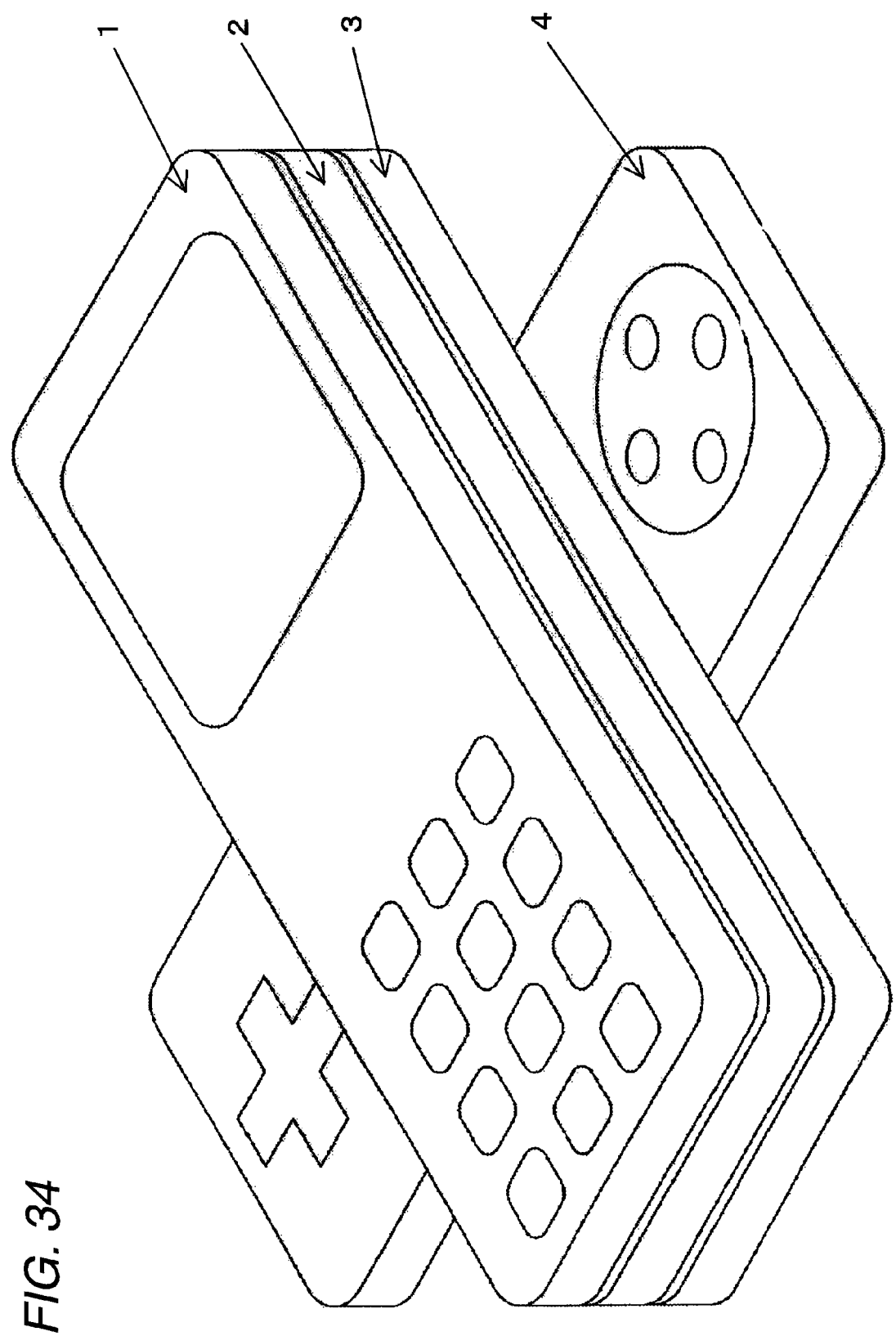
FIG. 34 is a perspective view of a mobile terminal in a seventh embodiment of the invention.
Figure 35:
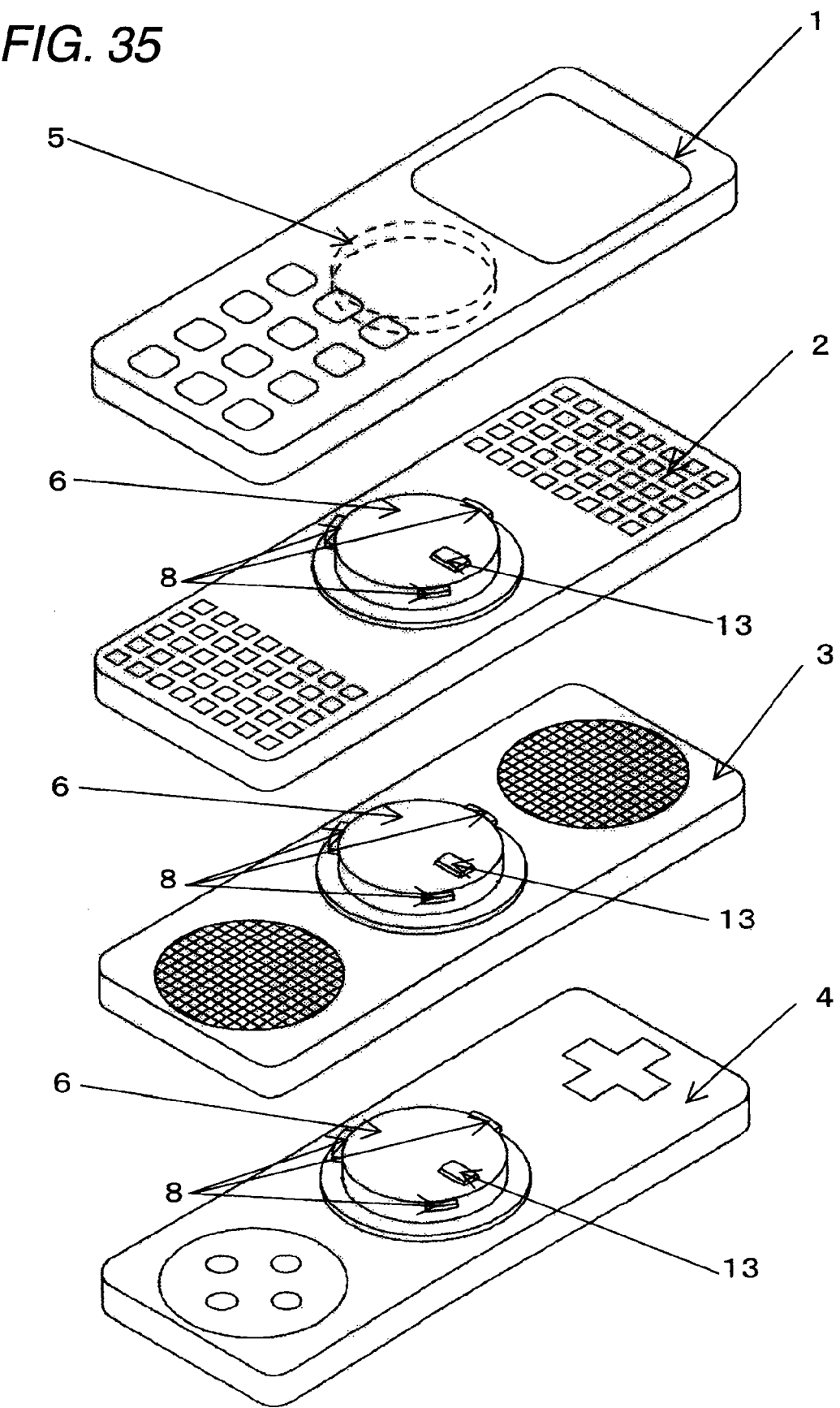
FIG. 35 is an exploded sectional view of the mobile terminal in the embodiment of the invention.
Figure 36:
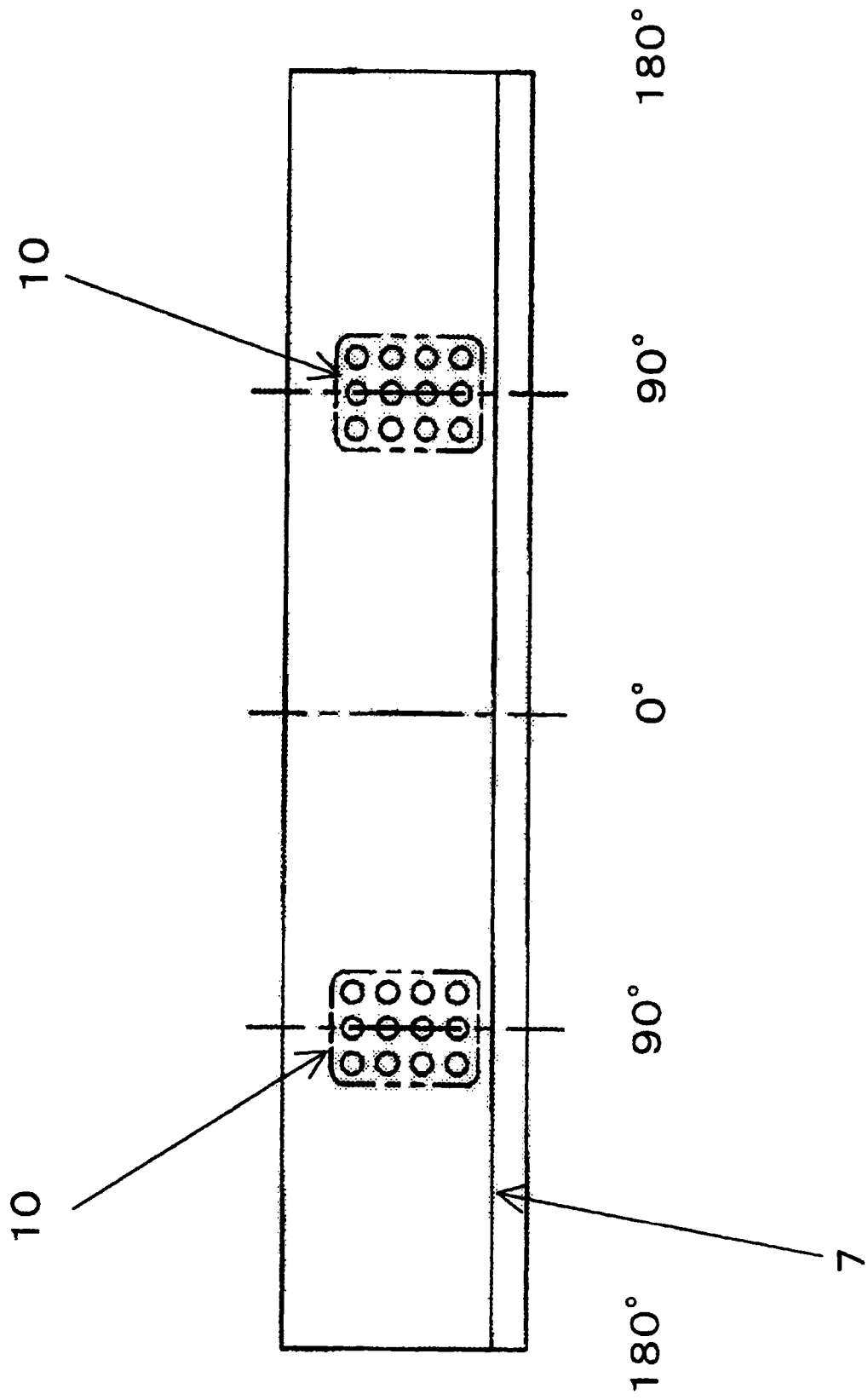
FIG. 36 is a developed view of a shaft support recess part inner peripheral surface of a main unit in the embodiment of the invention.
Figure 37:
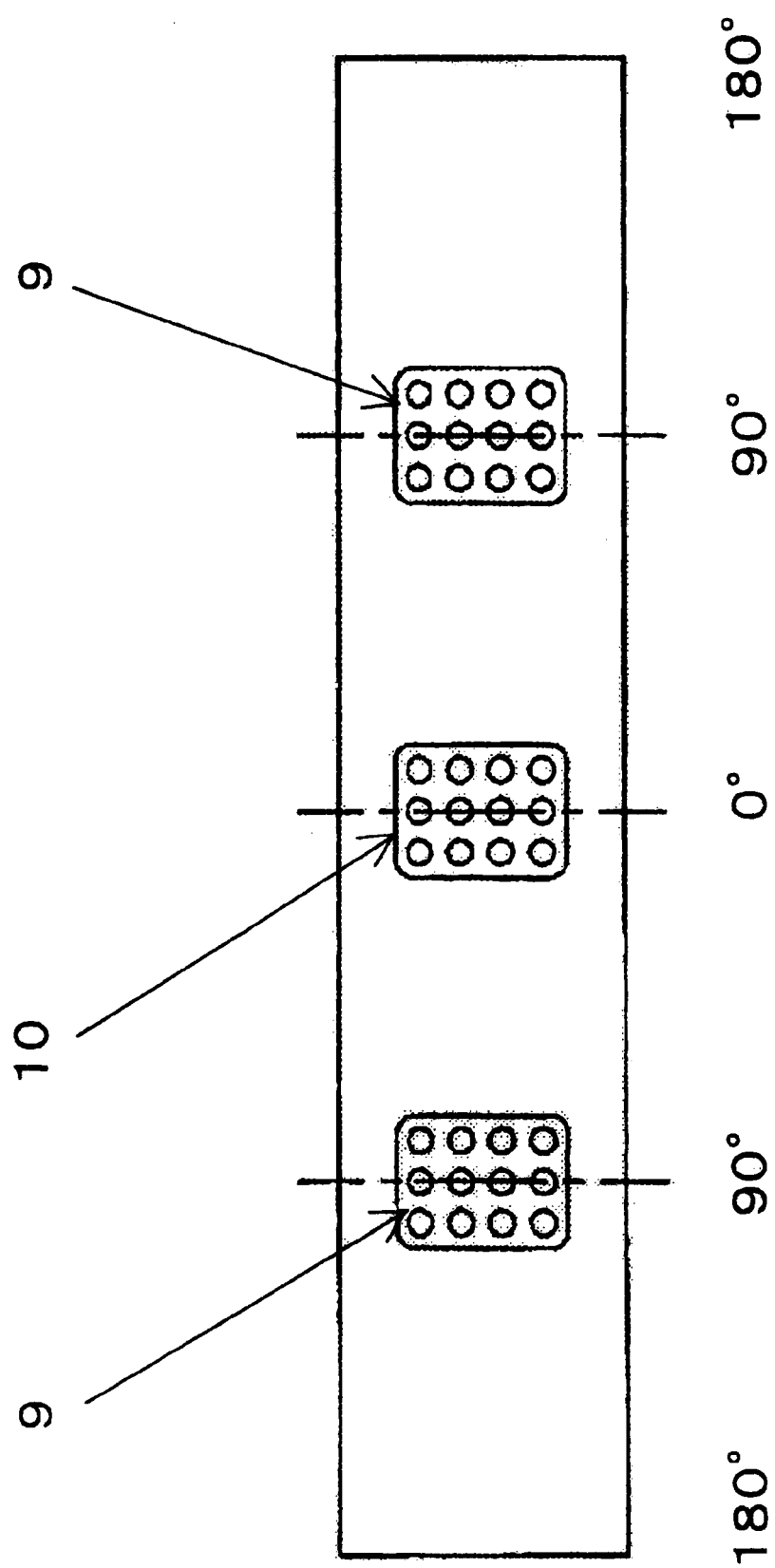
FIG. 37 is a developed view of a rotation shaft circumference face of each option unit in the embodiment of the invention.
Figure 38:
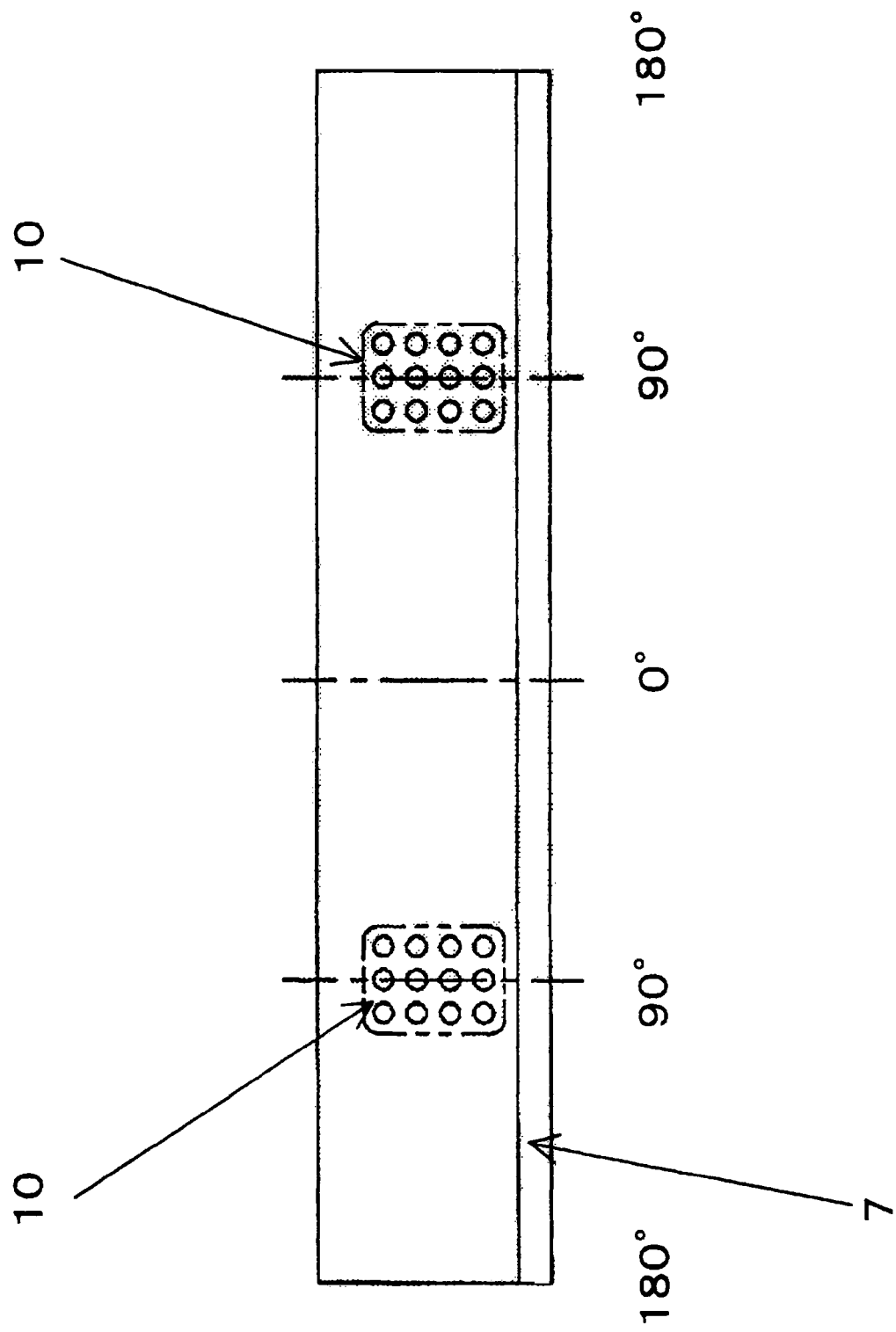
FIG. 38 is a developed view of a shaft support recess part inner peripheral surface of each option unit in the embodiment of the invention.
Figure 39:
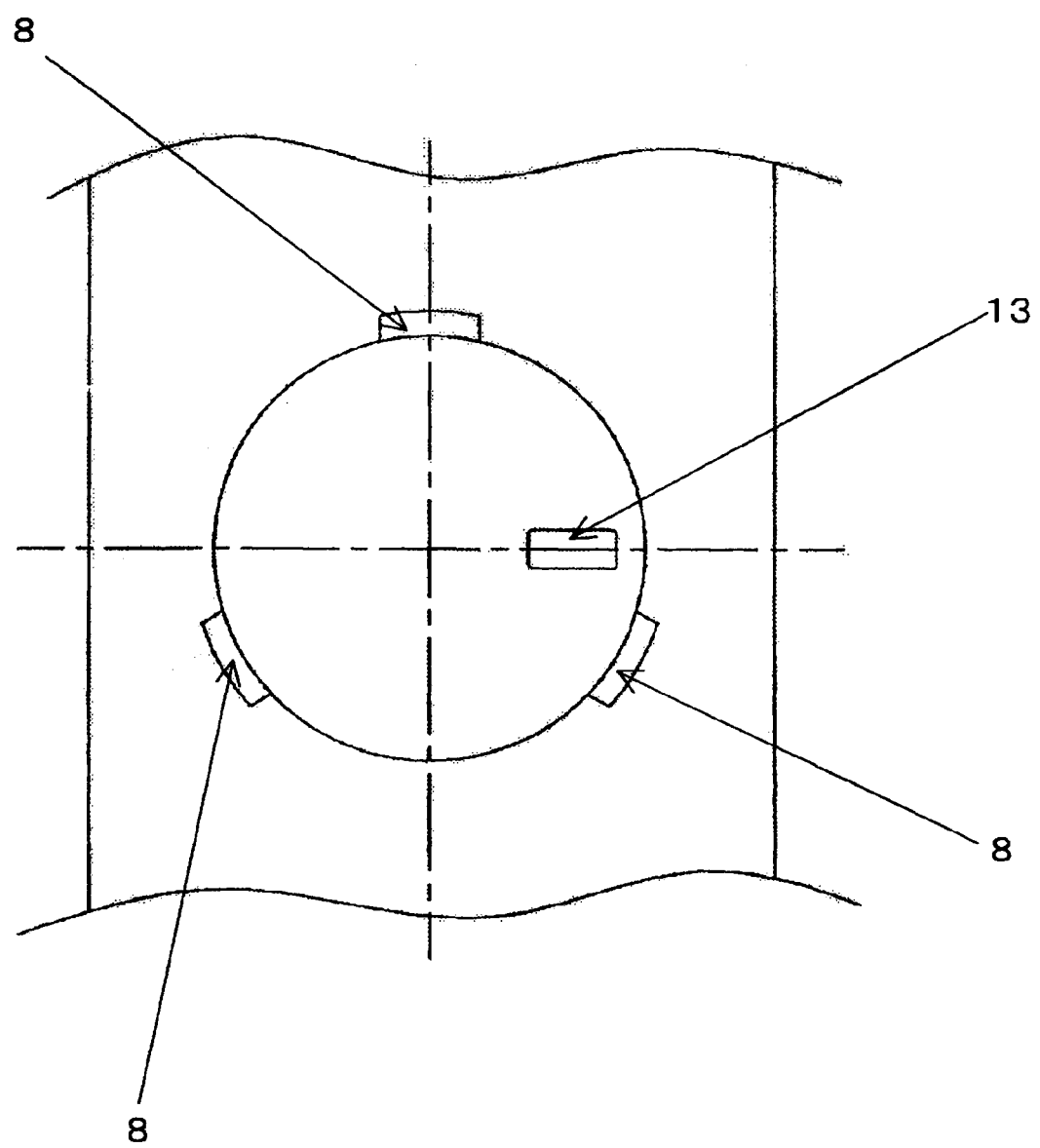
FIG. 39 is a plan view of a rotation shaft of each option unit in the embodiment of the invention.
Figure 40:
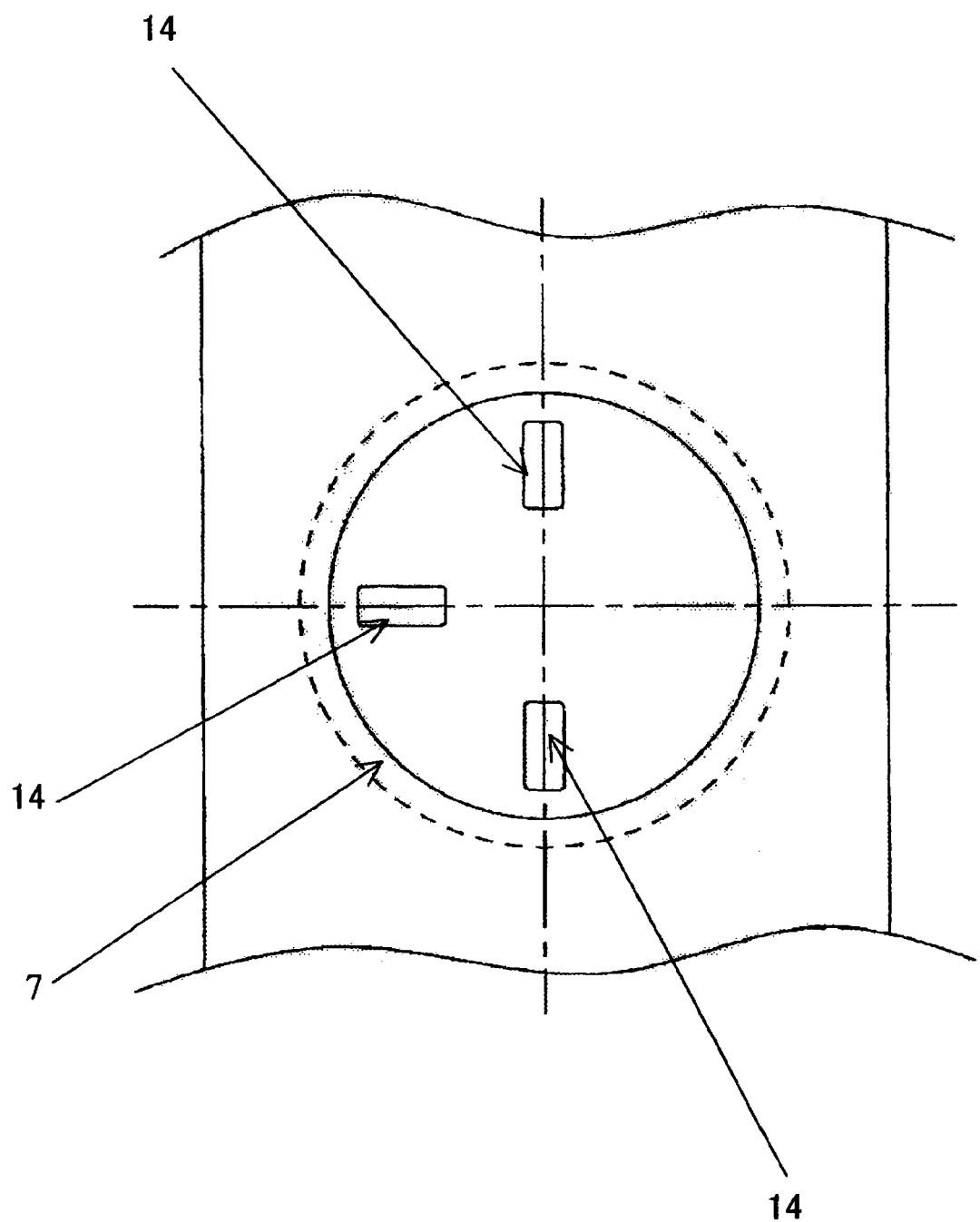
FIG. 40 is a plan view of a shaft support recess part of the main unit or the option unit in the embodiment of the invention.

Next, FIGS. 32 and 33 show a sixth embodiment of a stack type mobile terminal according to the invention.

FIG. 32 is a perspective view of the stack type mobile terminal in the sixth embodiment of the invention and FIG. 33 is a perspective view of the stack type mobile terminal in the sixth embodiment of the invention. Parts identical with those shown in FIGS. 1 to 31 are denoted by the same reference numerals in FIGS. 32 and 33 and will not be discussed again.

In a stack type mobile terminal 600 in the embodiment, each of a main body cabinet 110 and an option cabinet 120 is formed roughly like a square. A rotation supporting point shaft 130 not shown and a rotation supporting point hole 131 not shown are provided in the center of each of the main body cabinet 110 and the option cabinet 120 and accordingly the option cabinet 120 can be rotated relative to the main body cabinet 110.

Therefore, according to the stack type mobile terminal 600 in the embodiment, if the option cabinet 120 is rotated roughly 45° relative to the main body cabinet 110 as shown in FIG. 33, the four corners of the option cabinet 120 are exposed on the four sides of the main body cabinet 110. A plurality of operation sections (for example, loudspeakers 122a, a camera 124a, and a slide pad 126) are provided in the corners, so that the operation sections can be used at the same time.

The configuration of the terminal and the cabinets other than described above is similar to that of the first to third embodiments of the invention and therefore will not be discussed again.

The method of rotatably fixing the main body cabinet 110 and the option cabinet 120 may be the configuration of either of the first and fourth embodiments of the invention and therefore will not be discussed again.

In the embodiment, only one option cabinet 120 is stacked, but the stack type mobile terminal may be configured so that as many only necessary option cabinets as the necessary number can be stacked on the rear of the main body cabinet from among the different types of option cabinets.

The rotation supporting point hole 131 made in the cabinet placed at the bottom stage of the option cabinets 120 is blocked by a lid member 180 not shown for preventing dust or liquid from entering the rotation supporting point hole. Likewise, to use the stack type mobile terminal 600 with the main body cabinet 110 solely, the rotation supporting point hole 131 made in the main body cabinet 110 is blocked by a lid member 180.

Likewise, the rotation supporting point hole 131 made in the option cabinet not used can also be blocked by a lid member 180, thereby enabling dust or liquid to be prevented from entering the rotation supporting point hole at the storage time.

In FIGS. 34 to 40, a stack type mobile terminal is made up of one main unit 1 and three option units 2, 3, and 4 that can mutually rotate and are detachably joined.

The top option unit 2 (adjacent to the main unit) is set as full keyboard use, the option unit 3 below the option unit 2 is set as loudspeaker use, and the bottom option unit 4 is set as game use. In the description to follow, the option units are called the full keyboard option unit, the loudspeaker option unit, and the game option unit.

As a specific rotate and moreover detachable configuration, a shaft support recess part 5 is formed in the lower face of each of the main unit 1, the full keyboard option unit 2, the loudspeaker option unit 3, and the game option unit 4 and a rotation shaft 6 is formed on the upper face of each of the option units 2, 3, and 4 and the rotation shafts 6 are fitted into the shaft support recess parts 5, whereby the full keyboard option unit 2 is rotatably joined to the main unit 1, the loudspeaker option unit 3 is rotatably joined to the full keyboard option unit 2, and the game option unit 4 is rotatably joined to the loudspeaker option unit 3.

Further, a groove 7 is provided in the inner peripheral surface direction of each shaft support recess part 5 and claws 8 are provided from the outer peripheral surface of each rotation shaft 6 and the claws 8 are fitted into the grooves 7, whereby the main unit 1 and the full keyboard option unit 2 and the option units 2, 3, and 4 can be joined rotatably and moreover as desired.

Further, the rotation shaft 6 is hollow and the claws 8 are formed as notches on the outer peripheral surface of the rotation shaft and therefore each of the claws 8 can become elastically deformed a predetermined amount. A slope to smooth engagement in the groove 7 is formed on the top of each claw 8.

In the embodiment, the shaft support recess part 5 of the game option unit 4 at the bottom is left open; however, an option unit having another additional function and including the same shaft support recess part 5, rotation shaft 6, etc., as those of the unit can be joined as required.

That is, any of the three option units 2, 3, and 4 can be selected and jointed to the main unit 1 and further the stack order of the three option units 2, 3, and 4 can be set as desired and moreover the number of stacked option units can also be changed as desired.

Usually, the main unit 1 and the three option units 2, 3, and 4 are stored in the stack form and to use any desired option unit, the option unit is rotated clockwise 90° or counterclockwise 90° and is placed in a use mode.

The main unit 1 has a telephone function and includes a display section and an operation section used for usual telephone conversation operation and also includes a telephone reception section, a telephone transmission section, an incoming loudspeaker section, a transmission-reception section, a data conversion section, a voice processing section, an image processing section, an information record section, etc. In addition, the main unit 1 has a power source, which is a power supply source for operating the function of the main unit 1 and is also used as a power supply source to the option unit in the use mode.

The power supply path from the main unit 1 to the option unit 2, 3, 4 placed in the use mode is in the opposite direction as the same path as an information transmission path and this information transmission path is formed as a different path depending on which option unit is placed in the use mode.

As a specific information transmission path configuration, the option unit 2, 3, 4 includes two sets of relay contacts 9 with a 180° spacing on the outer peripheral surface of the rotation shaft 6 and has one set of information transmission contacts 10 at the 90° distant position from the relay contacts. On the other hand, two sets of relay contacts 11 with a 180° spacing are included on the inner peripheral surface of the shaft support recess part 5.

The relay contacts 9 formed on the outer peripheral surface of the rotation shaft 6 and the relay contacts 11 formed on the inner peripheral surface of the shaft support recess part 5 are electrically directly connected.

Further, the main unit 1 includes two sets of information transmission contacts 12 with a 180° spacing on the inner peripheral surface of the shaft support recess part 5.

In the embodiment, when the full keyboard option unit 2 is placed in the use mode, the information transmission contacts 10 of the full keyboard option unit 2 are connected to the information transmission contacts 12 of the main unit 1, thereby forming the information transmission path.

When the loudspeaker option unit 3 is placed in the use mode, the information transmission contacts 10 of the loudspeaker option unit 3 are connected to the information transmission contacts 12 of the main unit 1 via the relay contacts 11 and the relay contacts 9 of the full keyboard option unit 2 in order, thereby forming the information transmission path.

In the described configuration, it is made possible to add, delete, and change the option unit including any desired function by the user and the advantage that the ease of use of the mobile terminal improves is provided.

As the configuration of the information transmission contacts and the information transmission contacts, the information transmission contacts and the relay contacts, and the relay contacts and the relay contacts between the main unit 1 and the full keyboard option unit 2 and between the adjacent option units, an optical information transmission method, for example, using light emission and reception elements in combination or the like may be adopted.

In the embodiment, when each option unit 2, 3, 4 is placed in the stack state and the use state, a click feeling is generated.

As a specific configuration of generating a click feeling, one engagement part 13 is projected from the tip face of the rotation shaft 6 of each option unit 2, 3, 4 and three engaged parts 14 are formed with a 90° spacing on the bottom face of the shaft support recess part 5 of each of the main unit 1 and the option units 2, 3, and 4 facing the rotation locus of the engagement part 13.

The engagement parts 13 are fitted into the engaged parts 14, whereby a click feeling is generated. At the same time, it is made possible to temporarily fix rotation when each option unit 2, 3, 4 is placed in the stack state and the use state.

In the embodiment, information transmitted from the information transmission contacts 12 of the option unit 2, 3, 4 in the use mode to the main unit 1 contains information as to which option unit is placed in the use mode.

That is, there is a possibility that every option unit 2, 3, 4 may be connected to the main unit 1 and when any option unit 2, 3, 4 is placed in the use mode, the main unit 1 needs to detect which option unit it is.

When the game option unit 4 is placed in the use mode, the information transmission contacts of the option unit are connected to the information transmission contacts of the main unit 1 via the relay contacts of the loudspeaker option unit 3 and the full keyboard option unit 2, and the information indicating that the game option unit 2 is placed in the use mode is also transmitted to the main unit 1.

In so doing, simply by projecting the option units 2, 3, and 4, it is made possible for the main unit 1 to detect which option unit is in the use mode, and setting work of the user becomes unnecessary.

Further, in the embodiment, the shaft support recess part 5 of the game option unit 4 positioned at the bottom is open, but may be blocked by a lid for preventing entry of dust and liquid.

In the embodiment, the shaft support recess part 5 is formed in the lower face of each of the main unit 1 and the option units 2, 3, and 4 and the rotation shaft 6 is formed on the upper face of each of the option units 2, 3, and 4. However, as another example, if the rotation shaft 6 is formed on the lower face of each of the main unit 1 and the option units 2, 3, and 4 and the shaft support recess part 5 is formed in the upper face of each of the option units 2, 3, and 4, a similar advantage is provided.

In the embodiment, the groove 7 is provided in the inner peripheral surface direction of each shaft support recess part 5 and the claws 8 are provided from the outer peripheral surface of each rotation shaft 6. However, as another example, if the claws 8 are provided in the inner peripheral surface direction of each shaft support recess part 5 and the groove 7 is provided on the outer peripheral surface of each rotation shaft 6, a similar advantage is provided.

In the embodiment, each of the option units 2, 3, and 4 has two sets of relay contacts 9 and one set of information transmission contacts 10 on the outer peripheral surface of the rotation shaft 6 and includes two sets of relay contacts 11 on the inner peripheral surface of the shaft support recess part 5, and the main unit 1 has two sets of information transmission contacts 12 on the inner peripheral surface of the shaft support recess part 5.

As another example, if each option unit two sets of relay contacts 9 and one set of information transmission contacts 10 on the tip face of the rotation shaft 6 and includes two sets of relay contacts 11 on the bottom face of the shaft support recess part 5 and the main unit 1 has two sets of information transmission contacts 12 on the bottom face of the shaft support recess part 5, a similar advantage can be provided.

In the embodiment, the engagement part 13 is projected from the tip face of the rotation shaft 6 and the engaged parts 14 are formed on the bottom face of the shaft support recess part 5. However, as another example, if the engaged parts 14 are projected from the tip face of the rotation shaft 6 and the engagement part 13 is formed on the bottom face of the shaft support recess part 5, a similar advantage can be provided. As another example, if the engagement part 13 is provided on the outer peripheral surface of the rotation shaft 6 and the engaged parts 14 are provided on the inner peripheral surface of the shaft support recess part 5 or as still another example, if the engaged parts 14 are provided on the outer peripheral surface of the rotation shaft 6 and the engagement part 13 is provided on the inner peripheral surface of the shaft support recess part 5, a similar advantage can be provided.

Further, in the embodiment, each option unit is placed in the use mode regardless of whether the option unit is rotated clockwise 90° or counterclockwise 90°. However, as another example, the option unit may be placed in the use mode only when it is rotated either clockwise 90° or counterclockwise 90°.

Specifically, each option 2, 3, 4 may include one set of relay contacts 9 and one set of information transmission contacts 10 on the outer peripheral surface of the rotation shaft and has one set of relay contacts on the inner peripheral surface of the shaft support recess part 5 and further the main unit 1 may include one set of information transmission contacts 12 on the inner peripheral surface of the shaft support recess part 5.

(Eighth Embodiment)

A mobile terminal in an eighth embodiment of the invention will be discussed with reference to FIG. 41.

Components operating in a similar manner to those of the seventh embodiment are denoted by the same reference numerals and the description of the seventh embodiment applies to the components.

Figure 41:
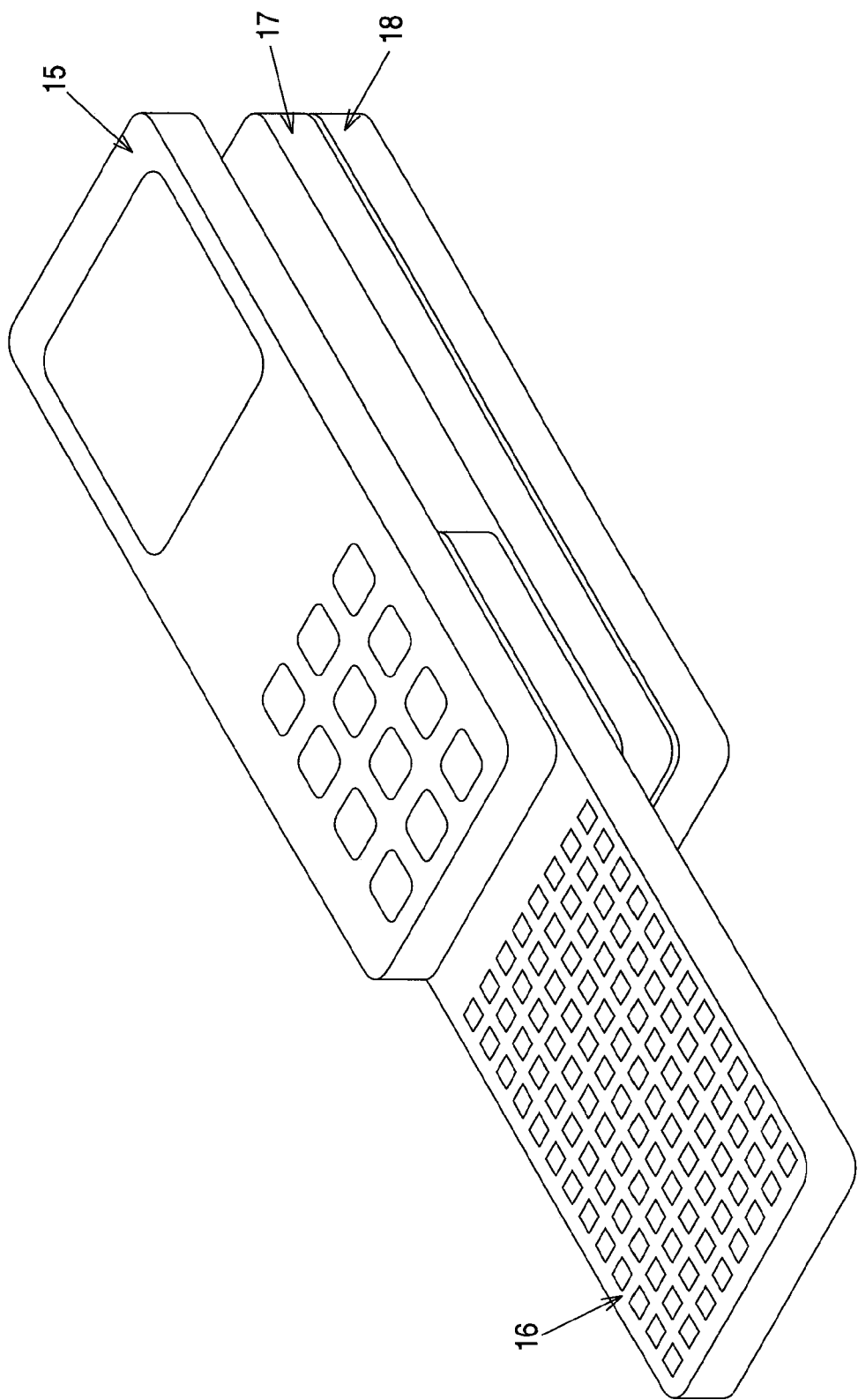
FIG. 41 is a perspective view of a mobile terminal in an eighth embodiment of the invention.

In FIG. 41, the mobile terminal differs from that of the seventh embodiment in that the center axis of a shaft supporting point recess part and a rotation shaft is placed at a distant position from the center of a main unit 15 and option units 16, 17, and 18 and that each of the option units 16, 17, and 18 is placed in a use mode when the option unit is rotated 180° from a stack state.

As a specific configuration, one set of information transmission contacts is provided on the inner peripheral surface of the shaft support recess part of the main unit 15. One set of relay contacts and one set of information transmission contacts are provided with a 180° spacing on the outer peripheral surface of the rotation shaft of each of the option units 16, 17, and 18, and one set of relay contacts is provided on the inner peripheral surface of the shaft support recess part.

Further, in the embodiment, one engagement part is projected from the tip face of the rotation shaft of each of the option units 16, 17, and 18, and two engaged parts are formed with a 180° spacing on the bottom face of the shaft support recess part of each of the option units 16, 17, and 18.

According to such a configuration, it is made possible to make large the projection area per function section of each option unit 16, 17, 18 when the option unit 16, 17, 18 is rotated 180° and is placed in the use mode.

(Ninth Embodiment)

A mobile terminal in a ninth embodiment of the invention will be discussed with reference to FIGS. 42 and 43.

Components operating in a similar manner to those of the seventh embodiment are denoted by the same reference numerals and the description of the seventh embodiment applies to the components.

Figure 42:
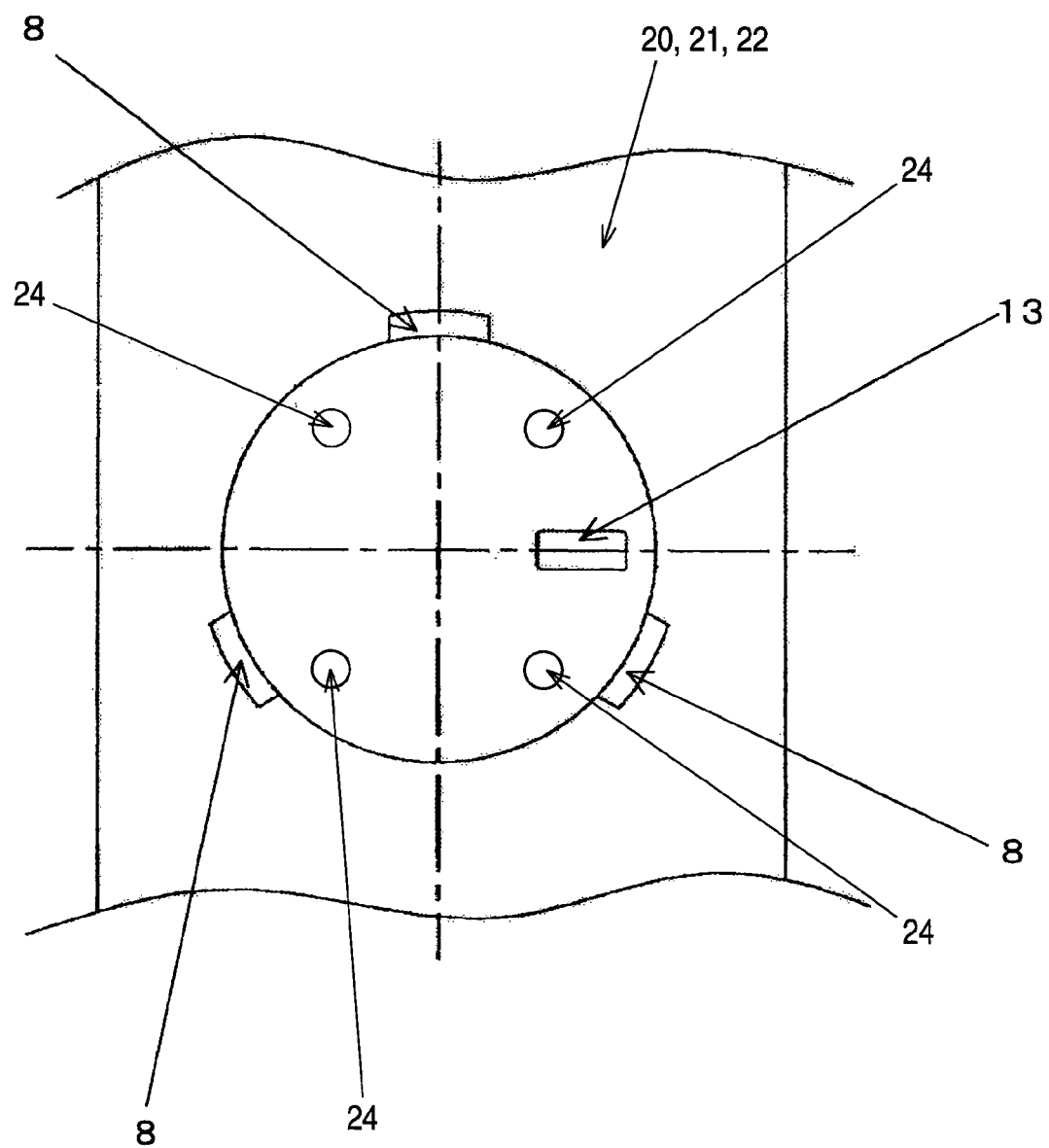
FIG. 42 is a plan view of a rotation shaft of an option unit in a ninth embodiment of the invention.
Figure 43:
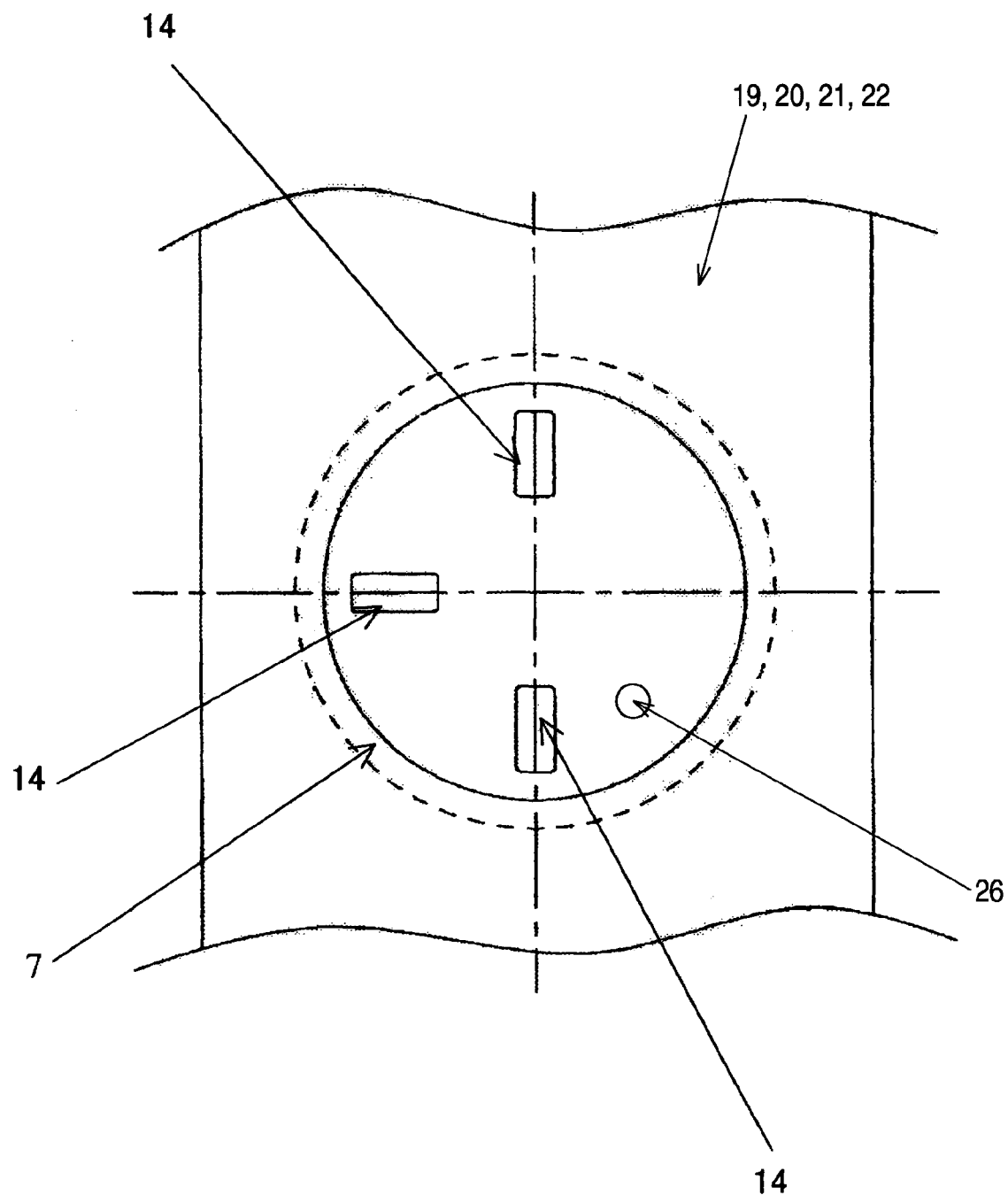
FIG. 43 shows a shaft support recess part of a main unit or the option unit in the embodiment of the invention.

In FIG. 42, the mobile terminal differs from that of the seventh embodiment in that the relative angle between a main unit 19 and each option unit 20, 21, 22 placed in a use mode can be detected.

As a specific configuration for angle detection, hole elements 24 are provided in the tip part of a rotation shaft 23 of each of the option units 20, 21, and 22 and a magnet 26 is provided on the bottom of a shaft support recess part 25 of each of the main unit 19 and the option units 20, 21, and 22.

The hole elements 25 and the magnet 26 can detect what degree the angle between the main unit 19 and the top option unit 20 or the two adjacent option units is, and it is made possible to switch the function according to the angle.

For example, the operation function is preset so that the operation section of a game option unit is for a right hander when the option unit is rotated clockwise 90° and is for a left hander when the option unit is rotated counterclockwise 90°, and it is made possible to switch the function to either function in response to the relative angle to the main unit 19.

As another example of switching the function in response to the relative angle between the main unit 19 and the option unit placed in the use mode, the display direction of a camera-photographed image is switched. Setting is made so that an image photographed with a camera provided on a camera option unit is rotated 180° and is displayed on a liquid crystal screen provided on the main unit 1 when the relative angle to the main unit 19 is 90° or 270°. Then, it is made possible to display an image in the same direction on the main unit 19 regardless of whether the camera option unit is rotated clockwise 90° or counterclockwise 90°.

As another example, the display direction of a liquid crystal screen is switched. Setting is made so that an image displayed on a TV option unit having a liquid crystal screen is rotated 180° and is displayed when the relative angle to the main unit 19 is 90° or 270°. Then, it is made possible to display an image in the same direction on the main unit 19 regardless of whether the TV option unit is rotated clockwise 90° or counterclockwise 90°.

(Tenth Embodiment)

A mobile terminal in a tenth embodiment of the invention will be discussed with reference to FIG. 44.

Components operating in a similar manner to those of the seventh embodiment are denoted by the same reference numerals and the description of the seventh embodiment applies to the components.

Figure 44:
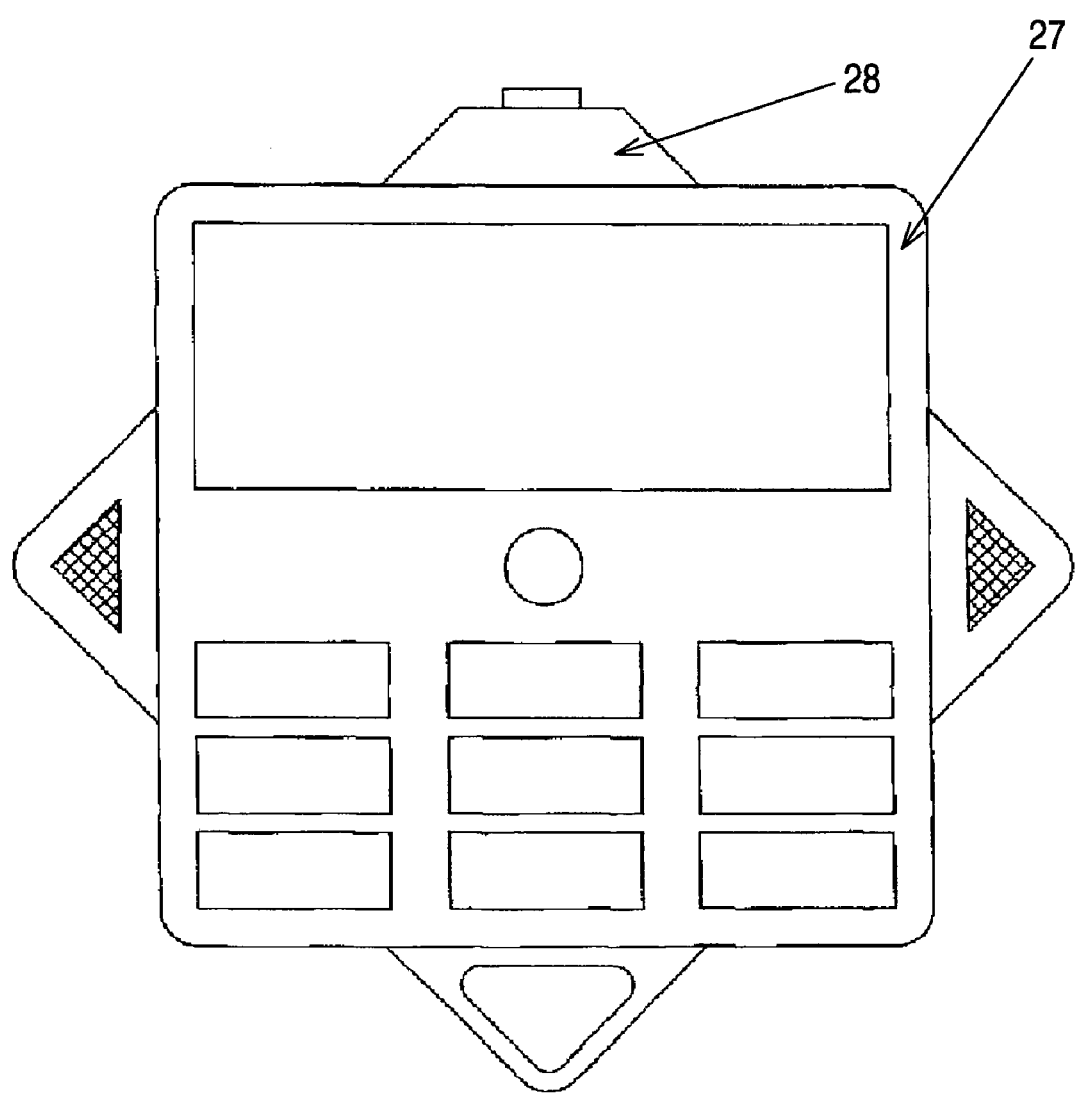
FIG. 44 is a perspective view of a mobile terminal in a tenth embodiment of the invention.

In FIG. 44, the mobile terminal differs from that of the seventh embodiment in that the outer shape of each of a main unit 27 and an option unit 28 is roughly like a square and that four function sections of the option unit 28 project on the four sides of the main unit 27 when the option unit 28 is rotated clockwise 45° or counterclockwise 45° relative to the main unit 27 and is placed in a use mode.

Additional functions provided in the projecting function sections include a loudspeaker, a camera, a slide pad, a key, etc., for example.

As a specific configuration, two sets of information transmission contacts are provided with a 90° spacing on the inner peripheral surface of a shaft support recess part of the main unit 27. Two sets of relay contacts and one set of information transmission contacts between the two sets of relay contacts are provided with a 90° spacing on the outer peripheral surface of a rotation shaft of the option unit 28. Two sets of relay contacts are provided with a 90° spacing on the inner peripheral surface of a shaft support recess part provided on the option unit.

Further, in the embodiment, one engagement part is projected from the tip face of the rotation shaft of the option unit 28 and three engaged parts are formed with a 45° spacing on the bottom face of the shaft support recess part of the option unit 28. According to the configuration, when the option unit 28 is placed in a stack state and when the option unit 28 is rotated clockwise 45° or counterclockwise 45° and is placed in the use mode, the engagement part and the engaged part engage and a click feeling is generated.

In so doing, the four function sections can be projected at a time and it is made possible to increase the number of the function sections that can be used at the same time.

This application is based on Japanese Patent Application (No. 2005-161557) filed on Jun. 1, 2005, which is incorporated herein by reference.

INDUSTRIAL APPLICABILITY

As described above, the stack type mobile terminal according to the invention includes the main body cabinet having a telephone function, the option cabinets stacked on the rear of the main body cabinet as each function section is hidden, the rotation supporting point shaft provided in the option cabinet along the stack direction of the main body cabinet and the option cabinets, and the rotation supporting point holes made in the main body cabinet and the option cabinets into which the rotation supporting point shaft is inserted, wherein the main body cabinet and the option cabinets rotate relatively with the rotation supporting point shaft as the center, whereby the function sections of the option cabinets can be exposed, and a plurality of types of option cabinets can be stacked on the rear of the main body cabinet selectively as many as desired, wherein the through contacts for electrically directly connecting the main body cabinet and the option cabinet which are adjacent and the signal conduction contacts for bringing the signal of the rotated option cabinet into conduction with the adjacent main body cabinet and the adjacent option cabinet are provided on the upper face of the rotation supporting point shaft provided in the option cabinet and the rotation supporting point hole bottom faces of the main body cabinet and the option cabinet, and wherein when the main body cabinet and the option cabinet which are adjacent do not relatively rotate, the through contacts come in contact with each other and when the main body cabinet and the option cabinet which are adjacent relatively rotate at a predetermined angle, the signal conduction contacts come in contact with the through contacts, thereby bringing only the signal of the selected option cabinet into electric conduction with the main body cabinet, so that it is made possible to stack as many only necessary option cabinets as the necessary number on the rear of the main body cabinet from among the different types of option cabinets and it is made possible to select and add any desired option cabinet as matched with the user's needs.

When adding the option cabinet, the user need not electrically connect the cabinets, and adding the option cabinet is facilitated.

Further, when the main body cabinet and the option cabinet or the option cabinets are rotated, as the electrically conducting contact parts, only the minimum necessary contacts are brought into contact with each other, so that abrasion of the contacts can be decreased; the invention is useful particularly for a stack type mobile terminal with a plurality of stacked cabinets rotatable via a shaft along the stack direction.

The mobile terminal of the invention has the advantages that it is made possible to add, delete, and change any desired function by the user and the ease of use of the mobile terminal improves, and is useful as a mobile terminal with a main unit and an option unit stacked on each other.

The invention claimed is:

1. A stack type mobile terminal, comprising:
a main body cabinet having a telephone function;
at least one option cabinet stacked on the rear of said main body cabinet;
a rotation supporting point shaft extending from said option cabinet along the cabinet stack direction; and
rotation supporting point holes made in said main body cabinet and said option cabinet, said rotation supporting point shaft of said option cabinet is inserted in said rotation supporting point hole in said main body or said rotation support point hole in another option cabinet, wherein said main body cabinet and said option cabinet can be rotated relatively with said rotation supporting point shaft as the center and a plurality of types of option cabinets can be stacked on the rear of said main body cabinet selectively as many as desired, wherein
through contacts for electrically connecting said cabinets are provided on an upper face of said rotation supporting point shaft of said option cabinet and a bottom face of said rotation supporting point hole of said option cabinet and signal conduction contacts for bringing said rotated option cabinet into conduction with said main body cabinet and an adjacent option cabinet are provided on the bottom face of said rotation supporting point hole of said main body cabinet and the upper face of said rotation supporting point shaft of said option cabinet, and wherein the through contacts of adjacent cabinets not relatively rotating are brought into contact with each other and the signal conduction contacts of said option cabinet relatively rotated at a predetermined angle to said main body cabinet are brought into conduction with the signal conduction contacts of said main body cabinet directly or via the through contacts.

2. The stack type mobile terminal as claimed in claim 1 comprising:

a movable lock member projecting from or entering a circumference face of one of said rotation supporting point shaft and said rotation supporting point hole; and a lock groove provided on a circumference face of the other of said rotation supporting point shaft and said rotation supporting point hole, the lock groove engaging the lock member when said adjacent cabinet does not relatively rotate or when said adjacent cabinet relatively rotates at a predetermined angle, wherein when said selected option cabinet relatively rotates at a predetermined angle, said main body cabinet and said option cabinet or said adjacent option cabinets are locked in a releasable manner.

3. The stack type mobile terminal as claimed in claim 1 wherein a detachable lid member is provided on said rotation supporting point hole of a cabinet to which an adjacent option cabinet is not attached.

4. The stack type mobile terminal as claimed in claim 1 wherein said main body cabinet and said option cabinet are provided with option cabinet detection contacts for detecting the type of selected option cabinet when the selected option cabinet relatively rotates at a predetermined angle to said adjacent main body cabinet and said adjacent option cabinet.

5. The stack type mobile terminal as claimed in claim 1 wherein said main body cabinet and said option cabinet are provided with angle detection members for detecting the relative rotation angle between said main body cabinet and said option cabinet and between said adjacent option cabinets.

6. The stack type mobile terminal as claimed in claim 1 comprising:

a plurality of movable claw members projecting from or entering a circumference face of one of said rotation supporting point shaft and said rotation supporting point hole, and a claw member engagement groove provided on the circumference face of the other of said rotation supporting point shaft and said rotation supporting point hole, the claw member engagement groove engaging the plurality of claw members, wherein the claw members and the claw member engagement groove cooperate to retain said adjacent cabinets rotatably.

7. The stack type mobile terminal as claimed in claim 1 wherein a tap is provided in the center of said rotation supporting point hole of said main body cabinet and said adjacent option cabinet is fixed with a screw to the main body cabinet for rotation and the screw is provided at the center with a tap to which a screw is screwed for fixing said further adjacent option cabinet for rotation.

8. The stack type mobile terminal as claimed in claim 4 wherein the through contacts, the signal conduction contacts, and the option cabinet detection contacts are provided using light emission and reception elements in combination.

9. A mobile terminal comprising:

a main unit having at least one information transmission contact;

a first option unit stacked on the main unit rotatably and detachably, the first option unit having at least one information transmission contact and relay contacts; and one or more option units stacked on the first option unit rotatably and detachably, the one or more option units each having at least one information transmission contact, wherein when the first option unit is rotated and is projected from the main unit, the information transmission contact of the first option unit is connected directly to the information transmission contact of the main unit to form an information transmission path, and when a second option unit other than the first option unit is rotated and is projected from the main unit, the information transmission contact of the second option unit is connected to the information transmission contact of the main unit via the relay contacts of the first option unit.

10. The mobile terminal as claimed in claim 9 wherein each option unit includes the relay contacts.

11. The mobile terminal as claimed in claim 9 wherein each option unit is formed with a shaft support recess part on either an upper face or a lower face and with a rotation shaft on the other face and further the main unit includes a lower face formed with either a rotation shaft corresponding to the shaft support recess part of the option unit or a shaft support recess part corresponding to the rotation shaft of the option unit.

12. The mobile terminal as claimed in claim 11 wherein the relay contacts are provided on an outer peripheral surface of the rotation shaft and an inner peripheral surface of the shaft support recess part of each option unit.

13. The mobile terminal as claimed in claim 11 wherein the relay contacts are provided on a tip face of the rotation shaft and a bottom surface of the shaft support recess part of each option unit.

14. The mobile terminal as claimed in claim 11 wherein an engagement part and an engaged part are engaged when the option unit is placed in a stack state or when said option unit is placed in a projection state.

15. The mobile terminal as claimed in claim 11 wherein a claw and a groove for engaging each other are formed between the rotation shaft and the shaft support recess part and the groove is set to a predetermined length in a circumferential direction.

16. The mobile terminal as claimed in claim 11 wherein each option unit includes a use mode detection section.

17. The mobile terminal as claimed in claim 16 wherein the use mode detection section is a hole element and a magnet formed between the main unit and the first option unit and between an adjacent option unit.

18. The mobile terminal as claimed in claim 11 having a lid for blocking the shaft support recess part of a third option unit that is the farthest from the main unit.

* * * * *